United States Patent
Kwon et al.

(10) Patent No.: US 10,468,656 B2
(45) Date of Patent: Nov. 5, 2019

(54) COMPLEX ELECTRODE ASSEMBLY INCLUDING PLURALITY OF ELECTRODE ASSEMBLIES AND ELECTROCHEMICAL DEVICE COMPRISING THE COMPLEX ELECTRODE ASSEMBLY

(71) Applicant: Samsung Electronics Co., Ltd., Suwon-si, Gyeonggi-do (KR)

(72) Inventors: Moonseok Kwon, Hwaseong-si (KR); Jaeman Choi, Seongnam-si (KR); Kuntae Kwon, Suwon-si (KR); Euncheol Do, Seoul (KR); Yeonil Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 46 days.

(21) Appl. No.: 14/876,003

(22) Filed: Oct. 6, 2015

(65) Prior Publication Data
US 2016/0099456 A1    Apr. 7, 2016

(30) Foreign Application Priority Data
Oct. 6, 2014 (KR) .......................... 10-2014-0134479

(51) Int. Cl.
*H01M 2/26* (2006.01)
*H01M 2/02* (2006.01)
(Continued)

(52) U.S. Cl.
CPC .......... *H01M 2/263* (2013.01); *H01M 2/0212* (2013.01); *H01M 2/0267* (2013.01);
(Continued)

(58) Field of Classification Search
CPC ............ H01M 2/263; H01M 10/0525; H01M 10/0431; H01M 2220/30; H01M 2/021;
(Continued)

(56) References Cited

U.S. PATENT DOCUMENTS 4,224,499 A * 9/1980 Jones ..................... B23K 28/02
219/118
7,276,313 B2 10/2007 Watanabe et al.
(Continued)

FOREIGN PATENT DOCUMENTS

JP    2001110385 A    4/2001
JP    2005166493 A    6/2005
(Continued)

*Primary Examiner* — Jonathan G Jelsma
*Assistant Examiner* — Omar M Kekia
(74) *Attorney, Agent, or Firm* — Cantor Colburn LLP

(57) ABSTRACT

A complex electrode assembly includes a first sheet-type wiring which extends in a lengthwise direction of the first sheet-type wiring and comprises a sheet region of which a width that is perpendicular to the lengthwise direction is greater than a thickness that is perpendicular to the lengthwise direction and a width direction of the first sheet-type wiring, and electrode assemblies which are arranged separate from each other in the lengthwise direction of the first sheet-type wiring and are electrically connected to the first sheet-type wiring. The first sheet-type wiring may be disposed to face an outer surface of each of the electrode assemblies.

37 Claims, 34 Drawing Sheets

(51) Int. Cl.
*H01M 2/24* (2006.01)
*H01M 10/04* (2006.01)
*H01M 6/46* (2006.01)
*H01M 10/0525* (2010.01)
*H01M 2/20* (2006.01)
*H01M 10/0587* (2010.01)

(52) U.S. Cl.
CPC ........... *H01M 2/0275* (2013.01); *H01M 2/24* (2013.01); *H01M 6/46* (2013.01); *H01M 10/0436* (2013.01); *H01M 2/021* (2013.01); *H01M 2/204* (2013.01); *H01M 10/0431* (2013.01); *H01M 10/0525* (2013.01); *H01M 10/0587* (2013.01); *H01M 2002/0205* (2013.01); *H01M 2220/30* (2013.01)

(58) Field of Classification Search
CPC ....... H01M 2/0212; H01M 2002/0205; H01M 2/0275; H01M 2/204; H01M 2/24; H01M 10/0436; H01M 10/0587; H01M 6/46; H01M 2/0267
USPC ...................................................... 429/94, 160
See application file for complete search history.

(56) References Cited

U.S. PATENT DOCUMENTS

| | | | |
|---|---|---|---|
| 9,728,804 B2 | 8/2017 | Lee et al. | |
| 2006/0099501 A1* | 5/2006 | Kim | H01M 2/04 429/174 |
| 2007/0292753 A1* | 12/2007 | Zama | H01M 2/0212 429/181 |
| 2008/0063929 A1* | 3/2008 | Byun | H01M 2/202 429/121 |
| 2009/0211082 A1* | 8/2009 | Yoon | H01M 2/0277 29/623.1 |
| 2010/0248010 A1* | 9/2010 | Butt | H01M 2/1077 429/160 |
| 2011/0059352 A1 | 3/2011 | Lee | |
| 2011/0097615 A1* | 4/2011 | Goh | H01M 2/0275 429/94 |
| 2011/0165444 A1 | 7/2011 | Guo et al. | |
| 2011/0183169 A1* | 7/2011 | Bhardwaj | H01M 10/0431 429/94 |
| 2012/0115016 A1* | 5/2012 | Kim | H01M 2/1061 429/159 |
| 2013/0171485 A1* | 7/2013 | Kodera | H01M 2/204 429/90 |
| 2013/0171490 A1 | 7/2013 | Rothkopf et al. | |
| 2013/0196210 A1* | 8/2013 | Kim | H01M 10/0413 429/153 |
| 2013/0213453 A1* | 8/2013 | Nakahara | H01L 31/022425 136/244 |
| 2014/0057147 A1 | 2/2014 | Andrew et al. | |
| 2014/0338955 A1 | 11/2014 | Park et al. | |
| 2014/0370345 A1 | 12/2014 | Maleki et al. | |
| 2015/0072204 A1 | 3/2015 | Kwon et al. | |
| 2016/0093838 A1 | 3/2016 | Kwon et al. | |
| 2016/0099454 A1 | 4/2016 | Kwon et al. | |

FOREIGN PATENT DOCUMENTS

| | | |
|---|---|---|
| KR | 100731432 B1 | 6/2007 |
| KR | 100873308 B1 | 12/2008 |
| KR | 100876265 B1 | 12/2008 |
| KR | 100922855 B1 | 10/2009 |
| KR | 101183530 B1 | 9/2012 |
| KR | 1020130014252 A | 2/2013 |
| KR | 1020130133332 A | 12/2013 |
| KR | 1020130133585 A | 12/2013 |
| KR | 1020140134479 A | 11/2014 |
| KR | 1020150029544 A | 3/2015 |
| KR | 1020150054289 A | 5/2015 |
| KR | 1020160036282 A | 4/2016 |
| KR | 1020160040047 A | 4/2016 |

* cited by examiner

COMPLEX ELECTRODE ASSEMBLY INCLUDING PLURALITY OF ELECTRODE ASSEMBLIES AND ELECTROCHEMICAL DEVICE COMPRISING THE COMPLEX ELECTRODE ASSEMBLY

RELATED APPLICATION

This application claims priority to Korean Patent Application No. 10-2014-0134479, filed on Oct. 6, 2014, and all the benefits accruing therefrom under 35 U.S.C. § 119, the contents of which in their entireties are herein incorporated by reference.

BACKGROUND

1. Field

The disclosure relates to a complex electrode assembly including a plurality of electrode assemblies and an electrochemical device including the complex electrode assembly, and more particularly, to a complex electrode assembly capable of being repeatedly bent by electrically connecting a plurality of electrode assemblies to one another, and an electrochemical device including the complex electrode assembly.

2. Description of the Related Art

Unlike primary batteries, secondary batteries are electrochemical devices that may be charged and discharged and are widely used in various electronic apparatuses, e.g., cellular phones, laptop computers, and camcorders.

In particular, lithium secondary batteries feature higher voltage and higher energy density per unit weight as compared to nickel-cadmium batteries and nickel-hydride batteries, which are widely used as power sources for portable electronic devices. Thus, demands for lithium secondary batteries are increasing. Such a lithium secondary battery uses a lithium-based oxide to form a positive electrode active material layer and a carbon-based material to form a negative electrode material layer. In general, lithium secondary batteries are categorized as liquid electrolyte batteries and polymer electrolyte batteries, based on the type of electrolyte. A battery using a liquid electrolyte is referred to as a lithium ion battery, whereas a battery using a polymer electrolyte is referred to as a lithium polymer battery. Furthermore, lithium secondary batteries are being manufactured in various configurations including cylindrical, prismatic, and pouch configurations. Generally, is widely used in lithium secondary batteries. The jelly-roll-type electrode assembly is typically formed by inserting a separator between a positive electrode plate and a negative electrode plate and winding the structure in a spiral shape, or a stacked electrode assembly, which is formed by stacking a plurality of positive electrode plates and a plurality of negative electrode plates by interposing a separator therebetween.

As an interest in flexible electronic apparatuses has recently increased, research into flexible batteries capable of being used in flexible electronic apparatuses is increasing.

SUMMARY

According to an embodiment of the invention, a complex electrode assembly includes a first sheet-type wiring which extends in a lengthwise direction of the first sheet-type wiring and comprises a sheet region, a width of which in a direction perpendicular to the lengthwise direction is greater than a thickness thereof in a direction perpendicular to the lengthwise direction and a width direction of the first sheet-type wiring; and a plurality of electrode assemblies which are arranged to be spaced apart from each other in the lengthwise direction of the first sheet-type wiring and are electrically connected to the first sheet-type wiring, where each of the electrode assemblies include a first electrode tab electrically connected to the first sheet-type wiring. In such an embodiment, outer surfaces of tach of the electrode assemblies may include a first outer surface and a second outer surface arranged opposite to each other in the lengthwise direction of the first sheet-type wiring, a third outer surface and a fourth outer surface arranged opposite to each other in the width direction of the first sheet-type wiring, and a fifth outer surface and a sixth outer surface arranged opposite to each other in a thickness direction of the first sheet-type wiring. In such an embodiment, the first sheet-type wiring may be disposed within a region defined in a width of each of the electrode assemblies such that the first sheet-type wiring faces the fifth or sixth outer surface of at least one of the electrode assemblies, and the first electrode tab is partially bent in a way such that a portion of the first electrode tab is bonded with a portion of the first sheet-type wiring.

In an embodiment, each of the electrode assemblies may further include a first electrode plate, a second electrode plate, and a separator interposed between the first electrode plate and the second electrode plate.

In an embodiment, the first electrode plate may include a first current collector and a first active material layer coated on the first current collector, and a strength of the first sheet-type wiring may be greater than a strength of the first current collector.

In an embodiment, each of the electrode assemblies may include at least one of a jelly-roll-type wound electrode assembly in which the first electrode plate, the second electrode plate, and the separator are wound together; a stacked electrode assembly in which the first electrode plate, the second electrode plate, and the separator are repeatedly stacked one on another; and a folded electrode assembly in which respective portions of the first electrode plate, the second electrode plate, and the separator are folded.

In an embodiment, the fifth outer surface and the sixth outer surface may be substantially parallel to each other, and the first electrode plate, the second electrode plate and the separator, which are arranged between the fifth outer surface and the sixth outer surface, may be substantially parallel to one another.

In an embodiment, the first electrode tab may electrically connect the first electrode plate to the first sheet-type wiring.

In an embodiment, the complex electrode assembly may further include an insulation layer disposed on at least a portion of an outer surface of the first sheet-type wiring, except for the portion of the first sheet-type wiring bonded with the first electrode tab.

In an embodiment, the portion of the first sheet-type wiring bonded with the first electrode tab may face at least one of first to sixth outer surfaces of each of the electrode assemblies.

In an embodiment, the first electrode tab may extend in the width direction of the first sheet-type wiring, and an end of the first electrode tab may be bent in a direction opposite to an extending direction of the first electrode tab extends, to face the fifth or sixth outer surface of the electrode assembly.

In an embodiment, the bent end of the first electrode tab may be bonded with the first sheet-type wiring.

In an embodiment, the first electrode tab may extend in the width direction of the first sheet-type wiring, and the first sheet-type wiring may include a protrusion which protrudes in the width direction and is bonded with the first electrode tab.

In an embodiment, the protrusion of the first sheet-type wiring may be bent in the thickness direction of the first sheet-type wiring to face the third or fourth outer surface of each of the electrode assemblies, and a bent portion of the protrusion may be bonded with the first electrode tab.

In an embodiment, the end of the first electrode tab may be bent in the thickness direction of the first sheet-type wiring to be bonded with the protrusion of the first sheet-type wiring.

In an embodiment, the first electrode tab may extend in the lengthwise direction of the first sheet-type wiring.

In an embodiment, the first electrode tab may be bonded with the first sheet-type wiring at a location between each of the electrode assemblies and the first sheet type wiring.

In an embodiment, the first electrode tab may include a first portion which faces the first or second outer surface of each of the electrode assemblies, and a second portion which faces the fifth or sixth outer surface of each of the electrode assemblies. In such an embodiment, the second portion of the first electrode tab may be bonded with the first sheet-type wiring.

In an embodiment, the electrode assemblies may include a first electrode assembly and a second electrode assembly, and a first electrode tab of the first electrode assembly may be disposed between the first electrode assembly and the first sheet-type wiring and may be bonded with the first sheet-type wiring at a location between the second electrode assembly and the first sheet-type wiring.

In an embodiment, a first electrode tab of the second electrode assembly may pass between the second electrode assembly and the first sheet-type wiring and may be bonded with an end of the first sheet-type wiring.

In an embodiment, an end of the first electrode tab of the second electrode assembly and the end of the first sheet-type wiring may be bent together.

In an embodiment, the first sheet-type wiring may be bent to face both the fifth outer surface and the sixth outer surface of each of the electrode assemblies, and the first electrode tab may be bonded with a portion of the first sheet-type wiring that faces the fifth outer surface of each of the electrode assemblies.

In an embodiment, the first sheet-type wiring may be bent to face both the fifth outer surface and the sixth outer surface of each of the electrode assemblies, and the first electrode tab may be bonded with a portion of the first sheet-type wiring which faces the sixth outer surface of each of the electrode assemblies.

In an embodiment, a portion of the first sheet-type wiring located between two adjacent electrode assemblies among the electrode assemblies may be bent to face the first or second outer surface of each of the two adjacent electrode assemblies. In such an embodiment, the first electrode tab may be bonded with a portion of the first sheet-type wiring which faces the first or second outer surface of each of the two adjacent electrode assemblies.

In an embodiment, the first electrode tab may extend in the width direction of the first sheet-type wiring. In such an embodiment, an edge of the first sheet-type wiring may protrude farther than an edge of the third or fourth outer surface of each of the electrode assemblies in the width direction of the first sheet-type wiring. In such an embodiment, the first electrode tab may be bonded with the edge of the first sheet-type wiring which protrudes in the width direction.

In an embodiment, the first electrode tab may extend in the lengthwise direction of the first sheet-type wiring and may be bonded with a portion of the first sheet-type wiring between adjacent two electrode assemblies.

In an embodiment, the first electrode plate may include a first current collector and a first active material layer coated on the first current collector, and the first electrode tab may include a first end bonded with the first current collector and a second end bonded with the first sheet-type wiring.

In an embodiment, the first electrode plate may include a first current collector and a first active material layer coated on the first current collector, and the first electrode tab may be integrally formed with the first current collector as a single unitary and indivisible unit.

In an embodiment, the first electrode plate may include a first current collector and a first active material layer coated on the first current collector, and the first sheet-type wiring may be an extended portion of the first current collector of one of the electrode assemblies.

In an embodiment, the complex electrode assembly may further include a first lead tab electrically connected to an end of the first sheet-type wiring; and a sealing member which surrounds a portion of the first lead tab.

In an embodiment, an electrical junction between the first lead tab and the first sheet-type wiring may be defined to face the first or second outer surface of a foremost electrode assembly among the electrode assemblies.

In an embodiment, the complex electrode assembly may further include a sealing member which is disposed between two adjacent electrode assemblies from among the electrode assemblies and surrounds a portion of the first sheet-type wiring.

In an embodiment, a width of the first sheet-type wiring may be less than a width of each of the electrode assemblies, and an edge of the third or fourth outer surface of each of the electrode assemblies may protrude farther than an edge of the first sheet-type wiring in the width direction of the first sheet-type wiring such that the first sheet-type wiring is disposed within a region defined in the width of each of the electrode assemblies.

In an embodiment, a portion of the first sheet-type wiring located between two adjacent electrode assemblies among the electrode assemblies may be repeatedly bent to have a bending portion, and the bending portion may include a first bent portion, a second bent portion, and a ridge portion between the first bent portion and the second bent portion.

In an embodiment, the electrode assemblies may include a first electrode assembly and a second electrode assembly. In such an embodiment, a portion of the first sheet-type wiring between the first bent portion and the ridge portion may face a second outer surface of the first electrode assembly, and a portion of the first sheet-type wiring between the second bent portion and the ridge portion may face a first outer surface of the second electrode assembly.

In an embodiment, a distance between a peak of an outer surface of the ridge portion and an inner bottom surface of each of the first and second bent portions may be in a range of about 80% to about 120% of a thickness of each of the electrode assemblies.

In an embodiment, the ridge portion of the bending portion may include a first ridge portion and a second ridge portion, and the bending portion may further include a valley portion between the first and second ridge portions.

In an embodiment, heights of peaks of respective outer surfaces of the first and second ridge portions may be in a space between planes defined by the fifth outer surface and the sixth outer surface of each of the electrode assemblies.

In an embodiment, a height of an inner bottom surface of the valley portion may be equal to about a height of the inner bottom surface of each of the first and second bent portions.

In an embodiment, the electrode assemblies may include a first electrode assembly and a second electrode assembly, and the first sheet-type wiring may be bent to face a fifth outer surface of the first electrode assembly and to face a sixth outer surface of the second electrode assembly.

In an embodiment, the first sheet-type wiring may include a first surface and a second surface disposed opposite to each other. In such an embodiment, an electrode assembly of the electrode assemblies may be disposed in a way such that their fifth outer surfaces face the second surface of the first sheet-type wiring, and another electrode assembly of the electrode assemblies may be disposed in another way such that their sixth outer surfaces face the first surface of the first sheet-type wiring.

In an embodiment, the complex electrode assembly may further include a fixing member which is attached to each of the electrode assemblies and the first sheet-type wiring to fix the first sheet-type wiring to each of the electrode assemblies.

In an embodiment, the fifth or sixth outer surface of each of the electrode assemblies may be curved about an axis parallel to the width direction of the first sheet-type wiring.

In an embodiment, a center of curvature of the curved fifth or sixth outer surface of each of the electrode assemblies may be outside each of the electrode assemblies.

In an embodiment, a portion of the first sheet-type wiring which faces each of the electrode assemblies may be curved about the axis parallel to the width direction of the first sheet-type wiring.

In an embodiment, the first sheet-type wiring may be curved about the axis parallel to the width direction of the first sheet-type wiring.

In an embodiment, a portion of the curved first sheet-type wiring between two adjacent electrode assemblies among the electrode assemblies may have a higher curvature than another portion of the curved first sheet-type wiring.

In an embodiment, the electrode assemblies may have different sizes from each other.

In an embodiment, the width of the sheet region of the first sheet-type wiring may be about 5 times to about 10000 times the thickness of the sheet region of the first sheet-type wiring.

In an embodiment, the width of the first sheet-type wiring may vary depending on positions in the lengthwise direction thereof.

In an embodiment, a thickness of the first sheet-type wiring may be in a range from 3 micrometers (μm) to about 500 μm.

In an embodiment, the thickness of the first sheet-type wiring may vary depending on positions in the lengthwise direction thereof.

In an embodiment, the first sheet-type wiring may be at an angle to the lengthwise direction thereof.

In an embodiment, the complex electrode assembly may further include a second sheet-type wiring which is disposed adjacent to the first sheet-type wiring, extends in a lengthwise direction of the second sheet-type wiring, and includes a sheet region, a width of which in a direction perpendicular to the lengthwise direction thereof is greater than a thickness in a direction perpendicular to the lengthwise direction and a width direction of the second sheet-type wiring. In such an embodiment, both of the first and second sheet-type wirings may be disposed facing one of the fifth outer surfaces or the sixth outer surfaces of the electrode assemblies.

In an embodiment, each of the electrode assemblies may include a first electrode plate, a second electrode plate, a separator interposed between the first electrode plate and the second electrode plate, a first electrode tab which electrically connects the first electrode plate to the first sheet-type wiring, and a second electrode tab which electrically connects the second electrode plate to the second sheet-type wiring.

In an embodiment, the first electrode tab may be led out from the third outer surface of each of the electrode assemblies, and the second electrode tab may be led out from the fourth outer surface of each of the electrode assemblies.

According to another embodiment of the t invention, an electrochemical device includes the complex electrode assembly described above, and an outer casing which packages the complex electrode assembly.

According to another embodiment of the invention, an electronic apparatus includes the electrochemical device.

BRIEF DESCRIPTION OF THE DRAWINGS

These and/or other features of embodiments of the invention will become apparent and more readily appreciated from the following description of the embodiments, taken in conjunction with the accompanying drawings, in which.

DETAILED DESCRIPTION

Figure 1:
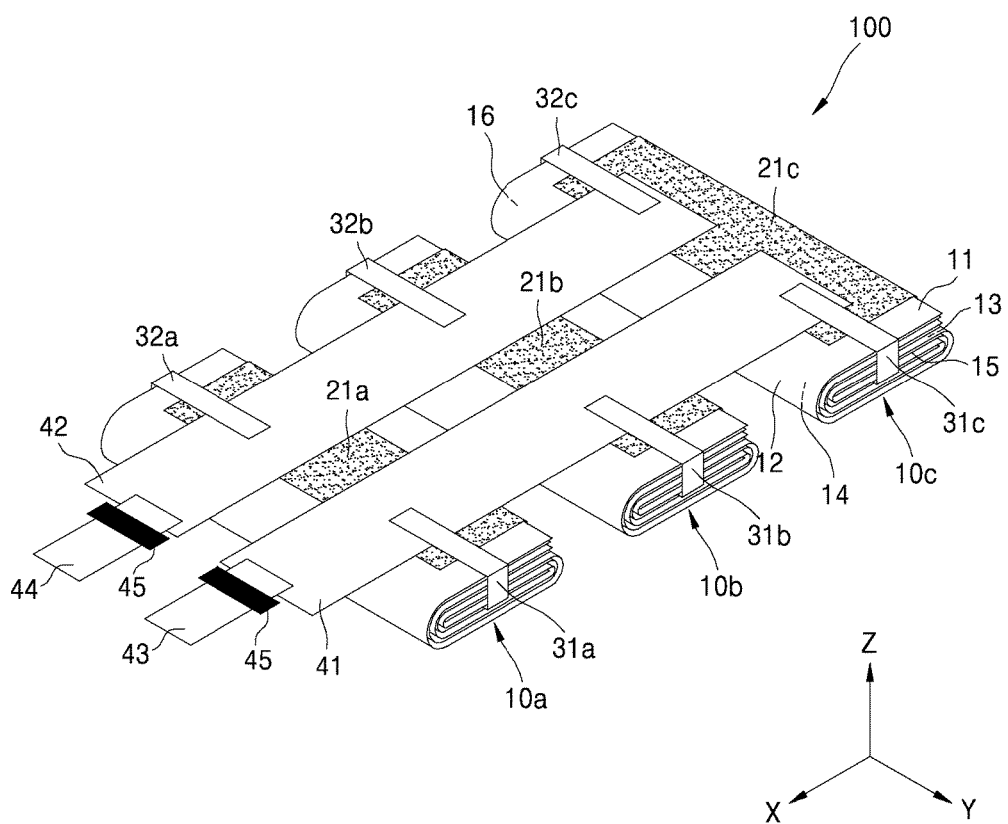
FIG. 1 is a perspective view of a complex electrode assembly according to an embodiment.

Reference will now be made in detail to embodiments, examples of which are illustrated in the accompanying drawings, in which like reference numerals refer to the like elements throughout. In this regard, embodiments described herein may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

Embodiments of a complex electrode assembly including a plurality of electrode assemblies and an electrochemical device including the complex electrode assembly will now be described in detail with reference to the accompanying drawings. Like reference numerals in the drawings denote like elements, and, in the drawings, the sizes of elements may be exaggerated for clarity and for convenience of explanation. In this regard, embodiments described herein may have different forms and should not be construed as being limited to the descriptions set forth herein. It will be understood that when a layer is referred to as being "on" another layer or substrate, it can be directly on the other layer or substrate, or intervening layers may also be present.

FIG. 1 is a perspective view of a complex electrode assembly 100 according to an embodiment. Referring to FIG. 1, an embodiment of the complex electrode assembly 100 may include a plurality of electrode assemblies 10a, 10b and 10c, and first and second sheet-type wirings 41 and 42 each electrically connected to the plurality of electrode assemblies 10a, 10b and 10c. The complex electrode assembly 100 may further include first and second lead tabs 43 and 44 respectively electrically connected to respective ends of the first and second sheet-type wirings 41 and 42. The first and second lead tabs 43 and 44 may connect electrode terminals of an electrochemical device to the first and second sheet-type wirings 41 and 42 when the electrochemical device is manufactured by packaging the complex electrode assembly 100 in an outer casing, such as a pouch.

Sealing members 45 for sealing the complex electrode assembly 100 by being combined with the outer casing may be disposed on middle portions of the first and second lead tabs 43 and 44. The sealing members 45 may include or be formed of a thermoplastic material, for example, polypropylene ("PP"). In an alternative embodiment, the respective ends of the first and second sheet-type wirings 41 and 42 may function as lead tabs, and the first and second lead tabs 43 and 44 may be omitted. In such an embodiment, the sealing members 45 may be disposed to surround the vicinity of the respective ends of the first and second sheet-type wirings 41 and 42.

In an embodiment, as shown in FIG. 1, the complex electrode assembly 100 includes the three electrode assemblies 10a, 10b and, but such embodiments are not limited thereto. The complex electrode assembly 100 may include, for example, two electrode assemblies or more than four electrode assemblies. In an embodiment, the plurality of electrode assemblies 10a, 10b and 10c may be arranged to be spaced apart from one another in a lengthwise direction of the first and second sheet-type wirings 41 and 42, for example, in an x-axis direction. In such an embodiment, the first and second sheet-type wirings 41 and 42 may extend in the same direction as the direction in which the plurality of electrode assemblies 10a, 10b and 10c are arranged, that is, extend in the x-axis direction. An interval between the adjacent electrode assemblies 10a and 10b or 10b and 10c may be, for example, about 0.1 millimeter (mm) or more, and intervals between the plurality of electrode assemblies 10a, 10b and 10c may be substantially the same as or different from each other.

The plurality of electrode assemblies 10a, 10b and 10c may be arranged along the first and second sheet-type wirings 41 and 42 to face the first and second sheet-type wirings 41 and 42. In one embodiment, for example, as illustrated in FIG. 1, the electrode assemblies 10a, 10b and 10c may be arranged in a way such that respective upper surfaces 11 thereof face the first and second sheet-type wirings 41 and 42. Alternatively, the electrode assemblies 10a, 10b and 10c may be arranged in a way such that respective lower surfaces 14 thereof face the first and second sheet-type wirings 41 and 42. The first and second sheet-type wirings 41 and 42 may be arranged in the same direction with respect to the electrode assemblies 10a, 10b, and 10c. In one embodiment, for example, both the first and second sheet-type wirings 41 and 42 may be disposed to face the upper surface 11 of one of the electrode assemblies 10a, 10b and 10c, or both the first and second sheet-type wirings 41 and 42 may be disposed to face the lower surface 14 of one of the electrode assemblies 10a, 10b and 10c. The upper surfaces 11 and the lower surfaces 14 of the electrode assemblies 10a, 10b, and 10c may have substantially equivalent meanings. Accordingly, embodiments where the first and second sheet-type wirings 41 and 42 are disposed to face the upper surfaces 11 of the electrode assemblies 10a, 10b and 10c will be described, but in alternative embodiments, the first and second sheet-type wirings 41 and 42 may be disposed to face the lower surfaces 14 of the electrode assemblies 10a, 10b and 10c.

Figure 2:
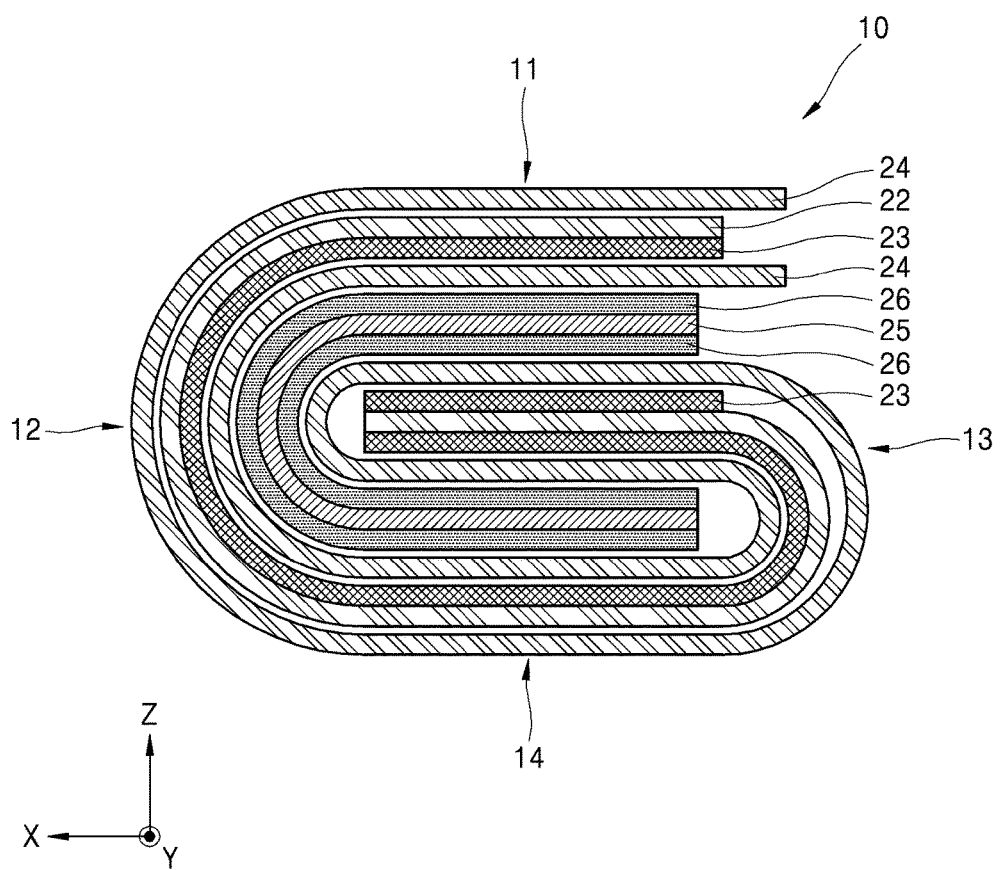
FIG. 2 is a schematic cross-sectional view of an embodiment of an electrode assembly illustrated in FIG. 1.
Figure 3:
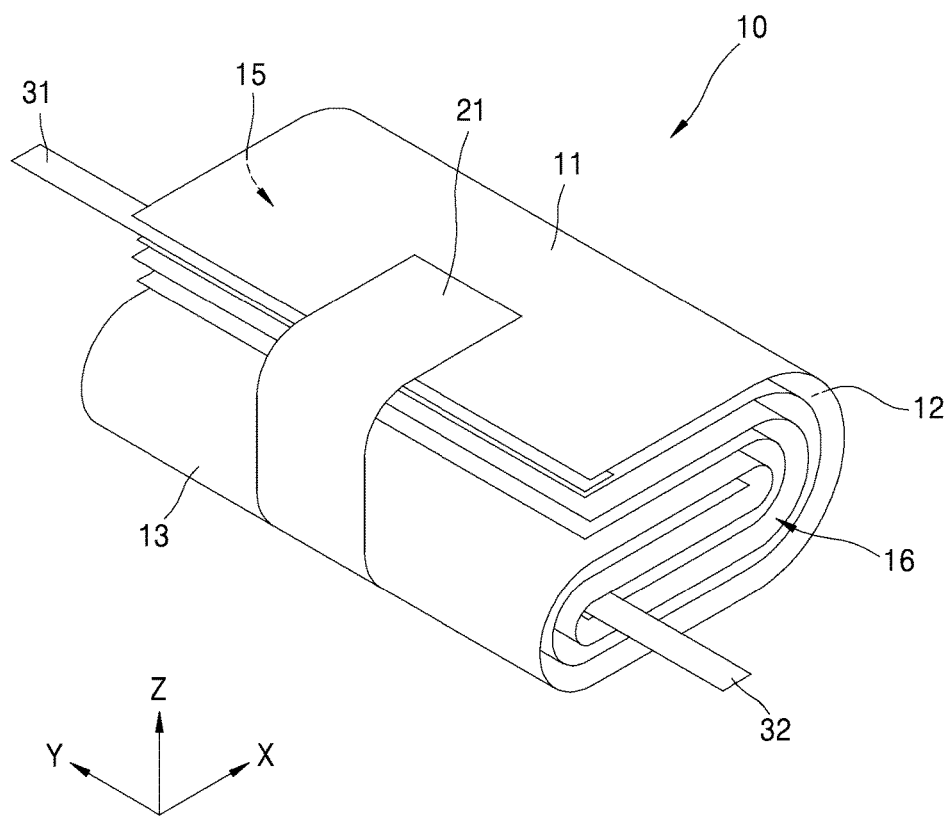
FIG. 3 is a schematic perspective view of an embodiment of an electrode assembly illustrated in FIG. 1.

In an embodiment, the plurality of electrode assemblies 10a, 10b and 10c may be jelly-roll-type electrode assemblies or folded electrode assemblies. FIG. 2 is a cross-sectional view of an embodiment of an electrode assembly 10 of the electrode assemblies 10a, 10b and 10c of FIG. 1, and FIG. 3 is a perspective view of the electrode assembly 10. Referring to FIGS. 2 and 3, an embodiment of the electrode assembly 10 may include a first electrode plate 22 and 23, a second electrode plate 25 and 26, and an insulative separator 24 interposed between the first electrode plate 22 and 23 and the second electrode plate 25 and 26. As illustrated in FIG. 2, the first electrode plate 22 and 23, the second electrode plate 25 and 26, and the separator 24 may be folded to form a folded electrode assembly 10, or the first electrode plate 22 and 23, the second electrode plate 25 and 26, and the separator 24 may be wound several times to form a jelly-roll-type electrode assembly 10. The electrode assembly 10 may further include an insulative tape 21 that is attached to at least a portion of the circumference of the electrode assembly 10 to prevent the first electrode plate 22 and 23, the second electrode plate 25 and 26, and the separator 24 from being unwound or unfolded.

The first electrode plate 22 and 23 of the electrode assembly 10 may include a first current collector 22 and a first active material layer 23 coated on the first current collector 22. The second electrode plate 25 and 26 of the electrode assembly 10 may include a second current collector 25 and a second active material layer 26 coated on the second current collector 25. In one embodiment, for example, the first electrode plate 22 and 23 may be positive electrode plates, and the first active material layer 23 may be formed by mixing a positive active material, a conductive agent, and a binder. In such an embodiment, the second electrode plate 25 and 26 may be negative electrode plates, and the second active material layer 26 may be formed by mixing a negative active material, a conductive agent, and a binder.

The electrode assembly 10 may have a plurality of outer surfaces 11, 12, 13, 14, 15 and 16. In an embodiment, as shown in FIGS. 2 and 3, the outer surfaces 11, 12, 13, 14, 15, and 16 of the electrode assembly 10 may include first and second side surfaces 12 and 13 including regions perpendicular to the x-axis direction, third and fourth side surfaces 15 and 16 that are opposite to each other and have regions perpendicular to a y-axis direction, and an upper surface 11 and a lower surface 14 each including a region perpendicular to a z-axis direction. The y-axis may be a direction substantially the same as a bending axis or a winding axis. In the wound or folded electrode assembly 10, as illustrated in FIG. 2, the first side surface 12, a portion of the second side surface 13, the upper surface 11 and the lower surface 14 may be defined by the outer surface of the separator 24. The first side surface 12 and the second side surface 13 may be opposite to each other between the upper surface 11 and the lower surface 14 and may be convexly curved. Accordingly, the vicinity of respective center portions of the first side surface 12 and the second side surface 13 may be perpendicular to the x-axis direction. The first side surface 12 may be oriented in a +x-axis direction, and the second side surface 13 may be oriented in a −x-axis direction. In such embodiment, the first side surface 12 and the second side surface 13 may face each other in the x-axis direction. An interval between the electrode assemblies 10a, 10b and 10c may be defined as a distance between a vertex of the convex second side surface 13 of one electrode assembly 10a, 10b or 10c, and a vertex of the convex first side surface 12 of the electrode assembly 10a, 10b or 10c, which is adjacent thereto.

The third side surface 15 may be oriented in a +y-axis direction, and the fourth side surface 16 may be oriented in a −y-axis direction. In other words, the third side surface 15 and the fourth side surface 16 may face each other in the y-axis direction. Edges of the first electrode plate 22 and 23, the separator 24, and the second electrode plate 25 and 26 may be partially exposed via the third side surface 15 and the fourth side surface 16. Thus, each of the third and fourth side surfaces 15 and 16 is not a single smooth surface but is a virtual surface obtained by connecting the edges of the first electrode plate 22 and 23, the separator 24, and the second electrode plate 25 and 26. Some portions of the virtual surface may be substantially perpendicular to the y-axis direction. Alternatively, the edges of the first electrode plate 22 and 23, the separator 24, and the second electrode plate 25 and 26 may be covered by the insulative tape 21, and some portions of the insulative tape 21 may be substantially perpendicular to the y-axis direction.

The upper surface 11 and the lower surface 14 may face each other in a z-axis direction. The wound or folded electrode assembly 10 may be manufactured into a flat square-shaped electrode assembly by pressing on the upper surface 11 and the lower surface 14. Thus, the upper surface 11 oriented in a +z-axis direction and the lower surface 14 oriented in a −z-axis direction may substantially have flat shapes. Accordingly, an interval between the whole areas of the upper surface 11 and the lower surface 14 may be substantially constant. The upper surface 11 and the lower surface 14 may be overall parallel to the first electrode plate 22 and 23, the separator 24, and the second electrode plate 25 and 26, which are interposed therebetween. However, in such an embodiment, the entire areas of the upper and lower surfaces 11 and 14 may not be completely-flat planes that are perpendicular to the z-axis direction, and the upper and lower surfaces 11 and 14 may have slight curvatures such that only some areas thereof are perpendicular to the z-axis direction.

By forming the upper and lower surfaces 11 and 14 to be substantially or overall flat and arranging the first electrode plate 22 and 23, the separator 24, and the second electrode plate 25 and 26 to be overall parallel to the upper and lower surfaces 11 and 14, inner spaces of the electrode assembly 10 may be effectively reduced even when a plurality of electrode assemblies 10 are disposed adjacent to each other. Thus, the complex electrode assembly 100 may have a high energy density. To maximize the energy density of the complex electrode assembly 100, the upper and lower surfaces 11 and 14 may be wider than the first and second side surfaces 12 and 13 or the third and fourth side surfaces 15 and 16. In such an embodiment, by disposing the sheet-type wirings 41 and 42 to face the overall flat upper and lower surfaces 11 and 14, space occupied by the sheet-type wirings 41 and 42 may be substantially reduced, and thus the complex electrode assembly 100 may have a high energy density.

The electrode assembly 10 may further include a first electrode tab 31 that electrically connects the first electrode plate 22 and 23 to the first sheet-type wiring 41, and a second electrode tab 32 that electrically connects the second electrode plate 25 and 26 to the second sheet-type wiring 42. As illustrated in FIG. 3, the first electrode tab 31 and the second electrode tab 32 may extend from the side surfaces 15 and 16 of the electrode assembly 10, respectively, in the y-axis direction. In one embodiment, for example, the first electrode tab 31 may be led out from the third side surface 15 and extend in the +y-axis direction, and the second electrode tab 32 may be led out from the fourth side surface 16 and extend in the −y-axis direction. The first electrode tab 31 may be bonded with an active material non-coated portion of the first current collector 22 or may be an extended portion of the first current collector 22, which extends from the active material non-coated portion thereof. The second electrode tab 32 may be bonded with an active material non-coated portion of the second current collector 25 or may be an extended portion of the second current collector 25, which extends from the active material non-coated portion thereof.

Referring back to FIG. 1, in an embodiment, the first electrode tabs 31a, 31b and 31c of the plurality of electrode assemblies 10a, 10b and 10c may be electrically connected to the first sheet-type wiring 41, and the second electrode tabs 32a, 32b and 32c thereof may be electrically connected to the second sheet-type wiring 42. In such an embodiment, some portions of the first electrode tabs 31a, 31b and 31c, and portions of the second electrode tabs 32a, 32b and 32c may be bent about 180° in an opposite direction to the lead out direction to face the upper surfaces 11 of the electrode assemblies 10a, 10b and 10c. In an embodiment, the first electrode tabs 31a, 31b and 31c and the second electrode tabs 32a, 32b and 32c may immediately start bending at the positions where they are led out, and may be bent up to about 180°, such that distances by which the first electrode tabs 31a, 31b and 31c, and the second electrode tabs 32a, 32b and 32c extend from the actual leading-out positions in the +y-axis and −y-axis directions, respectively, may be about zero (0).

In one embodiment, for example, portions of the first electrode tabs 31a, 31b and 31c may be bonded with the first sheet-type wiring 41, and portions of the second electrode tabs 32a, 32b and 32c may be bonded with the second sheet-type wiring 42. Consequently, in such an embodiment, the first sheet-type wiring 41 is electrically connected to the first electrode plate 22 and 23 of the electrode assemblies 10a, 10b and 10c via the first electrode tabs 31a, 31b and 31c, and the second sheet-type wiring 42 is electrically connected to the second electrode plate 25 and 26 of the electrode assemblies 10a, 10b and 10c via the second electrode tabs 32a, 32b and 32c. Thus, the electrode assemblies 10a, 10b and 10c may be electrically connected to each other in parallel by the first and second sheet-type wirings 41 and 42. The bonding of the first electrode tabs 31a, 31b and 31c with the first sheet-type wiring 41 and the bonding of the second electrode tabs 32a, 32b and 32c with the second sheet-type wiring 42 may be performed via, for example, welding, soldering, conductive adhesion, compression, riveting, or pressurized contact.

As illustrated in FIG. 1, tapes 21a, 21b and 21c that fixes the electrode assemblies 10a, 10b and 10c may have widths that are substantially the same as those of the electrode assemblies 10a, 10b and 10c, and may cover substantially the entire areas of the upper surfaces 11 of the electrode assemblies 10a, 10b and 10c. Thus, the tapes 21a, 21b and 21c may effectively prevent direct electrical contact between the first and second sheet-type wirings 41 and 42 and the electrode assemblies 10a, 10b and 10c.

In an embodiment, the upper surfaces 11 of the electrode assemblies 101, 10b and 10c may be covered by the separators 24. Thus, the separators 24 may effectively prevent direct electrical contact between the first and second sheet-type wirings 41 and 42 and the electrode assemblies 10a, 10b and 10c. The tapes 21a, 21b and 21c may be bonded with the separators 24 on the upper surfaces 11 of the electrode assemblies 10a, 10b and 10c, and thus direct electrical contact between the first and second sheet-type wirings 41 and 42 and the electrode assemblies 10a, 10b and 10c may be effectively prevented.

In an embodiment, the first and second sheet-type wirings 41 and 42 may not only electrically connect the plurality of electrode assemblies 10a, 10b and 10c to each other but also may function as supports. In such an embodiment, the first and second sheet-type wirings 41 and 42 may have higher strengths than the first and second current collectors 22 and 25 to function as the supports. In such an embodiment, where the plurality of electrode assemblies 10a, 10b, and 10c are electrically connected to the first and second sheet-type wirings 41 and 42, electric resistances per unit length of the first and second sheet-type wirings 41 and 42 may be less than those of the first electrode tabs 31a, 31b and 31c, and the second electrode tabs 32a, 32b and 32c.

The first and second sheet-type wirings 41 and 42 may include at least one metal selected from, for example, aluminum, copper, nickel, titanium, tantalum, niobium, stainless steel, and an alloy thereof. In an embodiment, each of the first and second sheet-type wirings 41 and 42 may include or be formed of a single metal layer, but not being limited thereto. In an alternative embodiment, each of the first and second sheet-type wirings 41 and 42 may be formed by boning at least two metal layers together or by tying a plurality of metal fibers together. Each of the first and second sheet-type wirings 41 and 42 may be porous or have a pattern such as a mesh shape.

When each of the first and second sheet-type wirings 41 and 42 is formed by bonding a plurality of metal sheets together, bonding between the metal sheets may occur only in some regions of the first and second sheet-type wirings 41 and 42 so that the first and second sheet-type wirings 41 and 42 are easily bent. In one embodiment, for example, junctions between the metal sheets of an electrode assembly may be located in some regions of the first and second sheet-type wirings 41 and 42 that face an adjacent electrode assembly of the plurality of electrode assemblies 10a, 10b and 10c, and bonding between the metal sheets may not occur in the areas between the plurality of electrode assemblies 10a, 10b and 10c where the first and second sheet-type wirings 41 and 42 are bent. In an embodiment, a length of a junction section between metal sheets may be about 1 mm or greater to secure a sufficient durability and a sufficient electric conductivity of the first and second sheet-type wirings 41 and 42.

The first and second sheet-type wirings 41 and 42 may function as supports and also may be flexible to be easily bent. When the first and second sheet-type wirings 41 and 42 are excessively thin, the first and second sheet-type wirings 41 and 42 may not effectively function as supports and may be damaged due to the lack of a mechanical strength. Thus, manufacturing the complex electrode assembly 100 may not be easy. When the first and second sheet-type wirings 41 and 42 are excessively thick, durability against repetitive bending and a sufficient flexibility may not be secured. Accordingly, in an embodiment, the first and second sheet-type wirings 41 and 42 may have an average thickness in a range of, for example, about 3 μm to about 500 μm, or about 5 μm to about 300 μm.

The first and second sheet-type wirings 41 and 42 may include a conductor including a flat sheet-shaped area of which a width is greatly larger than a thickness. In one embodiment, for example, widths of the first and second sheet-type wirings 41 and 42 may be larger than thicknesses thereof by about 5 to about 10,000 times. When the widths of the first and second sheet-type wirings 41 and 42 are excessively small, the conductivities thereof decrease, and thus electrical loss may be increased and heat may be generated. Accordingly, the thicknesses of the first and second sheet-type wirings 41 and 42 are increased to secure sufficient conductivity.

However, when the thicknesses of the first and second sheet-type wirings 41 and 42 are increased, a sufficient flexibility is not secured, and the energy density of an electrochemical device including the complex electrode assembly 100 may be decreased. Thus, the utility of the electrochemical device degrades. When the widths of the first and second sheet-type wirings 41 and 42 are excessively increased compared to the thicknesses thereof, it may be difficult to support the plurality of electrode assemblies 10a, 10b and 10c, the first and second sheet-type wirings 41 and 42 may be easily damaged, and the energy density of the electrochemical device of the complex electrode assembly 100 may be decreased.

In an embodiment the relatively large areas and relatively small thicknesses of the sheet-type wirings 41 and 42 may function to disperse and transmit a pressure applied to between the upper and lower portions of the complex electrode assembly 100 to the upper surfaces 11 or the lower surfaces 14 of the electrode assemblies 10a, 10b and 10c. Accordingly, in such an embodiment, a damage of the electrode assemblies 10a, 10b, and 10c or short-circuiting therein due to external pressure concentrically applied to only some portions of the electrode assemblies 10a, 10b, and 10c may be effectively prevented. Therefore, the complex electrode assembly 100 may normally operate even within the internal environment of the electrochemical device where electrolyte and the sheet-type wirings 41 and 42 directly contact with each other. In such an embodiment of the complex electrode assembly 100 having the above-described structure, the plurality of electrode assemblies 10a, 10b and 10c are electrically connected to each other by the first and second sheet-type wirings 41 and 42, the complex electrode assembly 100 may have durability against repetitive bending, and have a high electrical and mechanical reliability.

In an embodiment, as described above, the two sheet-type wirings 41 and 42 face the upper surfaces 11 or the lower surfaces 14 of the electrode assemblies 10a, 10b and 10c. However, in some alternative embodiments, only one of the sheet-type wirings 41 and 42 may face the upper surfaces 11 or the lower surfaces 14 of the electrode assemblies 10a, 10b and 10c. In such embodiments, the other sheet-type wiring 41 or 42 may be disposed not facing the upper surfaces 11 or the lower surfaces 14 of the electrode assemblies 10a, 10b and 10c, or may be disposed outside the electrochemical device and not within the package of the electrochemical device.

Figure 4:
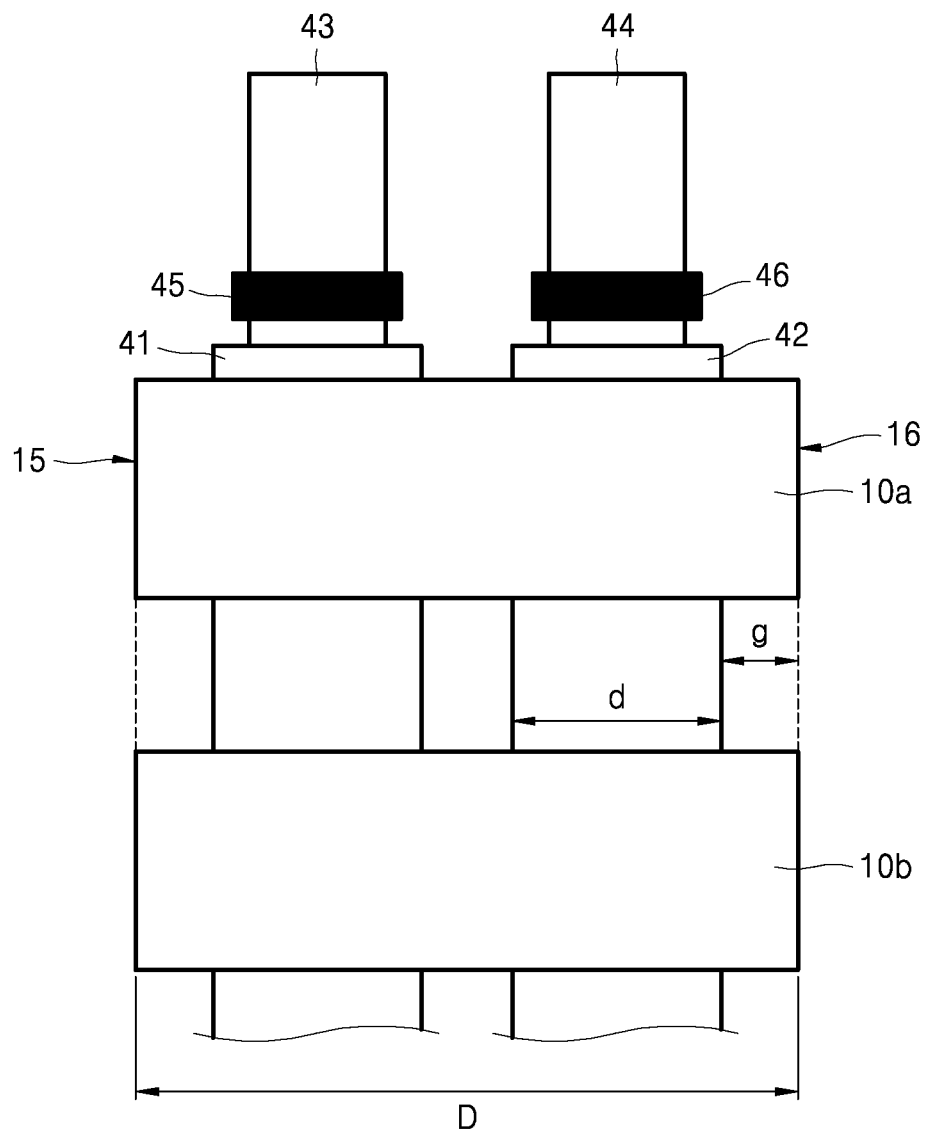
FIG. 4 is a plan view schematically illustrating a relationship between the positions of electrode assemblies and the positions of sheet-type wirings in the complex electrode assembly illustrated in FIG. 1.

In an embodiment, the complex electrode assembly 100 has a structure that allows the volume thereof to be effectively minimized such that the complex electrode assembly 100 may have a high energy density. FIG. 4 is a plan view illustrating a relationship between a position of each of the electrode assemblies 10a and 10b and a position of each of the first and second sheet-type wirings 41 and 42 in the complex electrode assembly 100 of FIG. 1. Referring to FIG. 4, a width d of each of the first and second sheet-type wirings 41 and 42 may be less than a width D of each of the electrode assemblies 10a and 10b. In an embodiment, a sum 2d of the widths d of the first and second sheet-type wirings 41 and 42 may be less than the width D of each of the electrode assemblies 10a and 10b. Thus, both the first and second sheet-type wirings 41 and 42 may be arranged within the width D of each of the electrode assemblies 10a and 10b. In such an embodiment, the edge of the third side surface 15 of each of the electrode assemblies 10a and 10b may protrude by a distance g from the edge of the first sheet-type wiring 41 in the +y-axis direction, and the edge of the fourth side surface 16 of each of the electrode assemblies 10a and 10b may protrude by the distance g from the edge of the second sheet-type wiring 42 in the −y-axis direction such that the first sheet-type wiring 41 may be disposed within a region defined in the width of each of the electrode assemblies 10a and 10b. Thus, volume increase in the width direction of the complex electrode assembly 100 is effectively prevented and a waste of space is thereby substantially minimized, and accordingly the complex electrode assembly 100 may have a high energy density. When the electrode assemblies 10a and 10b are manufactured in a flat square shape, since the first sheet-type wiring 41 and the second sheet-type wiring 42 are disposed to face the upper surfaces 11 of the electrode assemblies 10a and 10b, the thickness of the complex electrode assembly 100 in the z-axis direction is not substantially increased. Thus, a waste of space may be reduced, and accordingly the energy density of the complex electrode assembly 100 may be increased.

Figure 5:
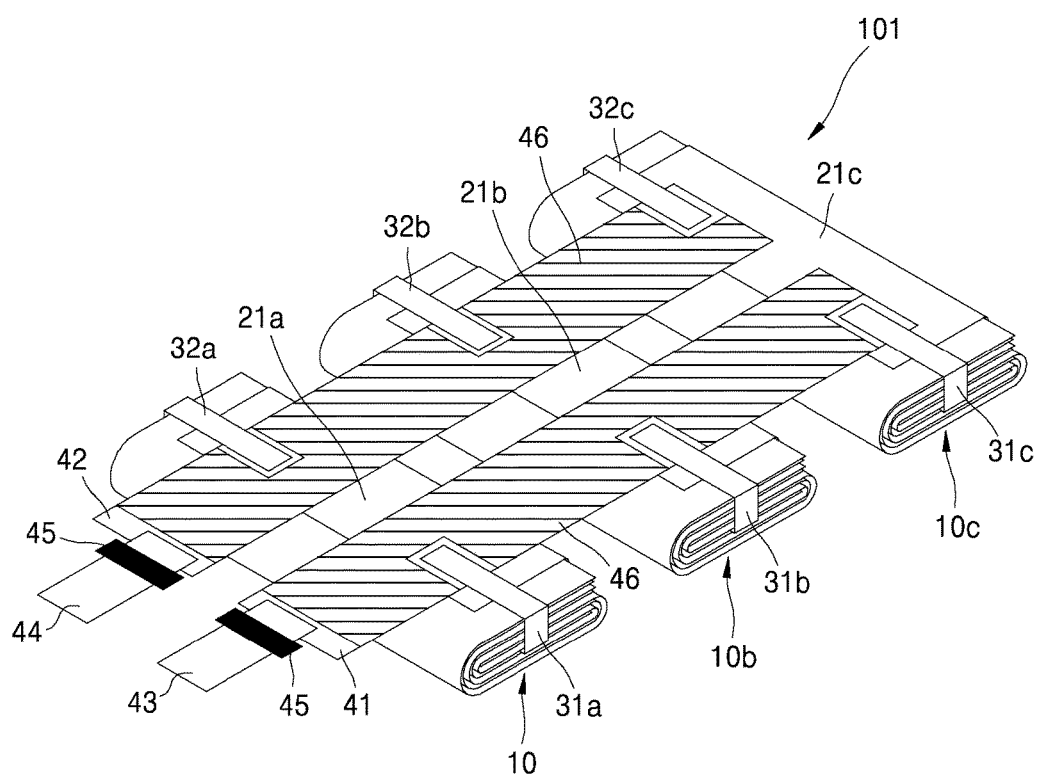
FIG. 5 is a perspective view of a complex electrode assembly according to another embodiment.

FIG. 5 is a perspective view of a complex electrode assembly 101 according to another embodiment. The complex electrode assembly 101 shown in FIG. 5 is substantially the same as the complex electrode assembly 100 of FIG. 1, except that the complex electrode assembly 101 of FIG. 5 further includes insulation layers 46 disposed on outer surfaces of the first and second sheet-type wirings 41 and 42. The insulation layers 46 may be disposed on at least some portions of the outer surfaces of the first and second sheet-type wirings 41 and 42 except for portions of the outer surfaces of the first and second sheet-type wirings 41 and 42 that are electrically connected to the first electrode tabs 31a, 31b and 31c, and the second electrode tabs 32a, 32b and 32c. The insulation layers 46 may effectively prevent short-circuiting from occurring due to exposure of the first and second sheet-type wirings 41 and 42 to the outside. The insulation layers 46 may include or be formed of a polymer film to reinforce the strengths of the first and second sheet-type wirings 41 and 42 to increase the reliability and durability of the complex electrode assembly 101.

Figure 6:
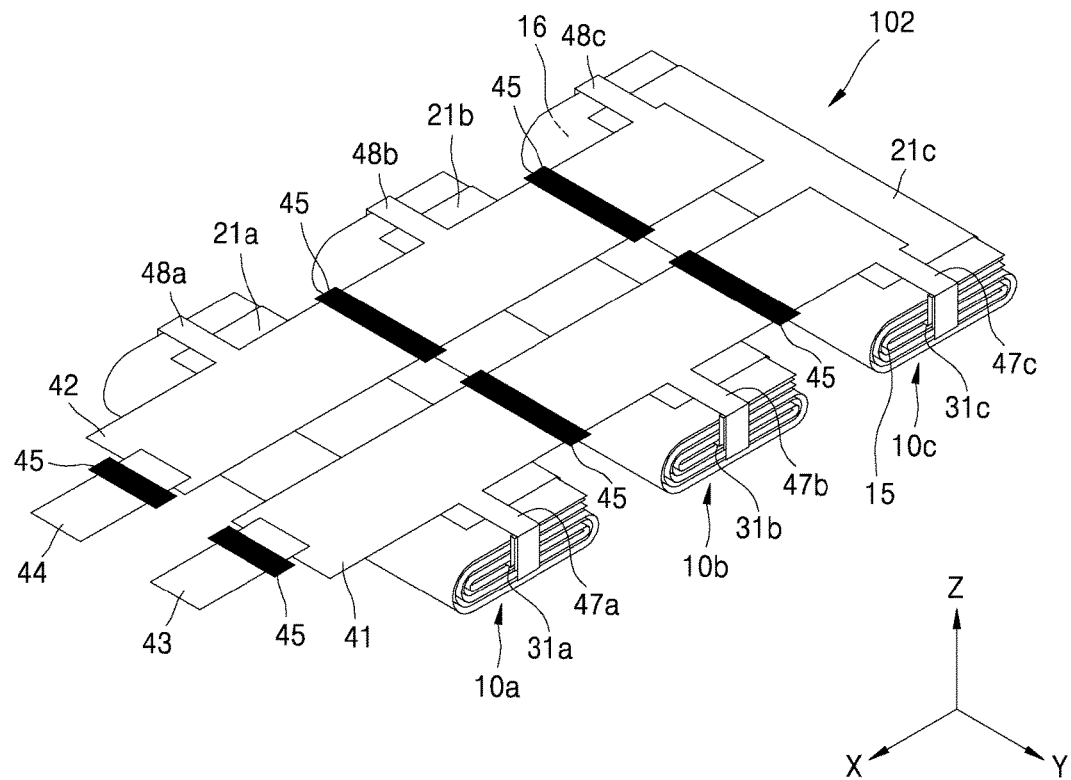
FIG. 6 is a perspective view of a complex electrode assembly according to another embodiment.

FIG. 6 is a perspective view of a complex electrode assembly 102 according to another embodiment. Referring to FIG. 6, in an embodiment, a first sheet-type wiring 41 of the complex electrode assembly 102 may include a plurality of first protrusions 47a, 47b and 47c which protrude in the +y-axis direction from a main portion of the first sheet-type wiring 41. The main portion of the first sheet-type wiring 41 may be disposed within the region defined in the width of each of the electrode assemblies 10a, 10b and 10c, and the plurality of first protrusions 47a, 47b and 47c may protrude out of the region defined in the width of each of the electrode assemblies 10a, 10b and 10c. The first protrusions 47a, 47b and 47c of the first sheet-type wiring 41 may be bonded with the first electrode tabs 31a, 31b and 31c that are led out from the third side surfaces 15 of the electrode assemblies 10a, 10b, and 10c and extend in the +y-axis direction. In such an embodiment, the second sheet-type wiring 42 of the complex electrode assembly 102 may include a plurality of second protrusions 48a, 48b and 48c which protrude in the −y-axis direction. The second protrusions 48a, 48b and 48c of the second sheet-type wiring 42 may be bonded with the second electrode tabs 32a, 32b and 32c that are led out from the fourth side surfaces 16 of the electrode assemblies 10a, 10b and 10c and extend in the −y-axis direction. The first protrusions 47a, 47b and 47c may be bent in the −z-axis direction to be bonded with the first electrode tabs 31a, 31b and 31c, and the second protrusions 48a, 48b and 48c may be bent in the −z-axis direction to be bonded with the second electrode tabs 32a, 32b and 32c.

Figure 7:
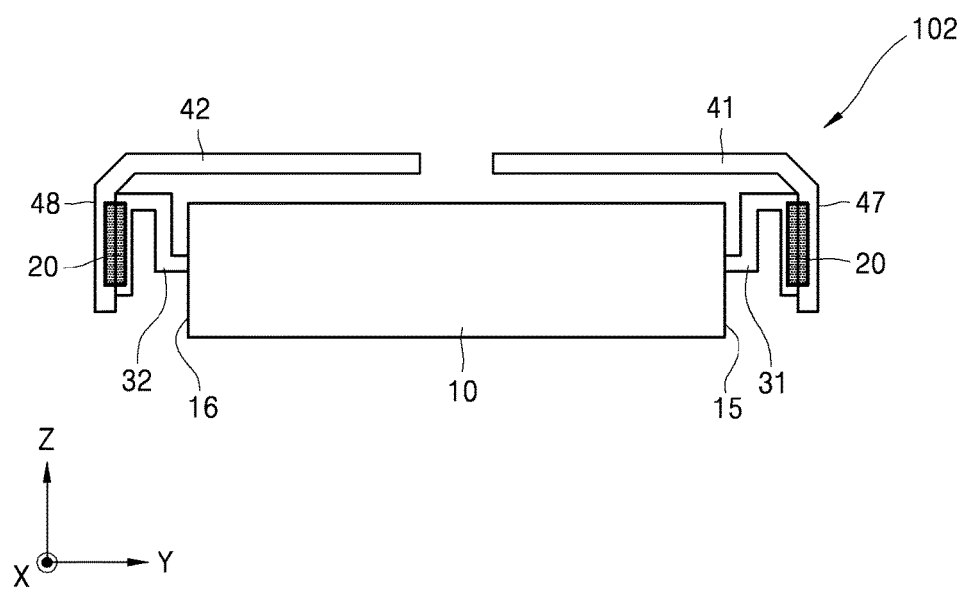
FIG. 7 is a schematic cross-sectional view of the complex electrode assembly of FIG. 6.

FIG. 7 is a schematic cross-sectional view of the complex electrode assembly 102 of FIG. 6. Referring to FIG. 7, both a portion of a first protrusion 47 and a portion of a first electrode tab 31 may be bonded with each other by being bent together in the −z-axis direction, and a portion of a second protrusion 48 and a portion of a second electrode tab 32 may also be bonded with each other by being bent together in the −z-axis direction. Accordingly, in such an embodiment, junctions 20 respectively facing a third side surface 15 and a fourth side surface 16 of an electrode assembly 10 may be defined by the bonded portion of the first protrusion 47 and the first electrode tab 31 and the bonded portion of the second protrusion 48 and the second electrode tab 32. In such an embodiment, the first and second electrode tabs 31 and 32 may be first bent in the +z-axis direction and then bent again in the −z-axis direction. In one embodiment, for example, after being bent in the +z-axis direction, the first electrode tab 31 may be bent about 90° in the +y-axis direction and then may be bonded with the first protrusion 47. Thereafter, the first electrode tab 31 and the first protrusion 47 bonded with each other may be bent together in the −z-axis direction. Similarly, after being bent in the +z-axis direction, the second electrode tab 32 may be bent about 90° in the −y-axis direction and then may be bonded with the second protrusion 48. Thereafter, the second electrode tab 32 and the second protrusion 48 bonded with each other may be bent together in the −z-axis direction.

As illustrated in FIG. 6, a plurality of sealing members 45 may also be formed on the first and second sheet-type wirings 41 and 42. In one embodiment, for example, the sealing members 45 may be disposed between the electrode assemblies 10a, 10b and 10c. In such an embodiment, the sealing members 45 may be disposed to surround some portions of the first and second sheet-type wirings 41 and 42 that face the regions between the electrode assemblies 10a, 10b and 10c. The sealing members 45 may be disposed in the complex electrode assemblies 100 or 101.

Figure 8A:
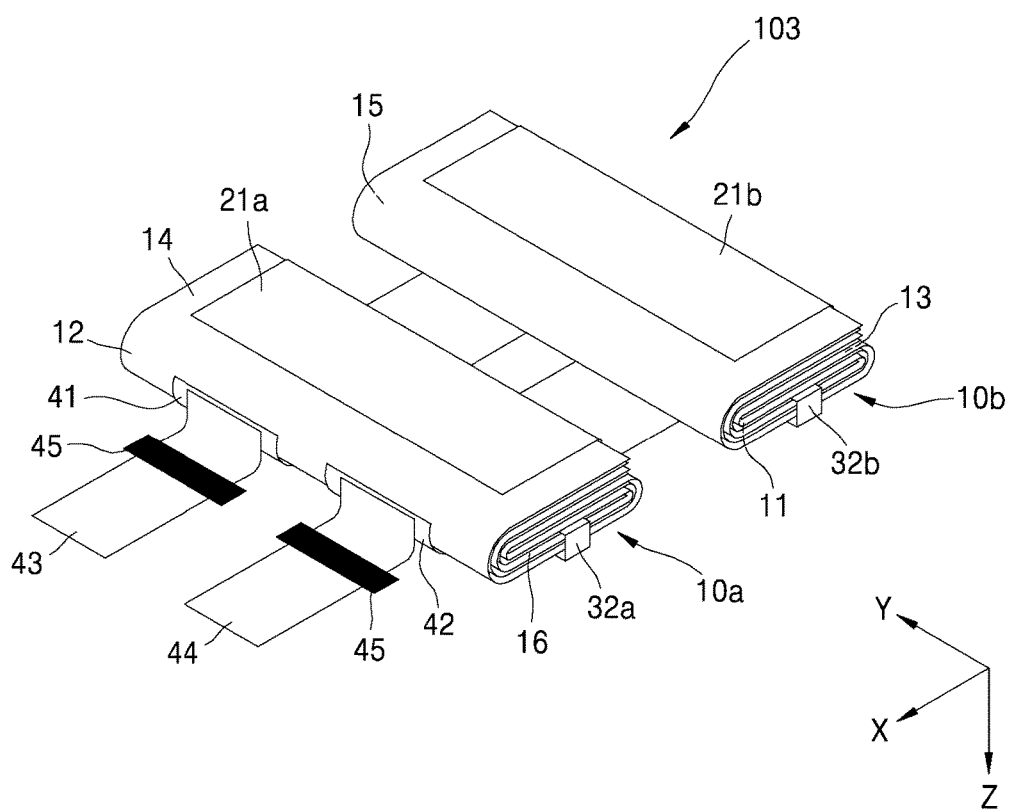
FIG. 8A is a perspective view of a complex electrode assembly according to another embodiment.

FIG. 8A is a perspective view of a complex electrode assembly 103 according to another embodiment. For convenience, upper and lower sides of the complex electrode assembly 103 are turned upside down in FIG. 8A. Referring to FIG. 8A, an electrical junction portion between the first lead tab 43 and the first sheet-type wiring 41 may be disposed to face the first side surface 12 of the first electrode assembly 10a, which is foremost among the plurality of electrode assemblies 10a and 10b. In such an embodiment, an electrical junction portion between the second lead tab 44 and the second sheet-type wiring 42 may be disposed to face the first side surface 12 of the first electrode assembly 10a. In one embodiment, for example, after portions of the first and second sheet-type wirings 41 and 42 are respectively bonded with ends of the first and second lead tabs 43 and 44, the first and second sheet-type wirings 41 and 42 and the first and second lead tabs 43 and 44 may be bent so that junction portions face the first side surface 12 of the first electrode assembly 10a.

Figure 8B:
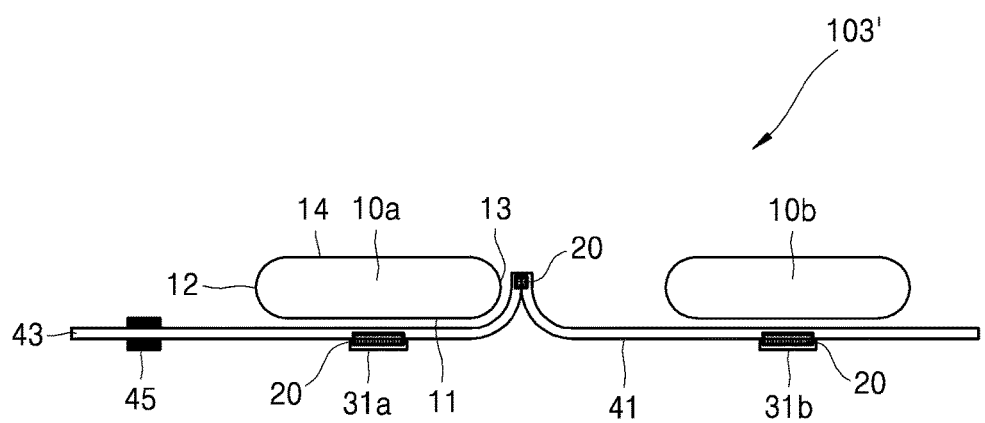
FIG. 8B is a cross-sectional view of a complex electrode assembly according to another embodiment.

FIG. 8B is a schematic cross-sectional view of a complex electrode assembly 103' according to another embodiment. Referring to FIG. 8B, in an embodiment, an electrical junction portion between the first lead tab 43 and the first sheet-type wiring 41 may be disposed to face the second side surface 13 of the first electrode assembly 10a. In such an embodiment, an end of the first sheet-type wiring 41 may be located between the first electrode assembly 10a and the second electrode assembly 10b and may be bent to face the second side surface 13 of the first electrode assembly 10a. The first lead tab 43 may extend over the upper surface 11 of the first electrode assembly 10a and part of the second side surface 13. An end of the first lead tab 43 may be bent to face the second side surface 13 of the first electrode assembly 10a and may be bonded with the end of the first sheet-type wiring 41. Accordingly, junctions 20 facing the second side surface 13 of the first and second electrode assemblies 10a and 10b may be further defined. Although only the first lead tab 43 and the first sheet-type wiring 41 are illustrated in FIG. 8B for convenience of illustration, in such an embodiment, an electrical junction portion between the second lead tab 44 and the second sheet-type wiring 42 may be disposed to face the second side surface 13 of the first electrode assembly 10a. In such an embodiment, one of the electrical junction portion between the first lead tab 43 and the first sheet-type wiring 41 and the electrical junction between the second lead tab 44 and the second sheet-type wiring 42 may face the first side surface 12 of the first electrode assembly 10a, and the other of the electrical junction portion between the first lead tab 43 and the first sheet-type wiring 41 and the electrical junction between the second lead tab 44 and the second sheet-type wiring 42 may face the second side surface 13 of the first electrode assembly 10a.

Figure 9:
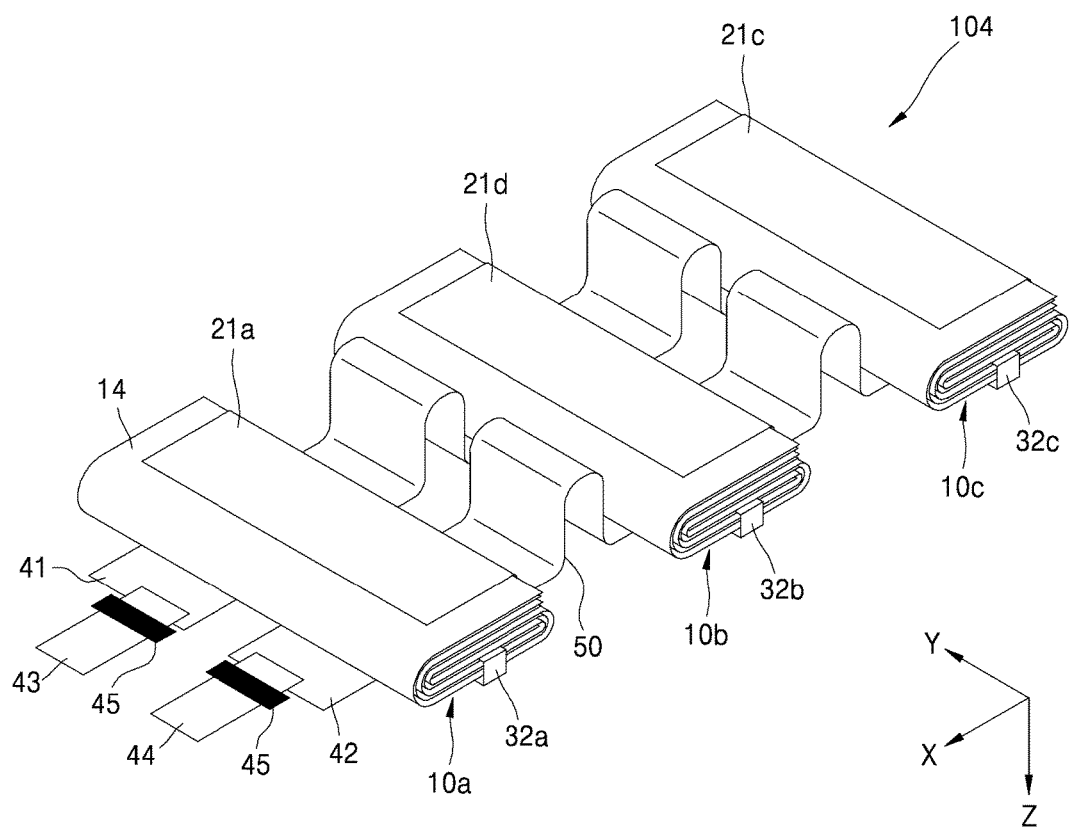
FIG. 9 is a perspective view of a complex electrode assembly according to another embodiment.

FIG. 9 is a perspective view of a complex electrode assembly 104 according to another embodiment. Referring to FIG. 9, in an embodiment, some portions of the first and second sheet-type wirings 41 and 42 between the first and second electrode assemblies 10a and 10b and some portions thereof between the second and third electrode assemblies 10b and 10c may be bent to define bending portions 50. In one embodiment, for example, portions of the first and second sheet-type wirings 41 and 42 between two adjacent electrode assemblies among the plurality of electrode assemblies 10a, 10b and 10c may be bent once in the −z-axis direction, then bent again in the +z-axis direction, which is about 180° from the −z-axis direction, and then bent again in the x-axis direction, thereby defining a bending portion 50. Thus, each bending portion 50 may be located between the first side surface 12 and the second side surface 13 of the two adjacent electrode assemblies among the electrode assemblies 10a, 10b, and 10c. The shape of the complex electrode assembly 104 of FIG. 9 may be a shape of the complex electrode assembly 104 when the complex electrode assembly 104 is packaged within an electrochemical device. Accordingly, after the electrochemical device is manufactured in a way such that no bending portions 50 are defined in the first and second sheet-type wirings 41 and 42, the bending portions 50 may be formed in the first and second sheet-type wirings 41 and 42 by applying a force from the outside of the electrochemical device to deform the complex electrode assembly 104 positioned therein.

Figure 10:
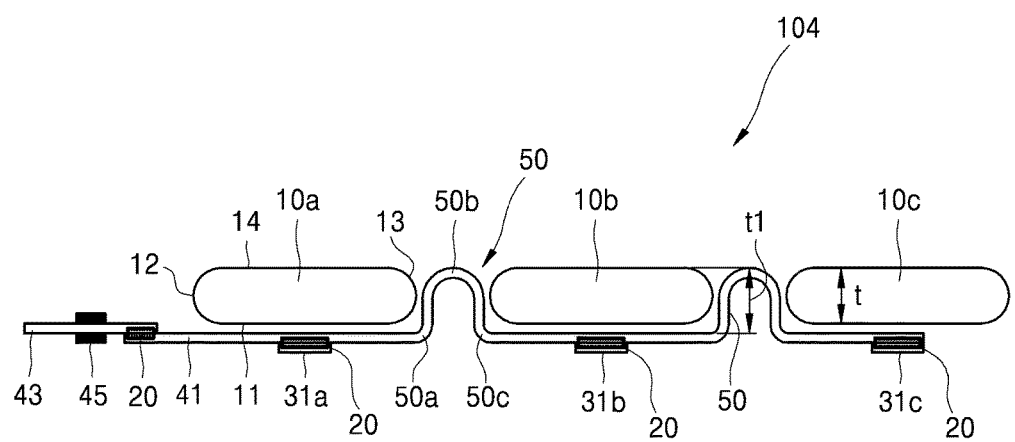
FIG. 10 is a schematic cross-sectional view of the complex electrode assembly of FIG. 9.

FIG. 10 is a schematic cross-sectional view of the complex electrode assembly 104 of FIG. 9. Referring to FIG. 10, in an embodiment, a bending portion 50 may include a first bent portion 50a, a second bent portion 50c, and a ridge portion 50b. The first bent portion 50a is a portion of each of the first and second sheet-type wirings 41 and 42 that is bent about 90° at a location facing a boundary between the upper surface 11 and the second side surface 13 of each of the electrode assemblies 10a, 10b, and 10c. The second bent portion 50c is a portion of each of the first and second sheet-type wirings 41 and 42 that is bent about 90° at a location facing a boundary between the upper surface 11 and the first side surface 12 of each of the electrode assemblies 10a, 10b and 10c. The ridge portion 50b is placed between the first bent portion 50a and the second bent portion 50c. At the ridge portion 50b, the first and second sheet-type wirings 41 and 42 may be bent about 180° to form a gentle curve. Portions of the first and second sheet-type wirings 41 and 42 between the first bent portions 50a and the ridge portions 50b may face the second side surfaces 13 of the electrode assemblies 10a, 10b and 10c, and portions of the first and second sheet-type wirings 41 and 42 between the second bent portions 50c and the ridge portions 50b may face the first side surfaces 12 of the electrode assemblies 10a, 10b and 10c.

As illustrated in FIG. 10, a peak of an outer surface of the ridge portion 50b may be at substantially the same height (i.e., a position in the thickness direction of each electrode assembly) as the lower surface 14 of each of the electrode assemblies 10a, 10b and 10c. In such an embodiment, slight gaps may exist between the upper surfaces 11 of the electrode assemblies 10a, 10b and 10c, and the first and second sheet-type wirings 41 and 42. In such an embodiment, a distance t1 from the peak of the outer surface of the ridge portion 50b to an inner bottom surface of each of the first and second bent portions 50a and 50c may be larger than a thickness t of each of the electrode assemblies 10a, 10b and 10c. When the upper surfaces 11 of the electrode assemblies 10a, 10b and 10c almost adhere to the first and second sheet-type wirings 41 and 42, the distance t1 from the peak of the outer surface of the ridge portion 50b to the inner bottom surface of each of the first and second bent portion 50a and 50c may be substantially the same as the thickness t of each of the electrode assemblies 10a, 10b and 10c. In one embodiment, for example, the distance t1 from the peak of the outer surface of the ridge portion 50b to the inner bottom surface of each of the first and second bent portions 50a and 50c may be about 80% to about 120% of the thickness t of each of the electrode assemblies 10a, 10b, and 10c.

Figure 11:
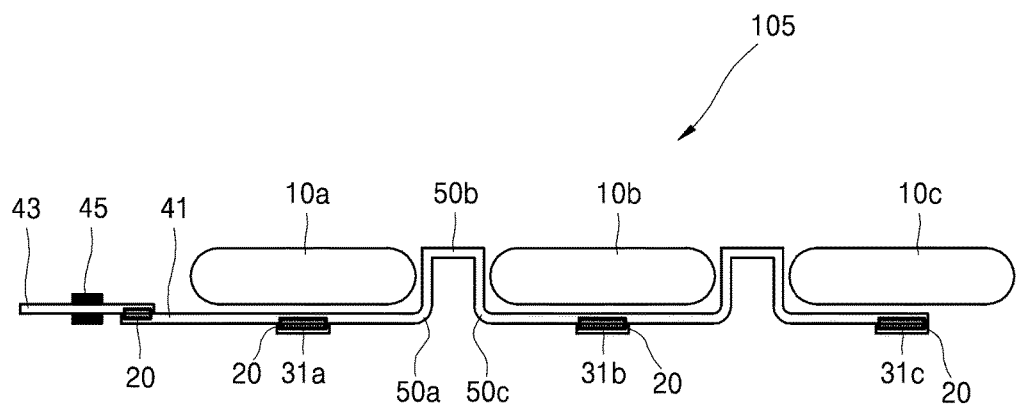
FIG. 11 is a cross-sectional view of a complex electrode assembly according to another embodiment.

FIG. 11 is a schematic cross-sectional view of a complex electrode assembly 105 according to another embodiment. In an embodiment, as described above with reference to FIGS. 9 and 10, the bending portion 50 of the complex electrode assembly 104 has the ridge portion 50b having a curve shape. In an alternative embodiment, as illustrated in FIG. 11, a bending portion 50 of the complex electrode assembly 105 may have a flat ridge portion 50b. In such an embodiment, a first sheet-type wiring 41 may be bent about 90° at both edges of the flat ridge portion 50b. Although only the first sheet-type wiring 41 is illustrated in FIG. 11, a second sheet-type wiring 42 may also have the same shape as the first sheet-type wiring 41. Alternatively, the first sheet-type wiring 41 and the second sheet-type wiring 42 may have different shapes. In one embodiment, for example, only one of the first sheet-type wiring 41 and the second sheet-type wiring 42 may have the bending portion 50, or the first sheet-type wiring 41 and the second sheet-type wiring 42 may have bending portions 50 having different shapes.

Figure 12:
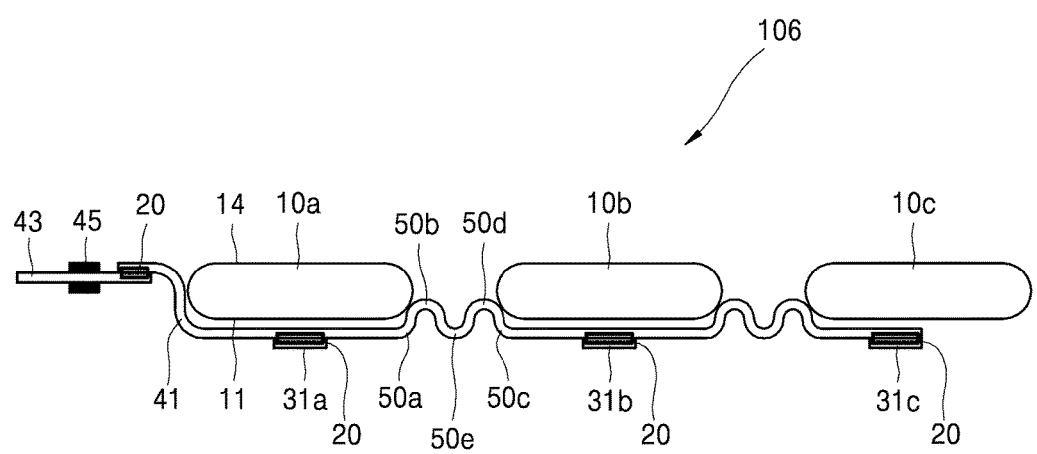
FIGS. 12 and 13 are a cross-sectional view and a perspective view, respectively, of a complex electrode assembly according to another embodiment.
Figure 13:
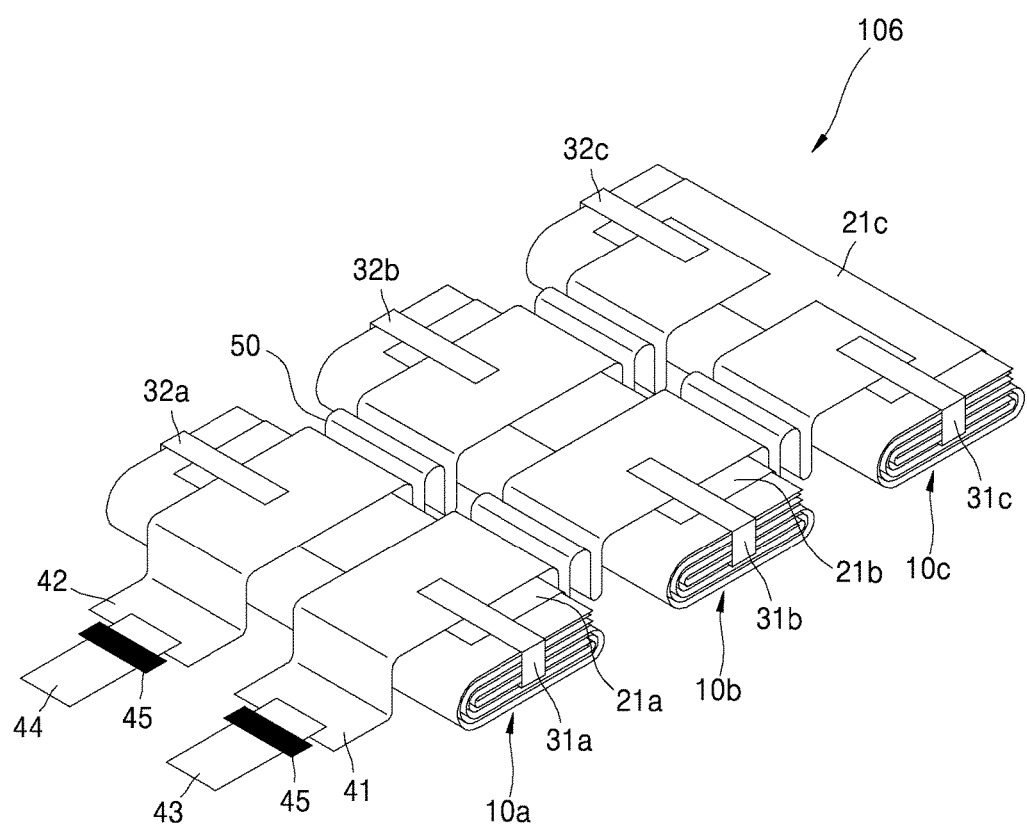

FIGS. 12 and 13 are a cross-sectional view and a perspective view, respectively, of a complex electrode assembly 106 according to another embodiment. Referring to FIGS. 12 and 13, in an embodiment, a bending portion 50 of each of the first and second sheet-type wirings 41 and 42 that is located between two adjacent electrode assemblies among the electrode assemblies 10a, 10b and 10c may have a plurality of ridge portions, for example, first and second ridge portions 50b and 50d. In one embodiment, for example, the bending portion 50 may include the first ridge portion 50b and the second ridge portion 50d formed between a first bent portion 50a and a second bent portion 50c, and a valley portion 50e formed between the first ridge portion 50b and the second ridge portion 50d. FIGS. 12 and 13 illustrate two ridge portions, namely, the first and second ridge portions 50b and 50d, and one valley portion 50e, but not being limited thereto. In an alternative embodiment, the bending portion 50 may have a wrinkle shape having a plurality of ridge portions and a plurality of valley portions.

As illustrated in FIGS. 12 and 13, the inner bottom surface of the valley portion 50e may be on substantially the same height (i.e., a position in the thickness direction of each electrode assembly) as the inner bottom surface of each of the first and second bent portions 50a and 50c. However, embodiments are not limited thereto. In some alternative embodiments, the inner bottom surface of the valley portion 50e may be on a different height than the inner bottom surface of each of the first and second bent portions 50a and 50c. In such an embodiment, the plurality of ridge portions 50b and 50d are formed, such that flexibility may be further secured. Thus, a height difference between the peaks of the outer surfaces of the first and second ridge portions 50b and 50d and the inner bottom surfaces of the first and second bent portion 50a and 50c may not be large. In one embodiment, for example, the heights of the peaks of the outer surfaces of the first and second ridge portions 50b and 50d may be in a space between planes defined by the upper surfaces 11 and the lower surfaces 14 of the electrode assemblies 10a, 10b and 10c. In an embodiment, the heights of the outer surfaces of the first and second ridge portions 50b and 50d are substantially the same as each other as in FIGS. 12 and 13, but embodiments are not limited thereto. In an alternative embodiment, the peaks of the outer surfaces of the first and second ridge portions 50b and 50d may have different heights from each other.

Figure 14:
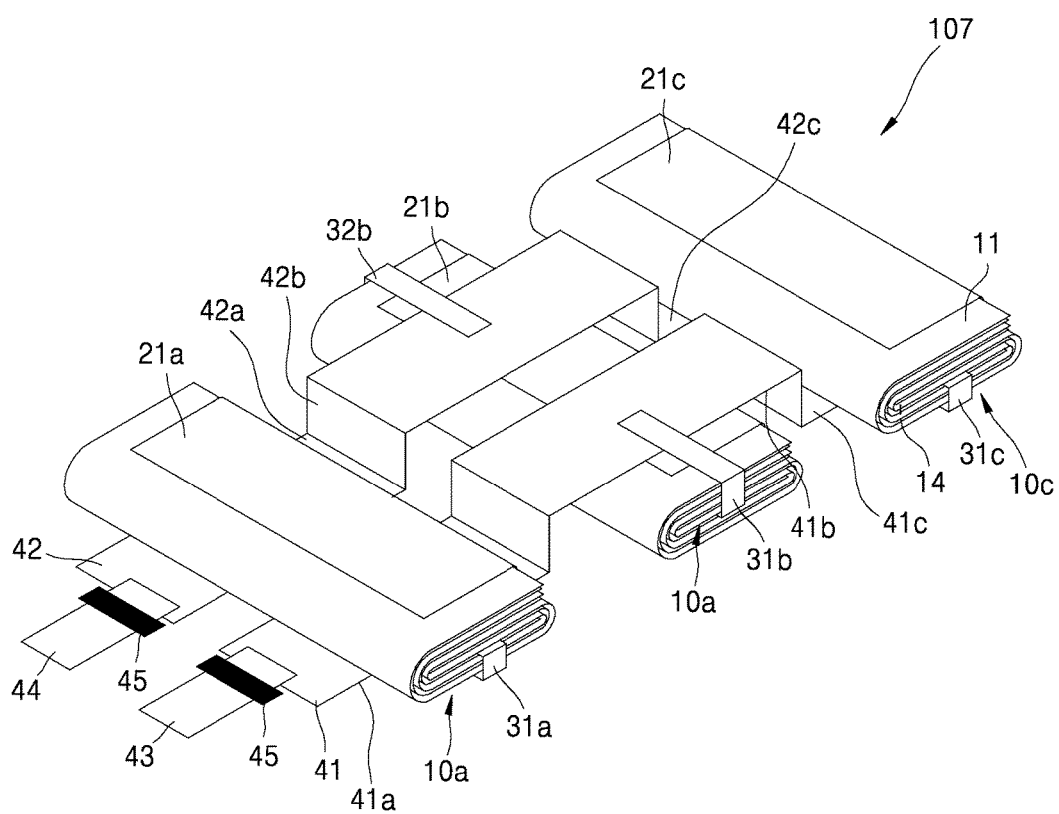
FIG. 14 is a perspective view of a complex electrode assembly according to another embodiment.

FIG. 14 is a perspective view of a complex electrode assembly 107 according to another embodiment. Referring to FIG. 14, in an embodiment, the first and second sheet-type wirings 41 and 42 are repeatedly bent to alternately face the lower surfaces 14 and the upper surfaces 11 of the electrode assemblies 10a, 10b and 10c. In one embodiment, for example, first portions 41a and 42a of the first and second sheet-type wirings 41 and 42 may face the lower surface 14 of the first electrode assembly 10a, second portions 41b and 42b thereof may face the upper surface 11 of the second electrode assembly 10b, and third portions 41c and 42c thereof may face the lower surface 14 of the third electrode assembly 10c. In such an embodiment, the first and second sheet-type wirings 41 and 42 may be bent between the first portions 41a and 42a and the second portions 41b and 42b and may be bent again between the second portions 41b and 42b and the third portions 41c and 42c. In such an embodiment, the first and second electrode tabs 31a and 32a of the first electrode assembly 10a may be bent toward the lower surface 14 thereof to be bonded with the first portions 41a and 42a of the first and second sheet-type wirings 41 and 42, and the first and second electrode tabs 31c and 32c of the third electrode assembly 10c may also be bent toward the lower surface 14 thereof to be bonded with the third portions 41c and 42c of the first and second sheet-type wirings 41 and 42. In such an embodiment, the first and second electrode tabs 31b and 32b of the second electrode assembly 10b may be bent toward the upper surface 11 thereof to be bonded with the second portions 41b and 42b of the first and second sheet-type wirings 41 and 42.

Figure 15:
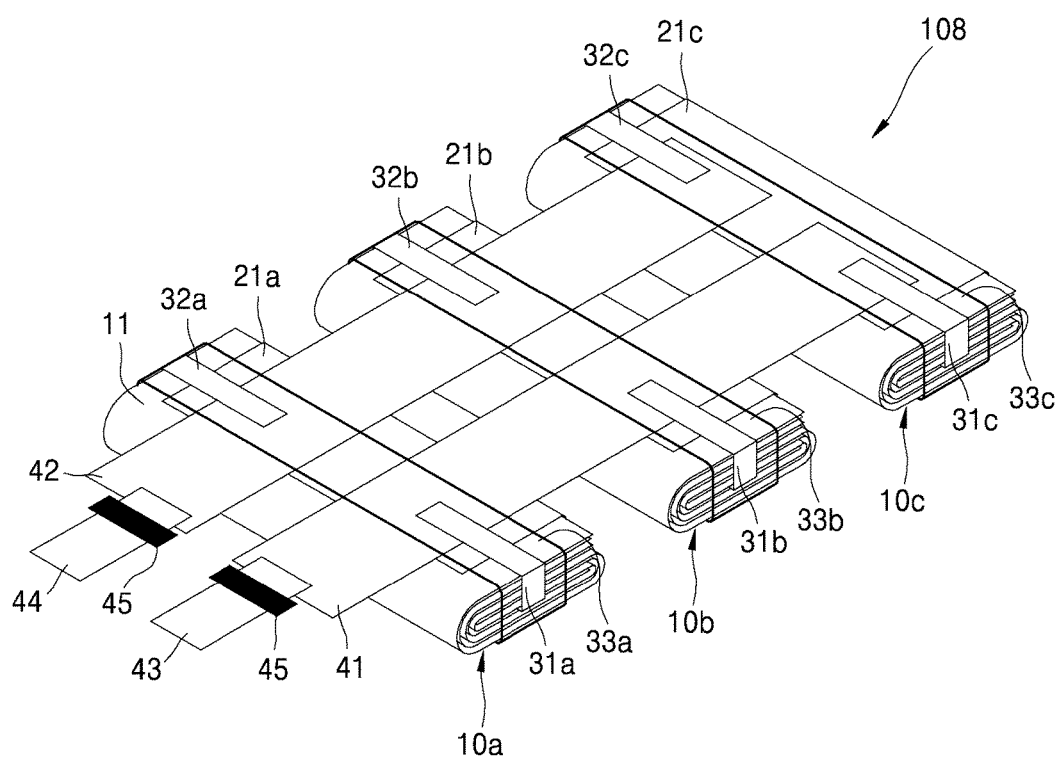
FIG. 15 is a perspective view of a complex electrode assembly according to another embodiment.

FIG. 15 is a perspective view of a complex electrode assembly 108 according to another embodiment. Referring to FIG. 15, in an embodiment, the complex electrode assembly 108 may include a plurality of fixing members 33a, 33b, and 33c that fixes the first and second sheet-type wirings 41 and 42 to the electrode assemblies 10a, 10b and 10c, respectively. The fixing members 33a, 33b and 33c may include, for example, a first fixing member 33a surrounding the first electrode assembly 10a together with the first and second sheet-type wirings 41 and 42, a second fixing member 33b surrounding the second electrode assembly 10b together with the first and second sheet-type wirings 41 and 42, and a third fixing member 33c surrounding the third electrode assembly 10c together with the first and second sheet-type wirings 41 and 42. In an embodiment, the fixing members 33a, 33b, and 33c completely surround the respective circumferences of the electrode assemblies 10a, 10b and 10c as shown in FIG. 15, but not being limited thereto. In an alternative embodiment, the fixing members 33a, 33b and 33c may be disposed on some portions of the respective circumferences of the electrode assemblies 10a, 10b and 10c. In one embodiment, the fixing members 33a, 33b and 33c may be, for example, adhesive tapes. In such an embodiment, the fixing members 33a, 33b and 33c may be attached to only the upper surfaces 11 of the electrode assemblies 10a, 10b and 10c to cover the first and second sheet-type wirings 41 and 42. In one alternative embodiment, for example, the fixing members 33a, 33b and 33c may be dual-sided adhesive tapes. In such an embodiment, the fixing members 33a, 33b and 33c may be attached between the first and second sheet-type wirings 41 and 42 and the upper surfaces 11 of the electrode assemblies 10a, 10b and 10c.

Figure 16:
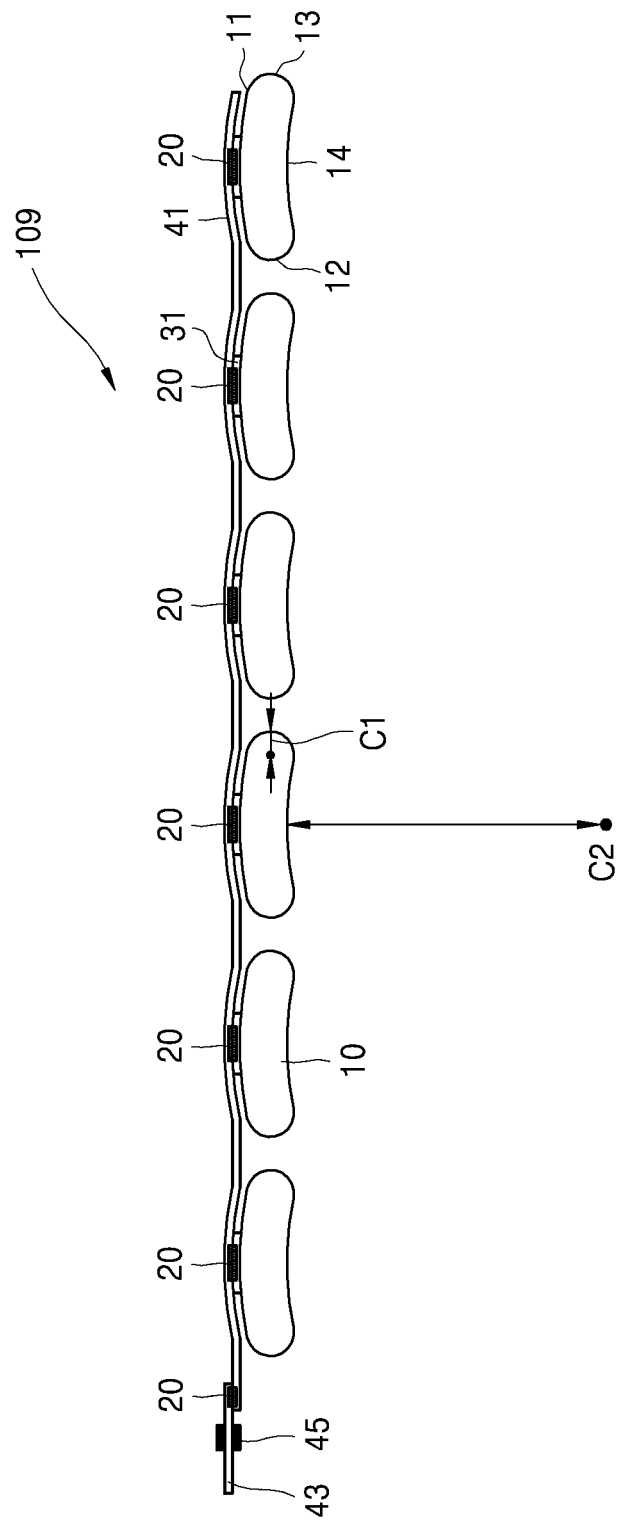
FIGS. 16 and 17 are schematic cross-sectional views of a complex electrode assembly according to another embodiment.
Figure 17:
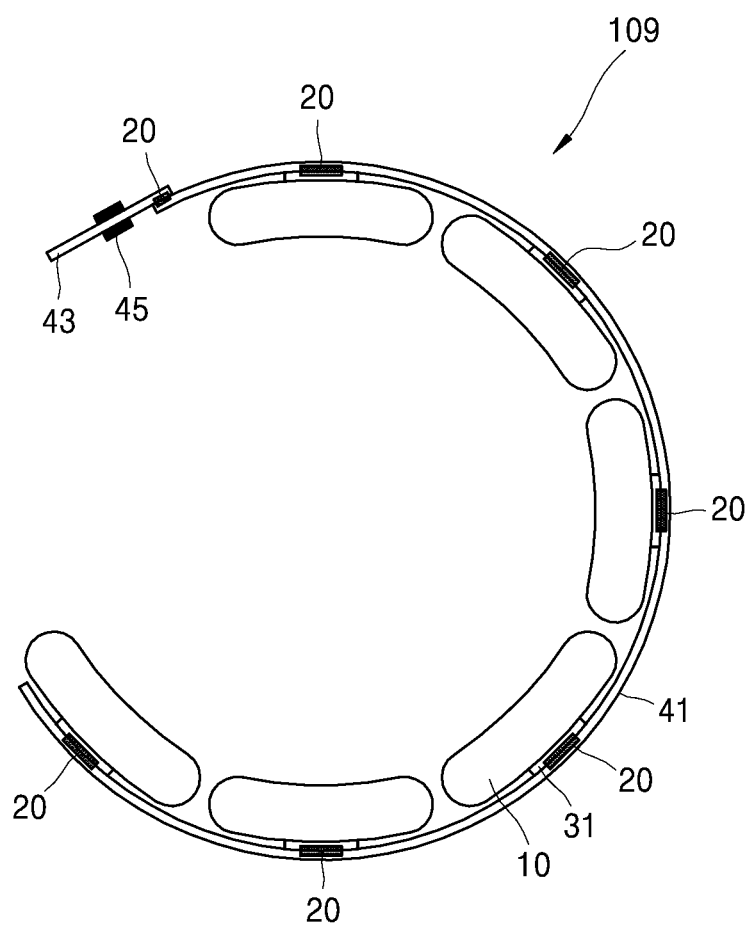

FIGS. 16 and 17 are schematic cross-sectional views of a complex electrode assembly 109 according to another embodiment. Referring to FIG. 16, in an embodiment, the complex electrode assembly 109 may include a plurality of electrode assemblies 10 that are curved about an axis that is parallel to a width direction of each electrode assembly 10 (i.e., the y-axis direction). In one embodiment, for example, when the first and second sheet-type wirings 41 and 42 are disposed to face the upper surfaces 11 of the electrode assemblies 10, the lower surfaces 14 of the electrode assemblies 10 may be curved concavely, and the upper surfaces 11 thereof may be convexly curved. On the other hand, when the first and second sheet-type wirings 41 and 42 are disposed to face the lower surfaces 14 of the electrode assemblies 10, the upper surfaces 11 of the electrode assemblies 10 may be curved concavely, and the lower surfaces 14 thereof may be convexly curved. Some respective portions of the first and second sheet-type wirings 41 and 42 that face the plurality of electrode assemblies 10, respectively, may also be curved to correspond to the curvature of the plurality of electrode assemblies 10. The curved electrode assemblies 10 may be obtained by compressing the electrode assemblies 10 by using, for example, curve-shaped equipment.

The curved upper surfaces 11 and the curved lower surfaces 14 may not have high curvatures. In one embodiment, for example, radii of curvature of the curved upper surfaces 11 and the curved lower surfaces 14 of the electrode assemblies 10 may be larger than those of the first side surfaces 12 and the second side surfaces 13 thereof. As illustrated in FIG. 16, centers of curvature C1 of the first side surfaces 12 and the second side surfaces 13 may be within the electrode assemblies 10, whereas centers of curvature C2 of the upper surfaces 11 and the lower surfaces 14 may be outside the electrode assemblies 10. In one embodiment, for example, the radii of curvature of the bent upper surfaces 11 and the bent lower surfaces 14 may be each greater than about 5 mm. In an embodiment, the electrode assemblies 10 may be manufactured to be flexible to vary in accordance with external pressure such that the curve shapes of the upper surfaces 11 and the lower surfaces 14 may vary.

Thus, the complex electrode assembly 109 may be included in a flexibly foldable electrochemical device and a flexible electronic apparatus using the flexibly foldable electrochemical device to be implemented, and may be included in curved electronic apparatuses. In one embodiment, for example, as illustrated in FIG. 17, the complex electrode assembly 109 may be bent to have substantially a circular shape by curving the first and second sheet-type wirings 41 and 42 about the axis that is parallel to the width direction (i.e., the y-axis direction) of each electrode assembly. In an embodiment, as shown in FIG. 17, the complex electrode assembly 109 may be bent in a way such that the electrode assemblies 10 face the center of the circle. In an alternative embodiment, the complex electrode assembly 109 may be bent in a way such that the electrode assemblies 10 face the outside of the circle. In an embodiment, each of the first and second sheet-type wirings 41 and 42 has a radius of curvature that is approximately constant in the lengthwise direction thereof, as shown in FIG. 17, but not being limited thereto. In an alternative embodiment, a portion of each of the first and second sheet-type wirings 41 and 42 between every two adjacent electrode assemblies 10 may have a larger radius of curvature than the other portions thereof. In such embodiments, electrical connection portions between the electrode assemblies 10 and the first and second sheet-type wirings 41 and 42, namely, junction portions between the first and second electrode tabs 31 and 32 and the first and second sheet-type wirings 41 and 42, are not greatly deformed to thereby increase the durability of the electrical connection portions. The shape of the complex electrode assembly 109 of FIG. 17 may be a shape of the complex electrode assembly 109 when the complex electrode assembly 104 is packaged within an electrochemical device. In other words, the shape of the complex electrode assembly 109 as illustrated in FIG. 17 may be obtained by manufacturing the electrochemical device by using the complex electrode assembly 100 having the shape of FIG. 1 and then deforming the complex electrode assembly 100 located within the electrochemical device by using a force received from the outside of the electrochemical device.

Figure 18:
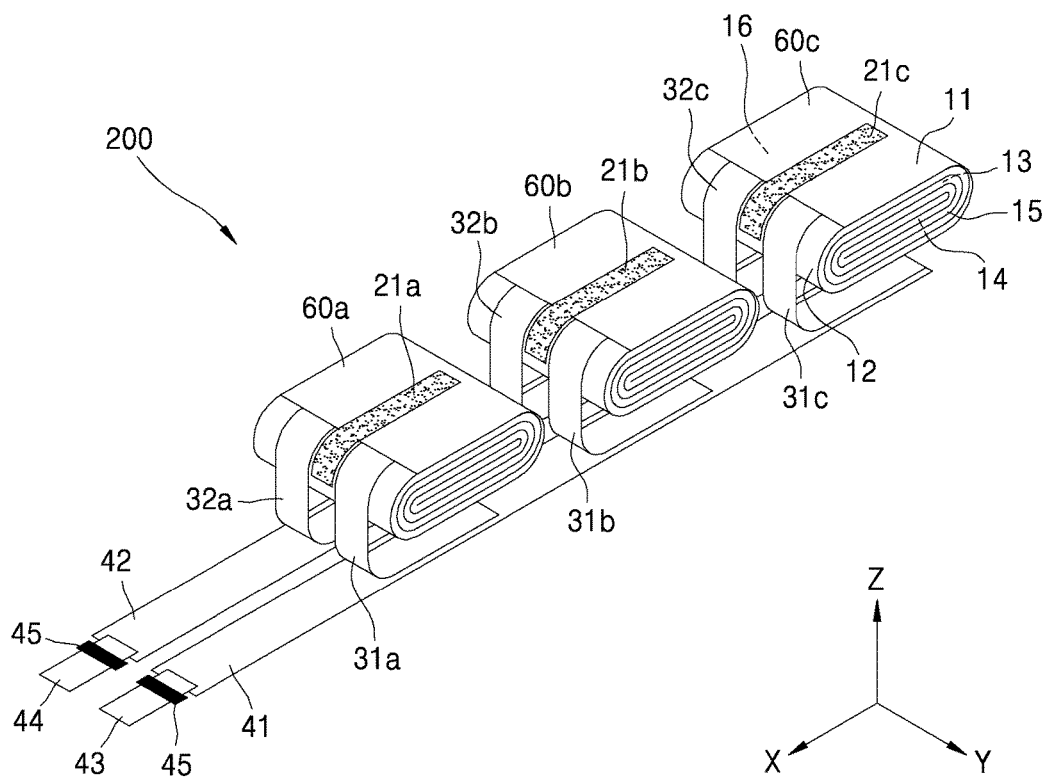
FIGS. 18 and 19 are a perspective view and a cross-sectional view, respectively, of a complex electrode assembly according to another embodiment.
Figure 19:
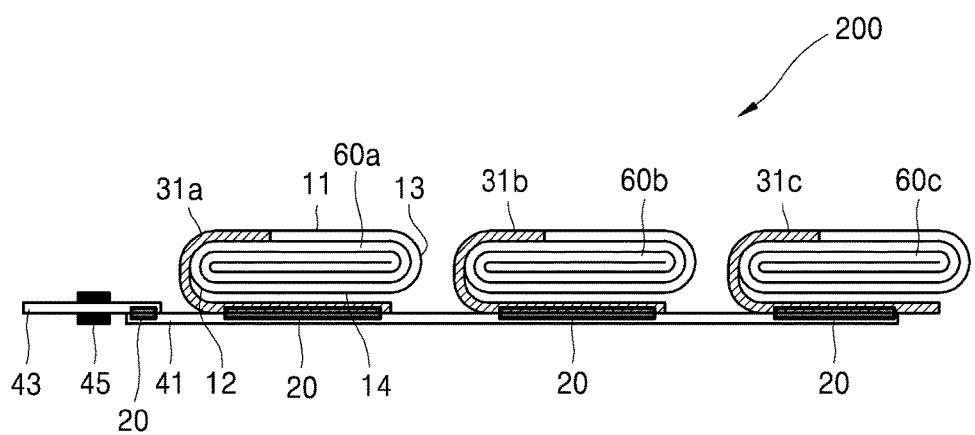

FIGS. 18 and 19 are a perspective view and a cross-sectional view, respectively, of a complex electrode assembly 200 according to another embodiment. Referring to FIGS. 18 and 19, in an embodiment, the complex electrode assembly 200 may include a plurality of electrode assemblies 60a, 60b and 60c, and first and second sheet-type wirings 41 and 42 each electrically connected to the plurality of electrode assemblies 60a, 60b and 60c. The complex electrode assembly 200 may further include first electrode tabs 31a, 31b and 31c that respectively electrically connect the plurality of electrode assemblies 60a, 60b and 60c to the first sheet-type wiring 41, and second electrode tabs 32a, 32b and 32c that respectively electrically connect the plurality of electrode assemblies 60a, 60b and 60c to the second sheet-type wiring 42.

The complex electrode assembly 200 of FIGS. 18 and 19 is substantially the same as the complex electrode assembly 100 of FIG. 1 except that the first electrode tabs 31a, 31b and 31c and the second electrode tabs 32a, 32b and 32c extend in the x-axis direction, which is identical with the lengthwise direction of the first and second sheet-type wirings 41 and 42. In the complex electrode assembly 100 of FIG. 1, the first electrode tabs 31a, 31b and 31c, and the second electrode tabs 32a, 32b and 32c are respectively led out from the third and fourth side surfaces 15 and 16 of the electrode assemblies 10a, 10b and 10c in opposite directions. However, in the complex electrode assembly 200 of FIGS. 18 and 19, the first electrode tabs 31a, 31b and 31c and the second electrode tabs 32a, 32b and 32c may be led out from the first side surfaces 12, the second side surfaces 13, the upper surfaces 11, or the lower surfaces 14 of the electrode assemblies 60a, 60b and 60c in same directions.

Figure 20:
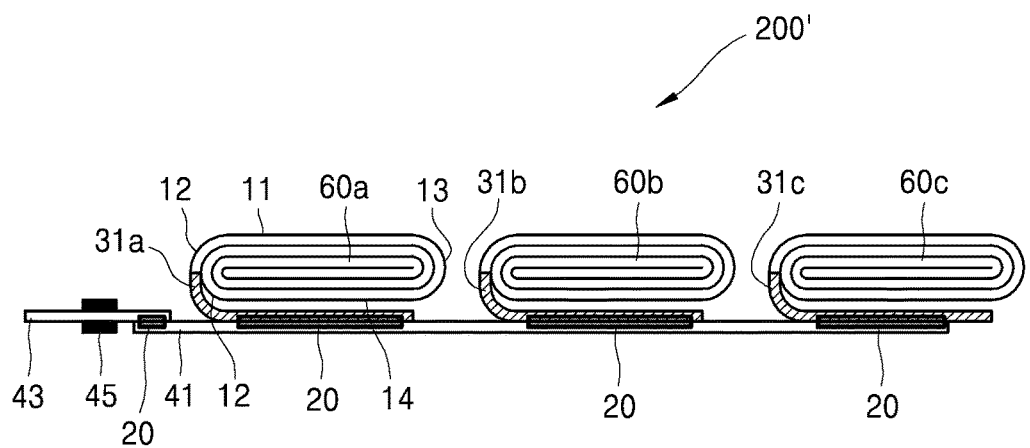
FIG. 20 is a cross-sectional view of a complex electrode assembly according to another embodiment.

In an embodiment, the first electrode tabs 31a, 31b and 31c, and the second electrode tabs 32a, 32b and 32c are led out from between the upper surfaces 11 and the first side surfaces 12 of the electrode assemblies 60a, 60b and 60c as shown in FIGS. 18 and 19, but embodiments are not limited thereto. In an alternative embodiment, the first electrode tabs 31a, 31b and 31c, and the second electrode tabs 32a, 32b and 32C may be led out from any regions of the electrode assemblies 60a, 60b and 60 in the circumference directions of the electrode assemblies 60a, 60b and 60c that are perpendicular to the winding axes of the electrode assemblies 60a, 60b and 60c. FIG. 20 is a schematic cross-sectional view of a complex electrode assembly 200' according to another embodiment. In one alternative embodiment, as illustrated in FIG. 20, the first electrode tabs 31a, 31b and 31c, and the second electrode tabs 32a, 32b and 32c may be led out from the first side surfaces 12 of the electrode assemblies 60a, 60b and 60c and extend up to the lower surfaces 14 thereof.

Figure 21:
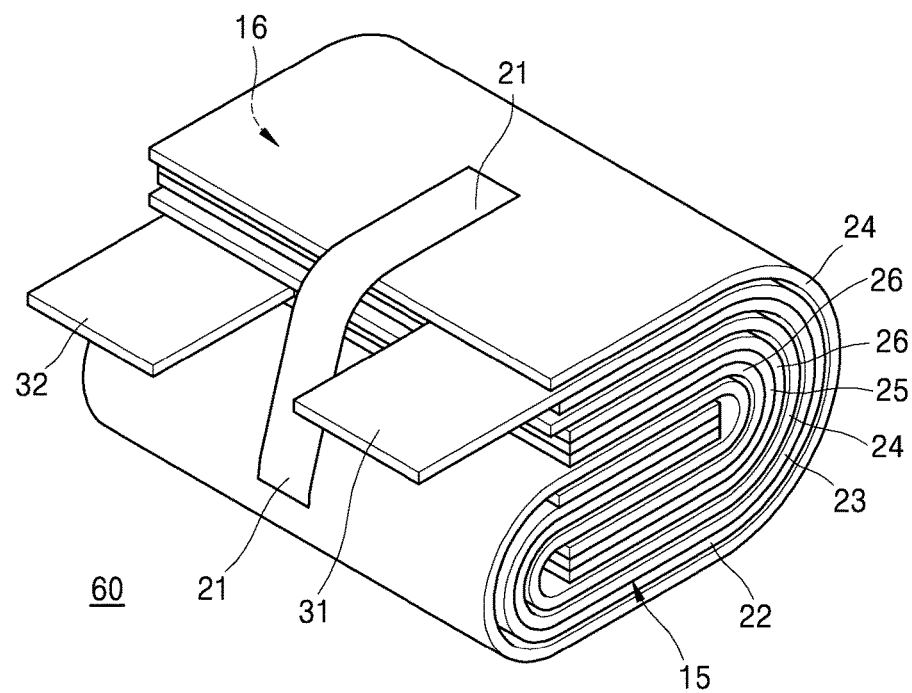
FIG. 21 is a schematic perspective view of each electrode assembly illustrated in FIG. 18.

FIG. 21 is a schematic perspective view of an electrode assembly 60, which is each of the electrode assemblies 60a, 60b and 60c illustrated in FIG. 18. Referring to FIG. 21, an embodiment of the electrode assembly 60 may include first electrode plate 22 and 23, second electrode plate 25 and 26, and an insulative separator 24 interposed between the first electrode plate 22 and 23 and the second electrode plate 25 and 26. The first electrode plate 22 and 23, the second electrode plate 25 and 26, and the separator 24 may be folded to form a folded electrode assembly 60, or the first electrode plate 22 and 23, the second electrode plate 25 and 26, and the separator 24 may be wound to form a jelly-roll-type electrode assembly 60. The electrode assembly 60 may further include an insulative tape 21 that is attached to at least a portion of the circumference of the electrode assembly 60 to prevent the first electrode plate 22 and 23, the second electrode plate 25 and 26, and the separator 24 from being unwound or unfolded.

The first electrode plate 22 and 23 of the electrode assembly 60 may include a first current collector 22 and a first active material layer 23 coated on the first current collector 22. The second electrode plate 25 and 26 of the electrode assembly 60 may include a second current collector 25 and a second active material layer 26 coated on the second current collector 25. As illustrated in FIG. 21, a first electrode tab 31 may be bonded with an active material non-coated portion of the first current collector 22, may have a smaller width than the first current collector 22, and may be disposed adjacent to a third side surface 15. A second electrode tab 32 may be bonded with an active material non-coated portion of the second current collector 25, may have a smaller width than the second current collector 25, and may be disposed adjacent to a fourth side surface 16. The first electrode tab 31 and the first current collector 22 may be separate components or may be integrally formed as a single unitary and indivisible unit. In one embodiment, for example, the first electrode tab 31 may be an extended portion of the first current collector 22, which extends from the active material non-coated portion thereof. The second electrode tab 32 and the second current collector 25 may be separate components or may be integrally formed as a single unitary and indivisible unit. In one embodiment, for example, the second electrode tab 32 may be an extended portion of the second current collector 25, which extends from the active material non-coated portion thereof.

Referring back to FIG. 18, the first electrode tabs 31a, 31b and 31c, and the second electrode tabs 32a, 32b and 32c may extend from the first side surfaces 12 of the electrode assemblies 60a, 60b and 60c to the lower surfaces 14 thereof. Thus, some portions of the first electrode tabs 31a, 31b and 31c and the second electrode tabs 32a, 32b and 32c may face the first side surfaces 12 of the electrode assemblies 60a, 60b and 60c, and the other portions may face the lower surfaces 14 of the electrode assemblies 60a, 60b and 60c. The portions of the first electrode tabs 31a, 31b and 31c, and the second electrode tabs 32a, 32b and 32c that face the lower surfaces 14 of the electrode assemblies 60a, 60b and 60c may be bonded with both the first and second sheet-type wirings 41 and 42. In such embodiment, the portions of the first electrode tabs 31a, 31b and 31c between the lower surfaces 14 of the electrode assemblies 60a, 60b and 60c and the first sheet-type wiring 41 may be bonded with the first sheet-type wiring 41, and the portions of the second electrode tabs 32a, 32b and 32c between the lower surfaces 14 of the electrode assemblies 60a, 60b and 60c and the second sheet-type wiring 42 may be bonded with the second sheet-type wiring 42, such that junctions 20 facing the lower surfaces 14 of the electrode assemblies 60a, 60b and 60c may be defined, as illustrated in FIGS. 19 and 20.

In an embodiment having a structure described above, the plurality of electrode assemblies 60a, 60b and 60c may be arranged along the first and second sheet-type wirings 41 and 42 to face the first and second sheet-type wirings 41 and 42. In one embodiment, for example, as illustrated in FIG. 18, the electrode assemblies 60a, 60b and 60c may be arranged in a way such that respective lower surfaces 14 thereof face the first and second sheet-type wirings 41 and 42. Alternatively, the electrode assemblies 60a, 60b and 60c may be arranged in a way such that respective upper surfaces 11 thereof, instead of the lower surfaces 14, face the first and second sheet-type wirings 41 and 42. The first and second sheet-type wirings 41 and 42 may be arranged on the same side of each of the electrode assemblies 60a, 60b and 60c. In one embodiment, for example, both the first and second sheet-type wirings 41 and 42 may be disposed to face the lower surfaces 14 of the electrode assemblies 60a, 60b and 60c.

Figure 22:
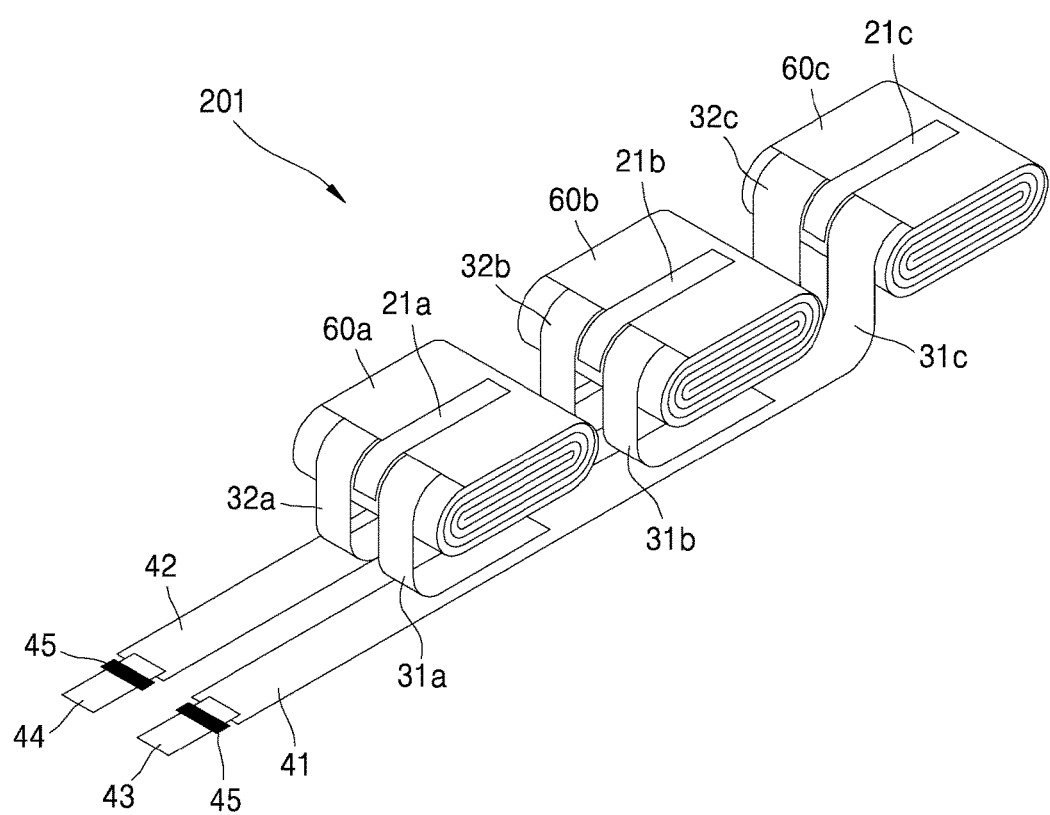
FIG. 22 is a perspective view of a complex electrode assembly according to another embodiment.

FIG. 22 is a perspective view of a complex electrode assembly 201 according to another embodiment. Referring to FIG. 22, in an embodiment, the first and second sheet-type wirings 41 and 42 may be respectively extend from the first and second electrode tabs 31c and 32c of a third electrode assembly 60c, which is rearmost among the electrode assemblies 60a, 60b and 60c. If the first and second electrode tabs 31c and 32c are respectively extended portions of the active material non-coated portions of the first and second current collectors 22 and 25 of the third electrode assembly 60c, the first and second sheet-type wirings 41 and 42 may also be respectively extended portions of the active material non-coated portions of the first and second current collectors 22 and 25 of the electrode assembly 60c. In such an embodiment, each of first and second electrode assemblies 60a and 60b except for the third electrode assembly 60c may be electrically connected to the first and second sheet-type wirings 41 and 42 via the first and second electrode tabs 31a and 32a and the first and second electrode tabs 31b and 32b, respectively.

Figure 23:
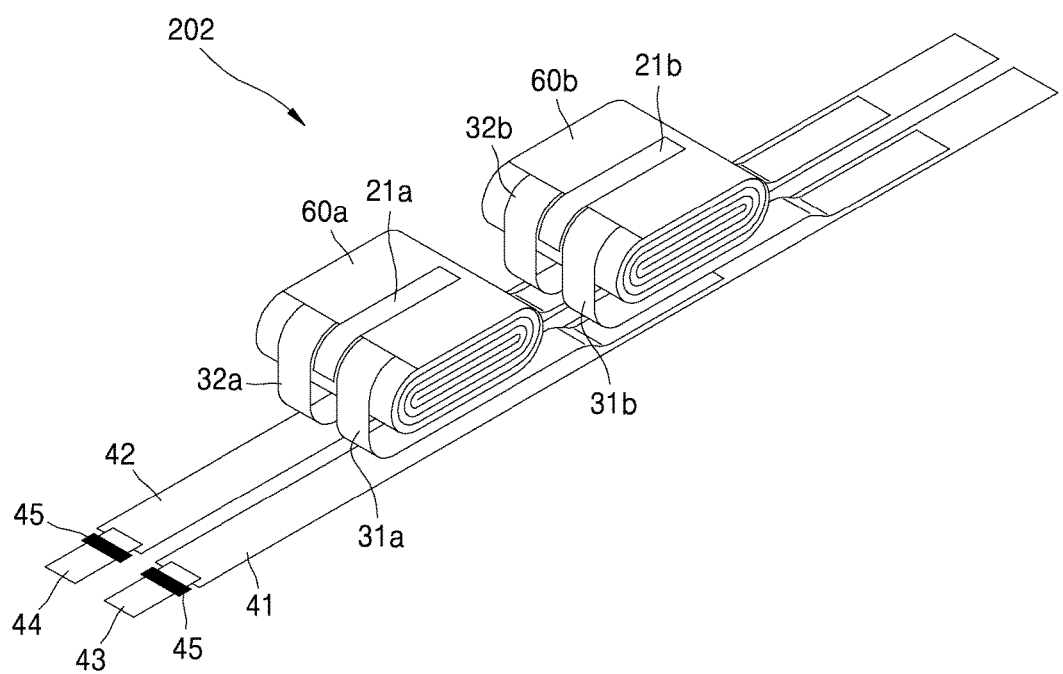
FIGS. 23 and 24 are a perspective view and a cross-sectional view, respectively, of a complex electrode assembly according to another embodiment.
Figure 24:
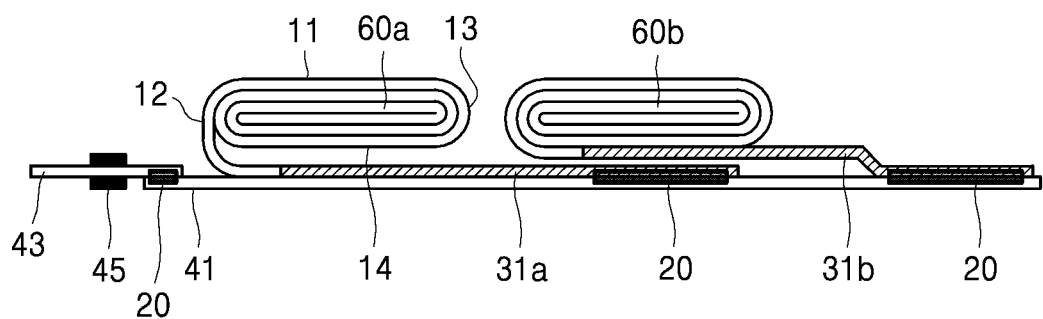

FIGS. 23 and 24 are a perspective view and a cross-sectional view, respectively, of a complex electrode assembly 202 according to another embodiment. In an embodiment, as shown in FIG. 18, the electrically connected portions between each of the electrode assemblies 60a, 60b and 60c, and the first and second sheet-type wirings 41 and 42 may be located between the lower surface 14 of each of the electrode assemblies 60a, 60b and 60c, and the first and second sheet-type wirings 41 and 42. However, in an alternative embodiment, as shown in FIGS. 23 and 24, electrically connected portions between each of the electrode assemblies 60a, 60b, and 60c and the first and second sheet-type wirings 41 and 42 may be located between the lower surface 14 of an electrode assembly adjacent to the electrode assembly 60a, 60b or 60c, and the first and second sheet-type wirings 41 and 42.

In one embodiment, for example, referring to FIGS. 23 and 24, a portion of the first electrode tab 31a of the first electrode assembly 60a may pass between the lower surface 14 of the first electrode assembly 60a and the first sheet-type wiring 41 and locate between the lower surface 14 of the second electrode assembly 60b and the first sheet-type wiring 41. The portion of the first electrode tab 31a may be bonded with the first sheet-type wiring 41, at the region between the lower surface 14 of the second electrode assembly 60b and the first sheet-type wiring 41. Accordingly, a junction 20 between the first electrode tab 31a and the first sheet-type wiring 41 may be opposite to the lower surface 14 of the second electrode assembly 60b. Similarly, a portion of the second electrode tab 32a of the first electrode assembly 60a may pass between the lower surface 14 of the first electrode assembly 60a and the second sheet-type wiring 42 and may be bonded with the second sheet-type wiring 42 at the region between the lower surface 14 of the second electrode assembly 60b and the second sheet-type wiring 42. In an embodiment, the first electrode assembly 60a and the second electrode assembly 60b are directly adjacent to each other as shown in FIGS. 23 and 24, but not being limited thereto. In an alternative embodiment, another electrode assembly may be further interposed between the first electrode assembly 60a and the second electrode assembly 60b. In such an embodiment, the first electrode tab 31a of the first electrode assembly 60a may pass the first electrode assembly 60a and the additional electrode assembly directly adjacent thereto and then may be bonded with the first sheet-type wiring 41 at the region between the lower surface 14 of the second electrode assembly 60b, which is second adjacent to the first electrode assembly 60a, and the first sheet-type wiring 41.

In an embodiment, where the second electrode assembly 60b is at the rearmost, a portion of the first electrode tab 31b of the second electrode assembly 60b may pass between the lower surface 14 of the second electrode assembly 60b and the first sheet-type wiring 41 and may be bonded with almost an end of the first sheet-type wiring 41. Similarly, a portion of the second electrode tab 32b of the second electrode assembly 60b may pass between the lower surface 14 of the second electrode assembly 60b and the second sheet-type wiring 42 and may be bonded with almost an end of the second sheet-type wiring 42. In such an embodiment, none of the electrode assemblies may be located on the bonded portions of the first and second electrode tabs 31b and 32b.

Figure 25:
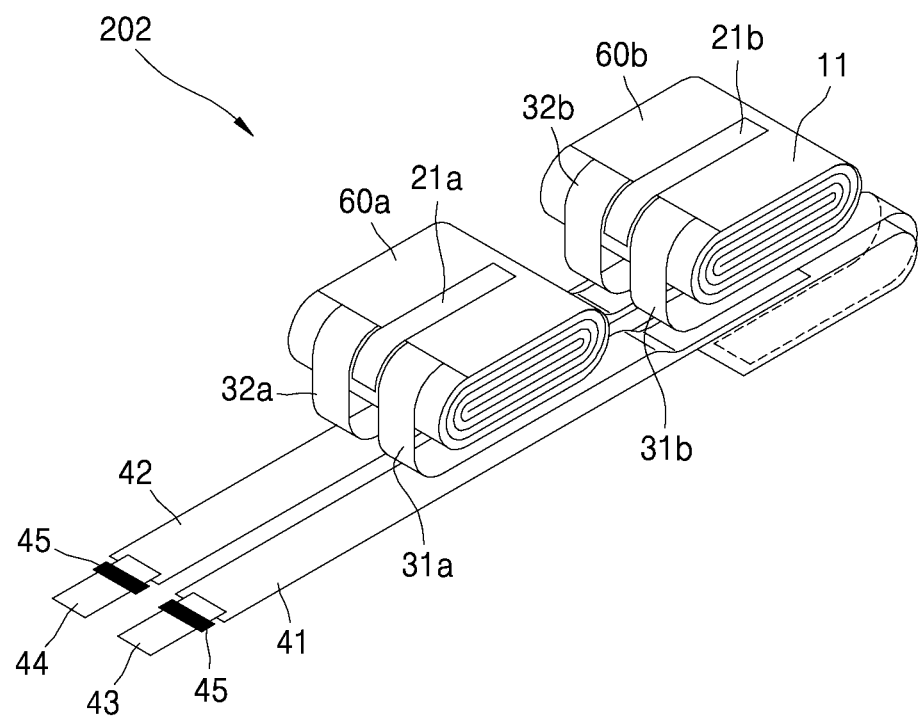
FIG. 25 is a schematic perspective view of the complex electrode assembly of FIG. 23 in an alternative configuration.

FIG. 25 is a schematic perspective view of the complex electrode assembly 202 of FIG. 23 in an alternative configuration. In an embodiment, as illustrated in FIG. 25, the respective some portions of the first and second electrode tabs 31b and 32b of the second electrode assembly 60b and the ends of the first and second sheet-type wirings 41 and 42 may be folded at about 180° to efficiently utilize the space. In FIG. 25, the respective some portions of the first and second electrode tabs 31b and 32b of the second electrode assembly 60b and the ends of the first and second sheet-type wirings 41 and 42 are folded downwards to respectively overlap other portions of the first and second electrode tabs 31b and 32b and other portions of the first and second sheet-type wirings 41 and 42. Accordingly, in such an embodiment, a space occupied by respective some portions of the first and second electrode tabs 31b and 32b of the second electrode assembly 60b, which is the rearmost electrode assembly, and ends of the first and second sheet-type wirings 41 and 42 protruding rearward, as shown in FIG. 23, may be reduced. Alternatively, the respective some portions of the first and second electrode tabs 31b and 32b of the second electrode assembly 10b and the ends of the first and second sheet-type wirings 41 and 42 may be folded upwards to face the upper surface 11 of the second electrode assembly 60b.

Figure 26:
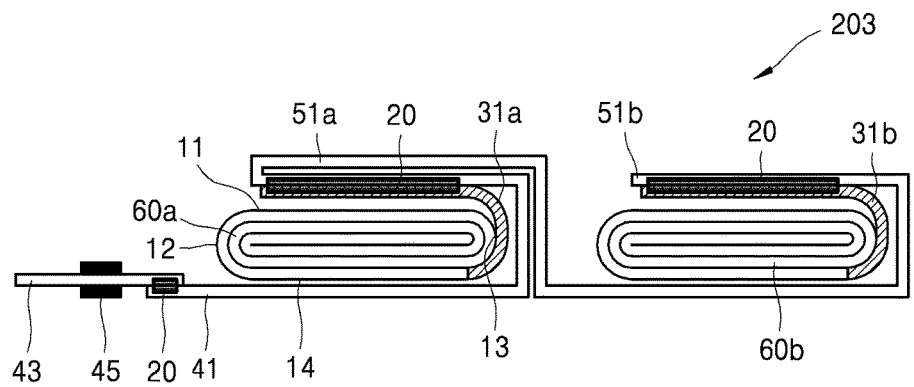
FIGS. 26-28 are schematic cross-sectional views of complex electrode assemblies according to other embodiments.

FIG. 26 is a schematic cross-sectional view of a complex electrode assembly 203 according to another embodiment. Referring to FIG. 26, in an embodiment, the first sheet-type wiring 41 is bent to face the upper surface 11 of the electrode assembly 60a and both the lower surface 14 and the upper surface 11 of the electrode assembly 60b. In one embodiment, for example, after extending over the lower surface 14 of the first electrode assembly 60a, the first sheet-type wiring 41 may be bent about 180° toward the upper surface 11 of the first electrode assembly 60a while surrounding the second side surface 13 of the first electrode assembly 60a. Thus, the first sheet-type wiring 41 may cover substantially the entire upper surface 11 of the first electrode assembly 60a. After being bent about 180° again from the upper surface 11 of the first electrode assembly 60a, the first sheet-type wiring 41 may extend over the second side surface 13 of the first electrode assembly 60a again and may be bent to face the lower surface 14 of the second electrode assembly 60b. After extending over the lower surface 14 of the second electrode assembly 60b, the first sheet-type wiring 41 may be bent again about 180° toward the upper surface 11 of the second electrode assembly 60b while surrounding the second side surface 13 of the second electrode assembly 60b. Thus, the first sheet-type wiring 41 may include regions 51a and 51b respectively facing the first and second electrode assemblies 60a and 60b.

In an embodiment, as illustrated in FIG. 26, the first electrode tabs 31a and 31b of the first and second electrode assemblies 60a and 60b may be led out from the lower surfaces 14 of the first and second electrode assemblies 60a and 60b, respectively. Then, the first electrode tabs 31a and 31b may extend to face the regions 51a and 51b of the first sheet-type wiring 41 while surrounding the respective second side surfaces 13 of the first and second electrode assemblies 60a and 60b from the lower surfaces 14 of the first and second electrode assemblies 60a and 60b. In such an embodiment, the first electrode tabs 31a and 31b may be respectively bonded with the regions 51a and 51b of the first sheet-type wiring 41 respectively facing the first and second electrode assemblies 60a and 60b. Accordingly, junctions 20 between the first electrode tab 31a and the first sheet-type wiring 41 and between the first electrode tab 31b and the first sheet-type wiring 41 may be disposed opposite to the upper surfaces 11 of the first and second electrode assemblies 60a and 60b, respectively.

Although only the first sheet-type wiring 41 and the first electrode tabs 31a and 31b are illustrated in FIG. 26 for convenience of illustration, the second sheet-type wiring 42 and the second electrode tabs 32a and 32b may have the same structure as that of the first sheet-type wiring 41 and the first electrode tabs 31a and 31b. As shown in FIG. 26, the first electrode tabs 31a and 31b are led out from the lower surfaces 14 of the first and second electrode assemblies 60a and 60b, but not being limited thereto. In one alternative embodiment, for example, the first electrode tabs 31a and 31b may be respectively led out from around the boundaries between the upper surfaces 11 and the second side surfaces 13 of the first and second electrode assemblies 60a and 60b. In another alternative embodiment, the first electrode tabs 31a and 31b may be respectively led out from the respective upper surfaces 11 of the first and second electrode assemblies 60a and 60b and may extend around the first and second electrode assemblies 60a and 60b, and then may be respectively bonded with the regions 51a and 51b of the first sheet-type wiring 41.

Figure 27:
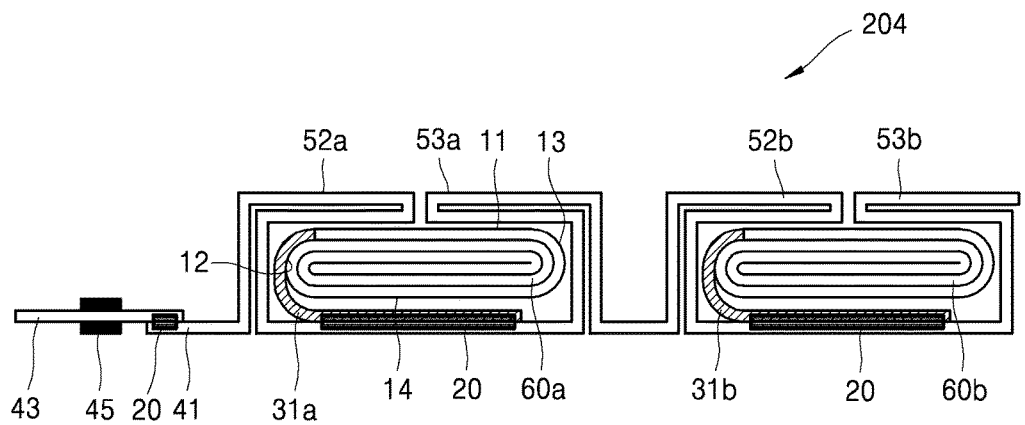

FIG. 27 is a schematic cross-sectional view of a complex electrode assembly 204 according to another embodiment. Referring to FIG. 27, in an embodiment, the first sheet-type wiring 41 may be bent to surround substantially the entire circumferences of the electrode assemblies 60a and 60b. In one embodiment, for example, the first sheet-type wiring 41 may be bent toward the upper surface 11 of the first electrode assembly 60a over the first side surface 12 of the first electrode assembly 60a. Thereafter, the first sheet-type wiring 41 is bent about 180° at around the center of the upper surface 11 of the first electrode assembly 60a, extends over the first side surface 12 of the first electrode assembly 60a, and is then bent again toward the lower surface 14 thereof. Then, the first sheet-type wiring 41 extends over the second side surface 13 of the first electrode assembly 60a and is then bent toward the center of the upper surface 11 of the first electrode assembly 60a. Thereafter, the first sheet-type wiring 41 may be bent about 180° again to extend over the second side surface 13 of the first electrode assembly 60a again, and may be bent again toward the first side surface 12 of the second electrode assembly 60b. The first sheet-type wiring 41 may include a region 52a that extends from the first side surface 12 of the first electrode assembly 60a to face the upper surface 11 thereof, and a region 53a that extends from the second side surface 13 of the first electrode assembly 60a to face the upper surface 11 thereof. The first sheet-type wiring 41 may be bent for the second electrode assembly 60b in the above-described manner. Thus, the first sheet-type wiring 41 may further include a region 52b that extends from the first side surface 12 of the second electrode assembly 60b to face the upper surface 11 thereof, and a region 53b that extends from the second side surface 13 of the second electrode assembly 60b to face the upper surface 11 thereof.

In such an embodiment, as illustrated in FIG. 27, the first electrode tabs 31a and 31b of the first and second electrode assemblies 60a and 60b may be respectively led out from the upper surfaces 11 of the first and second electrode assemblies 60a and 60b. The first electrode tabs 31a and 31b may be respectively bonded with portions of the first sheet-type wiring 41 respectively facing the respective lower surfaces 14 of the first and second electrode assemblies 60a and 60b. Accordingly, junctions 20 between the first electrode tab 31a and the first sheet-type wiring 41 and between the first electrode tab 31b and the first sheet-type wiring 41 may be disposed opposite to the lower surfaces 14 of the first and second electrode assemblies 60a and 60b, respectively. However, embodiments are not limited thereto. In one alternative embodiment, for example, the first electrode tabs 31a and 31b may be bonded with the regions 52a, 53a, 52b and 53b of the first sheet-type wiring 41 that face the upper surfaces 11 of the first and second electrode assemblies 60a and 60b, as in the embodiments described above with reference to FIG. 26. Although only the first sheet-type wiring 41 and the first electrode tabs 31a and 31b are illustrated in FIG. 27 for convenience of illustration, the second sheet-type wiring 42 and the second electrode tabs 32a and 32b may have the same structure as that of the first sheet-type wiring 41 and the first electrode tabs 31a and 31b.

Figure 28:
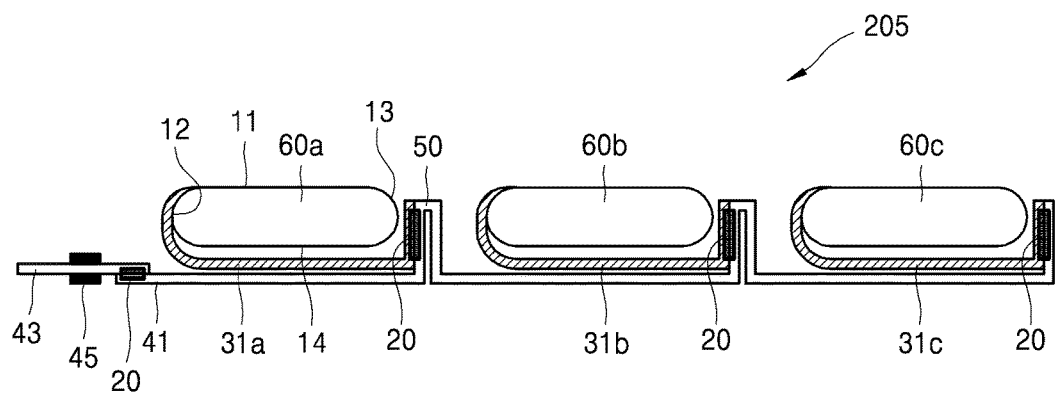

FIG. 28 is a schematic cross-sectional view of a complex electrode assembly 205 according to another embodiment. Referring to FIG. 28, in an embodiment, the first sheet-type wiring 41 is repeatedly bent to have a bending portion 50 between every two adjacent electrode assemblies among the electrode assemblies 60a, 60b, and 60c. The bending portion 50 may be located between the second side surface 13 and the first side surface 12 of the two adjacent electrode assemblies among the electrode assemblies 60a, 60b and 60c. The first electrode tabs 31a, 31b and 31c may be respectively led out from the first side surfaces 12 of the electrode assemblies 60a, 60b and 60c, and extend along the lower surfaces 14 and the second side surfaces 13 of the electrode assemblies 60a, 60b and 60c. The first electrode tabs 31a, 31b and 31c may be bonded with the bending portions 50 of the first sheet-type wiring 41. In one embodiment, for example, the first electrode tab 31a of the first electrode assembly 60a may pass between the lower surface 14 of the first electrode assembly 60a and the first sheet-type wiring 41 and may be bonded with the bending portion 50 of the first sheet-type wiring 41. The first electrode tab 31a of the first electrode assembly 60a may be bonded with, for example, a region of the bending portion 50 that faces the second side surface 13 of the first electrode assembly 60a. Accordingly, a junction 20 between the first electrode tab 31a and the first sheet-type wiring 41 may be disposed opposite to the second side surface 13 of the first electrode assembly 60a. Although not shown in FIG. 28 for convenience of illustration, similar to the first electrode tabs 31a, 31b and 31c, the second electrode tabs 32a, 32b and 32c may be bonded with bending portions 50 of the second sheet-type wiring 42 that are between every two adjacent electrode assemblies among the electrode assemblies 60a, 60b and 60c.

Figure 29:
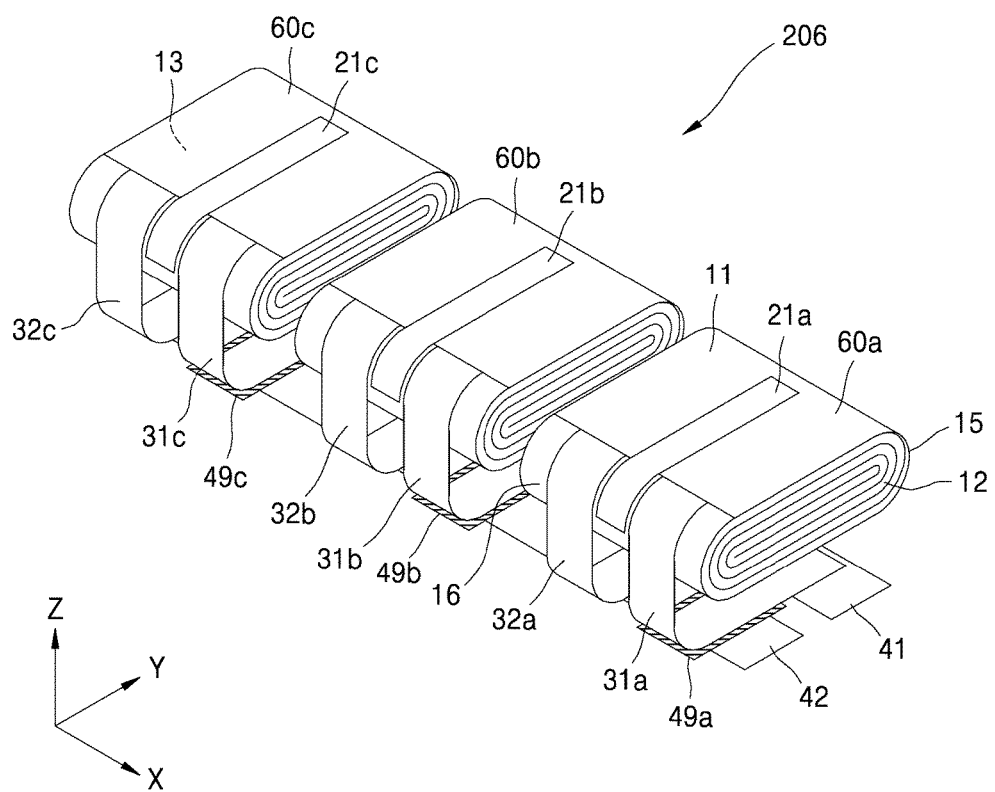
FIG. 29 is a perspective view of a complex electrode assembly according to another embodiment.

FIG. 29 is a perspective view of a complex electrode assembly 206 according to another embodiment. In an embodiment, as in the embodiments described above with reference to FIGS. 18 to 20 and FIGS. 22 to 28, each of the electrode assemblies 60a, 60b and 60c has the first side surface 12 and the second side surface 13 that are arranged in the x-axis direction and convexly curved, and the third side surface 15 and the fourth side surface 16 that are arranged in the y-axis direction and via which edges of the first electrode plate 22 and 23, the separator 24, and the second electrode plate 25 and 26 are partially exposed. In another embodiment, as shown in FIG. 29, the electrode assemblies 60a, 60b and 60c of the complex electrode assembly 206 may be rotated by about 90° about the z axis. Accordingly, in such an embodiment of the complex electrode assembly 206, the edges of the first electrode plate 22 and 23, the separator 24, and the second electrode plate 25 and 26 are partially exposed via the first side surface 12 and the second side surface 13 that are arranged in the x-axis direction, and the third side surface 15 and the fourth side surface 16 arranged in the y-axis direction are convexly curved. In such an embodiment, the plurality of electrode assemblies 60a, 60b and 60c may be arranged separate from one another in the lengthwise direction of the first and second sheet-type wirings 41 and 42.

The first electrode tabs 31a, 31b and 31c, and the second electrode tabs 32a, 32b and 32c of the electrode assemblies 60a, 60b and 60c may be led out in a same direction, as in the embodiments described above with reference to FIGS. 18 to 20 and FIGS. 22 to 28. However, in such an embodiment, the first electrode tabs 31a, 31b and 31c, and the second electrode tabs 32a, 32b and 32c may be led out from the third side surfaces 15 or the fourth side surfaces 16 arranged in the y-axis direction, as shown in FIG. 29. In one embodiment, for example, as shown in FIG. 29, the first electrode tabs 31a, 31b and 31c, and the second electrode tabs 32a, 32b and 32c are led out from the upper surfaces 11 of the electrode assemblies 60a, 60b and 60c toward the fourth side surfaces 16 thereof. In such an embodiment, the first electrode tabs 31a, 31b and 31c may pass over the second sheet-type wiring 42 and be connected to the first sheet-type wirings 41, and the second electrode tabs 32a, 32b and 32c may be connected to the second sheet-type wiring 42. Accordingly, the first electrode tabs 31a, 31b, and 31c may be longer than the second electrode tabs 32a, 32b and 32c. In such an embodiment, insulation layers 49a, 49b and 49c may be respectively disposed between the second sheet-type wiring 42 and the first electrode tabs 31a, 31b and 31c to effectively prevent electrical short-circuiting between the second sheet-type wiring 42 and the first electrode tabs 31a, 31b and 31c.

Figure 30:
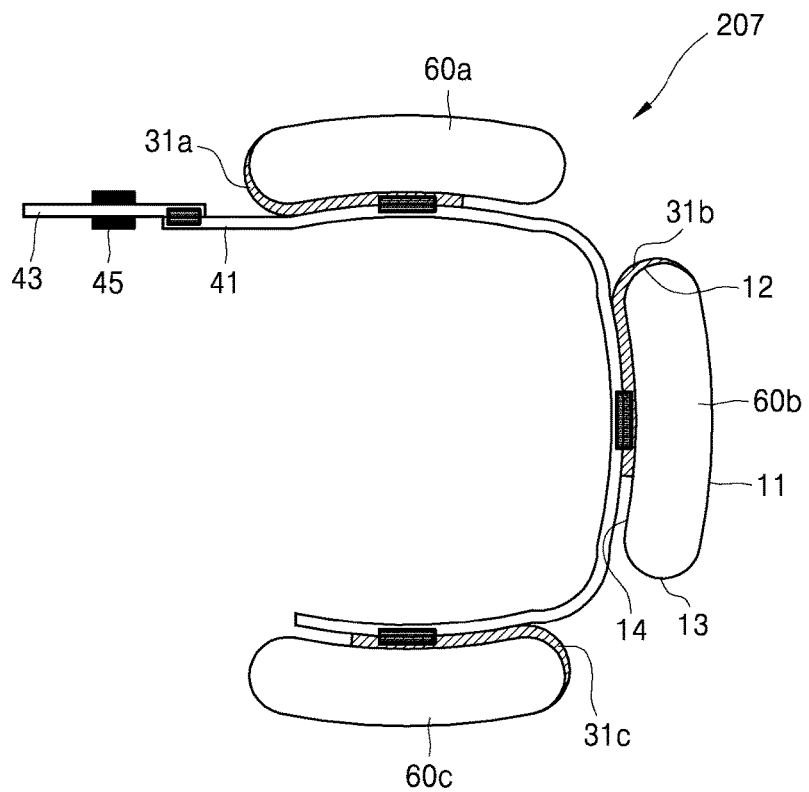
FIG. 30 is a cross-sectional view of a complex electrode assembly according to another embodiment.

FIG. 30 is a schematic cross-sectional view of a complex electrode assembly 207 according to another embodiment. Referring to FIG. 30, an embodiment of the complex electrode assembly 207 may include a plurality of electrode assemblies 60a, 60b and 60c that are curved. In one embodiment, for example, the lower surfaces 14 of the electrode assemblies 60a, 60b and 60c may be concavely curved, and the upper surfaces 11 thereof may be convexly curved. The first and second sheet-type wirings 41 and 42 may be curved in lengthwise directions thereof, and thus the complex electrode assembly 207 may be entirely bent. In particular, portions of the curved first and second sheet-type wirings 41 and 42 between every two adjacent electrode assemblies among the electrode assemblies 60a, 60b and 60c may have larger curvatures than the other portions thereof. In an embodiment, as shown in FIG. 30, the complex electrode assembly 207 is curved in a way such that the plurality of electrode assemblies 60a, 60b and 60c face the outside. Alternatively, the complex electrode assembly 207 may be curved in another way such that the plurality of electrode assemblies 60a, 60b and 60c face the inside. In such an embodiment, the lower surfaces 14 of the electrode assemblies 60a, 60b and 60c may be convexly curved, and the upper surfaces 11 thereof may be concavely curved.

Figure 31:
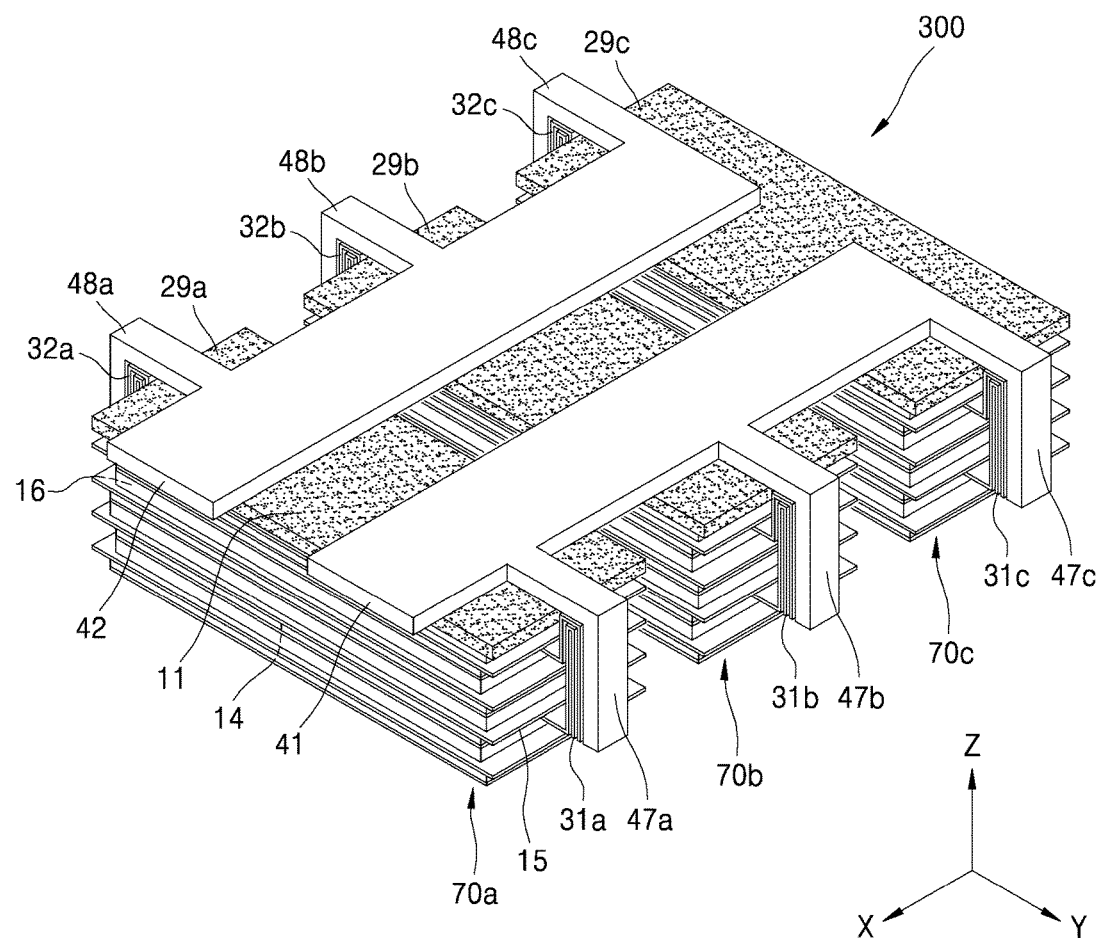
FIGS. 31 and 32 are a perspective view and a cross-sectional view, respectively, of a complex electrode assembly according to another embodiment.
Figure 32:
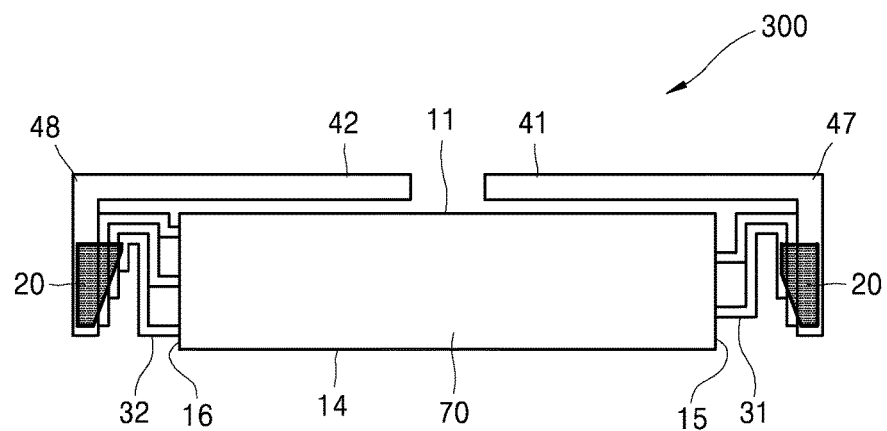

FIGS. 31 and 32 are a perspective view and a cross-sectional view, respectively, of a complex electrode assembly 300 according to another embodiment. Referring to FIGS. 31 and 32, another embodiment of the complex electrode assembly 300 may include a plurality of electrode assemblies 70a, 70b and 70c, and first and second sheet-type wirings 41 and 42, each electrically connected to the plurality of electrode assemblies 70a, 70b and 70c. The plurality of electrode assemblies 70a, 70b and 70c may be arranged in a lengthwise direction (i.e., the x-axis direction) of the first and second sheet-type wirings 41 and 42. The first and second sheet-type wirings 41 and 42 may be disposed to face respective upper surfaces 11 of the electrode assemblies 70a, 70b and 70c. The complex electrode assembly 300 may further include insulation layer 29a, 29b and 29c respectively disposed on the respective upper surfaces 11 of the plurality of electrode assemblies 70a, 70b and 70c.

Figure 33:
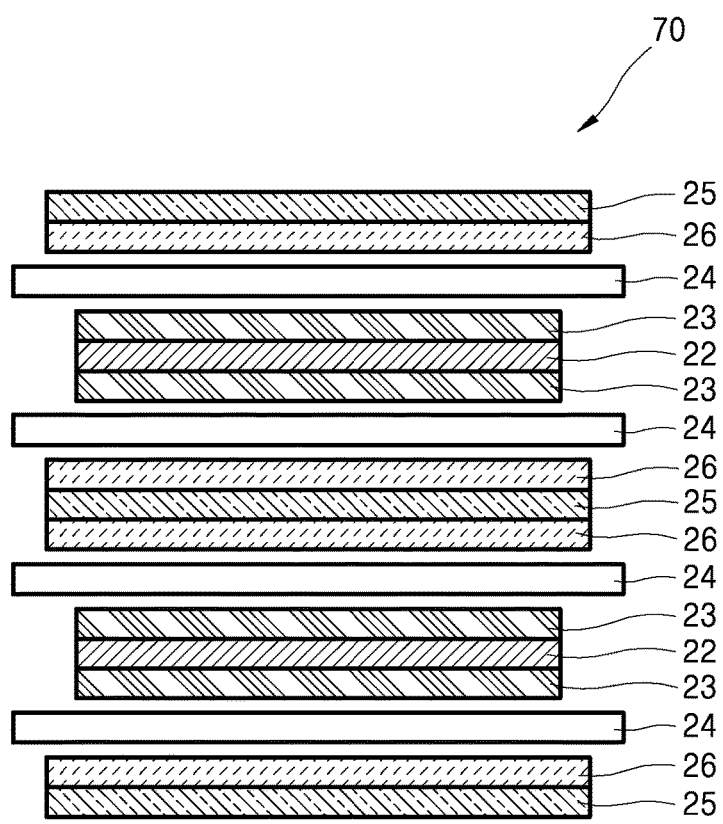
FIG. 33 is a schematic cross-sectional view of each electrode assembly illustrated in FIG. 31.

FIG. 33 is a schematic cross-sectional view of an electrode assembly 70, which is each of the electrode assemblies 70a, 70b and 70c illustrated in FIG. 31. Referring to FIG. 33, in an embodiment, the electrode assembly 70 may include a plurality of first electrode plates 22 and 23, a plurality of second electrode plates 25 and 26, and a plurality of insulative separators 24 respectively interposed between the plurality of first electrode plates 22 and 23 and the plurality of second electrode plates 25 and 26. In such an embodiment, as illustrated in FIG. 33, the plurality of first electrode plates 22 and 23, the plurality of separators 24, and the plurality of second electrode plates 25 and 26 may be stacked in a way such that each separator 24 is interposed between the first electrode plates 22 and 23 and the second electrode plates 25 and 26, thereby defining a stacked-type electrode assembly 70. In some embodiments, some of the first electrode plates 22 and 23 disposed in different layers may be connected to each other, some of the separators 24 disposed in different layers may be connected to each other, or some of the second electrode plates 25 and 26 disposed in different layers may be connected to each other, thereby defining a folded-type type electrode assembly 70. In such an embodiment, as shown in FIG. 33, the second electrode plates 25 and 26 may be disposed at the top and bottom of the electrode assembly 70, but not being limited thereto. Each of the first electrode plates 22 and 23, the second electrode plates 25 and 26, and the separators 24 may be a flat plate, but not being limited thereto. In one embodiment, for example, the electrode assembly 70 may be curved after being manufactured. In such an embodiment, the electrode assembly 70 may include a single first electrode plate 22 and 23, a single separator 24, a single second electrode plate 25 and 26.

The first electrode plates 22 and 23 of the electrode assembly 70 may include a first current collector 22 and a first active material layer 23 coated on the first current collector 22. The second electrode plates 25 and 26 of the electrode assembly 70 may include a second current collector 25 and a second active material layer 26 coated on the second current collector 25. In one embodiment, for example, the first electrode plates 22 and 23 may be positive electrode plates, and the first active material layer 23 may be formed by mixing a positive active material, a conductive agent, and a binder. The second electrode plates 25 and 26 may be negative electrode plates, and the second active material layer 26 may be formed by mixing a negative active material, a conductive agent, and a binder. In an embodiment, the stacked-type electrode assembly 70 may include a plurality of separated first current collectors 22 and a plurality of separated second current collectors 25 as shown in FIG. 33, but not being limited thereto. In an alternative embodiment, the stacked-type electrode assembly 70 may include only one first current collector 22 and only one second current collector 25.

Referring back to FIGS. 31 and 32, the electrode assemblies 70a, 70b and 70c may include first electrode tabs 31a, 31b and 31c electrically connected to the first sheet-type wiring 41, and second electrode tabs 32a, 32b and 32c electrically connected to the second sheet-type wiring 42, respectively. In one embodiment, for example, the first electrode tabs 31a, 31b and 31c may be bonded with active material non-coated portions of the respective first current collectors 22 of the electrode assemblies 70a, 70b and 70c, or may be respective extended portions of the respective first current collectors 22, which extend from the active material non-coated portions thereof. The second electrode tabs 32a, 32b and 32c may be bonded with active material non-coated portions of the respective second current collectors 25 of the electrode assemblies 70a, 70b and 70c or may be respective extended portions of the respective second current collectors 25, which extend from the active material non-coated portions thereof. In each of the electrode assemblies 70a, 70b and 70c, the plurality of first current collectors 22 are separated from one another, and the plurality of second current collectors 25 are separated from one another. Thus, each of the first electrode tabs 31a, 31b and 31c may be disposed on each of the plurality of first current collectors 22, and each of the second electrode tabs 32a, 32b and 32c may be disposed on each of the plurality of second current collectors 25. Accordingly, each of the electrode assemblies 70a, 70b, and 70c may include a plurality of first electrode tabs 31a, 31b and 31c, and a plurality of second electrode tabs 32a, 32b and 32c. In one embodiment, for example, in FIGS. 31 and 32, each of the electrode assemblies 70a, 70b, and 70c include two first electrode tabs 31a, 31b and 31c, and three second electrode tabs 32a, 32b and 32c.

The first electrode tabs 31a, 31b and 31c, and the second electrode tabs 32a, 32b and 32c may be respectively led out from the side surfaces 15 and 16 of the electrode assemblies 70a, 70b and 70c in opposite directions. In one embodiment, for example, the first electrode tabs 31a, 31b, and 31c may be respectively led out from the respective third side surfaces 15 of the electrode assemblies 70a, 70b and 70c and may extend in the +y-axis direction. The second electrode tabs 32a, 32b and 32c may be respectively led out from the respective fourth side surfaces 16 of the electrode assemblies 70a, 70b and 70c and may extend in the −y-axis direction.

In an embodiment, as illustrated in FIGS. 31 and 32, the first sheet-type wiring 41 may include a plurality of first protrusions 47a, 47b and 47c protruding in the +y-axis direction, and the second sheet-type wiring 42 may include a plurality of second protrusions 48a, 48b and 48c protruding in the −y-axis direction. The first protrusions 47a, 47b and 47c of the first sheet-type wiring 41 may be bonded with the first electrode tabs 31a, 31b and 31c that are led out from the third side surfaces 15 of the electrode assemblies 70a, 70b and 70c and extend in the +y-axis direction. Similarly, the second protrusions 48a, 48b and 48c of the second sheet-type wiring 42 may be bonded with the second electrode tabs 32a, 32b and 32c that are led out from the fourth side surfaces 16 of the electrode assemblies 70a, 70b and 70c and extend in the −y-axis direction. Accordingly, junctions 20 may be respectively disposed opposite to the third side surfaces 15 and the fourth side surfaces 16 of the electrode assemblies 70a, 70b and 70c. The first protrusions 47a, 47b and 47c, and the first electrode tabs 31a, 31b and 31c, which are bonded with each other, may be bent in the −z-axis direction to face the third side surfaces 15 of the electrode assemblies 70a, 70b and 70c, respectively. The second protrusions 48a, 48b and 48c and the second electrode tabs 32a, 32b and 32c bonded with each other may be bent in the −z-axis direction to face the fourth side surfaces 16 of the electrode assemblies 70a, 70b, and 70c, respectively.

Figure 34:
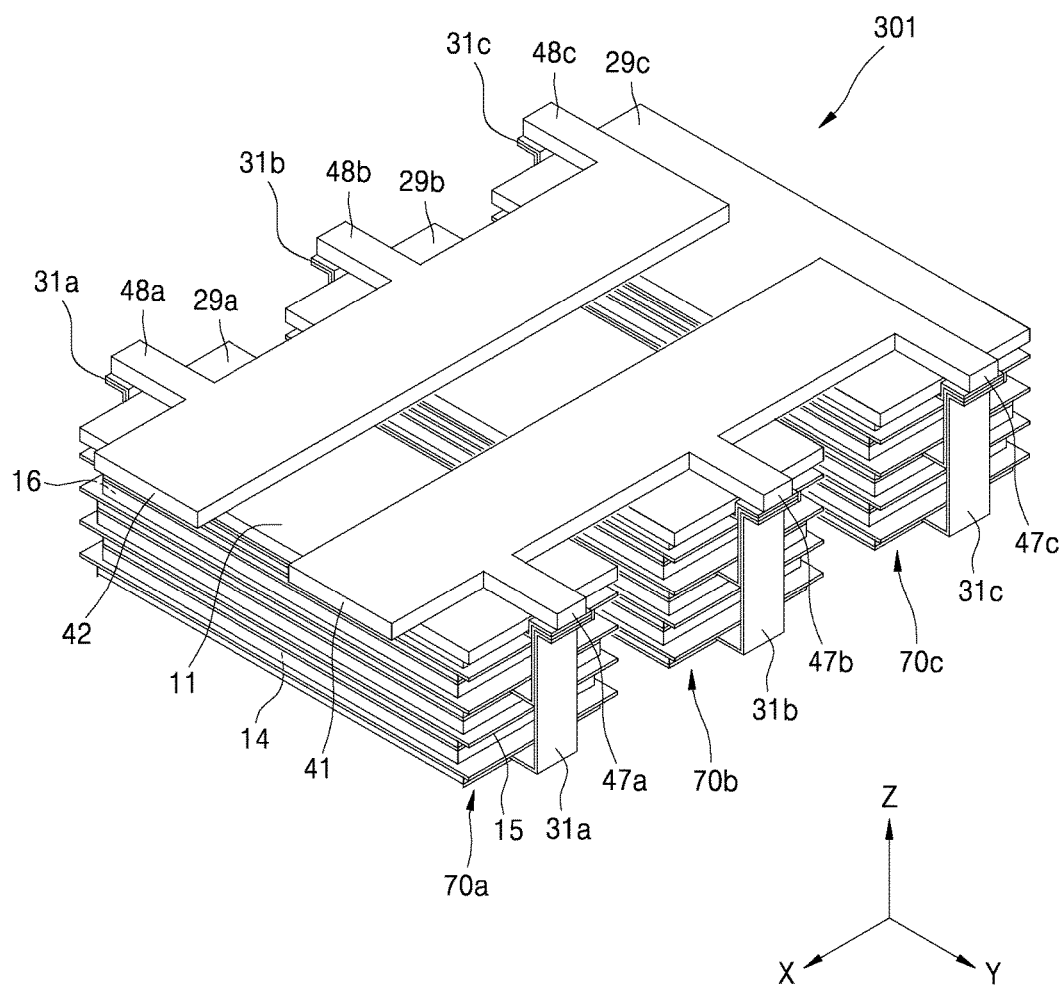
FIGS. 34 to 38 are schematic perspective views of complex electrode assemblies according to other embodiments.

FIG. 34 is a perspective view of a complex electrode assembly 301 according to another embodiment. Referring to FIG. 34, in an embodiment, a first sheet-type wiring 41 may include a plurality of first protrusions 47a, 47b and 47c protruding in the +y-axis direction, and a second sheet-type wiring 42 may include a plurality of second protrusions 48a, 48b and 48c protruding in the −y-axis direction. In such an embodiment, the first protrusions 47a, 47b and 47c, and the second protrusions 48a, 48b and 48c of the complex electrode assembly 301 are not bent. In such an embodiment, the first electrode tabs 31a, 31b and 31c led out from the third side surfaces 15 of the electrode assemblies 70a, 70b and 70c may be bent in the +z-axis direction to be bonded with the first protrusions 47a, 47b and 47c. Portions of the first electrode tabs 31a, 31b and 31c that are bonded with the first protrusions 47a, 47b and 47c may be bent in the +y-axis direction. In such an embodiment, the second electrode tabs 32a, 32b and 32c led out from the fourth side surfaces 16 of the electrode assemblies 70a, 70b and 70c may be bent in the +z-axis direction to be bonded with the second protrusions 48a, 48b and 48c. Portions of the second electrode tabs 32a, 32b and 32c that are bonded with the second protrusions 48a, 48b and 48c may be bent in the −y-axis direction.

Figure 35:
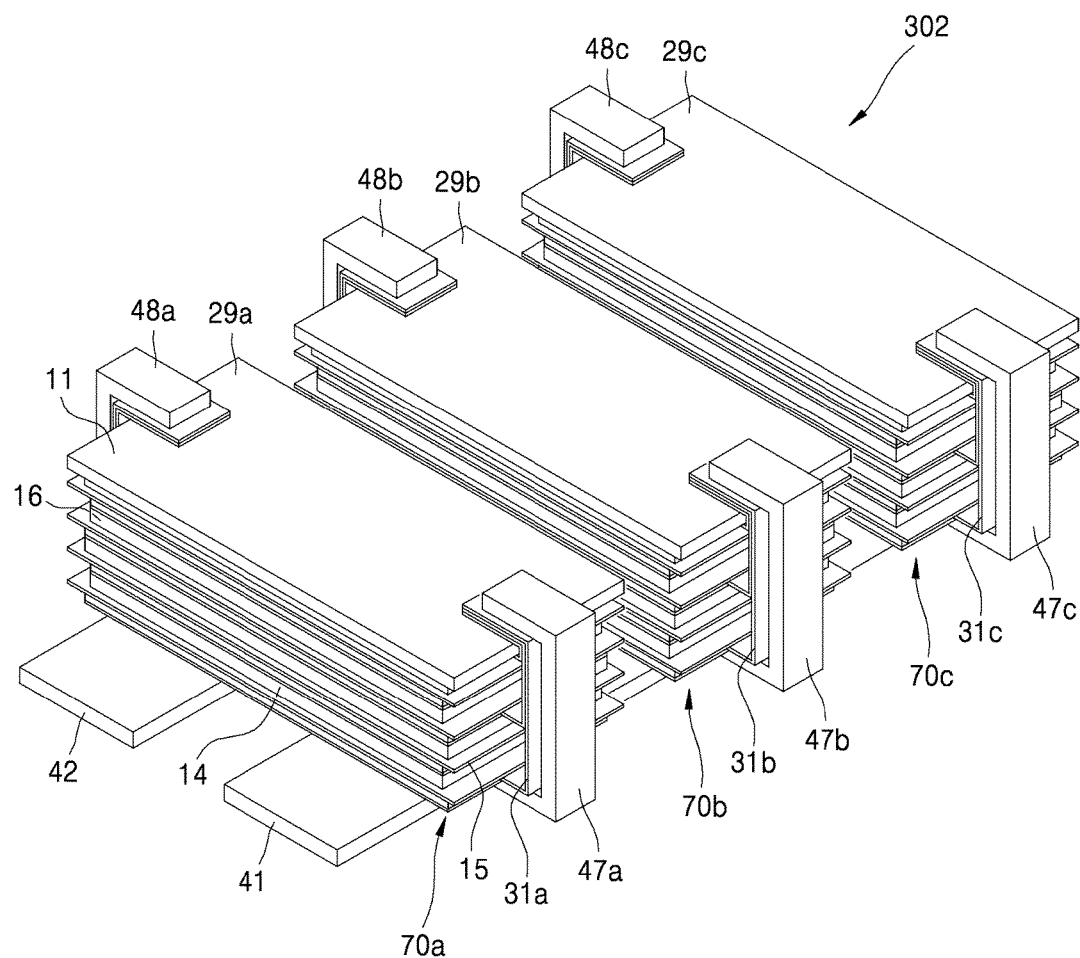

FIG. 35 is a perspective view of a complex electrode assembly 302 according to another embodiment. Referring to FIG. 35, in an embodiment, first and second sheet-type wirings 41 and 42 of the complex electrode assembly 302 may be disposed to face respective lower surfaces 14 of the electrode assemblies 70a, 70b and 70c. In such an embodiment, first protrusions 47a, 47b and 47c of the first sheet-type wiring 41 may be bent to face the third side surfaces 15 of the electrode assemblies 70a, 70b and 70c, and ends of the first protrusions 47a, 47b and 47c may be bent to face the upper surfaces 11 of the electrode assemblies 70a, 70b and 70c. The first electrode tabs 31a, 31b and 31c led out from the third side surfaces 15 of the electrode assemblies 70a, 70b and 70c may be bonded with the first protrusions 47a, 47b and 47c and may be bent together with the first protrusions 47a, 47b and 47c toward the upper surfaces 11 of the electrode assemblies 70a, 70b and 70c.

In such an embodiment, the second protrusions 48a, 48b and 48c of the second sheet-type wiring 42 may be bent to face the fourth side surfaces 16 of the electrode assemblies 70a, 70b, and 70c. Ends of the second protrusions 48a, 48b and 48c may be bent again to face the upper surfaces 11 of the electrode assemblies 70a, 70b and 70c. The second electrode tabs 32a, 32b and 32c led out from the fourth side surfaces 16 of the electrode assemblies 70a, 70b and 70c may be bonded with the second protrusions 48a, 48b and 48c and may be bent together with the second protrusions 48a, 48b and 48c toward the upper surfaces 11 of the electrode assemblies 70a, 70b and 70c.

Figure 36:
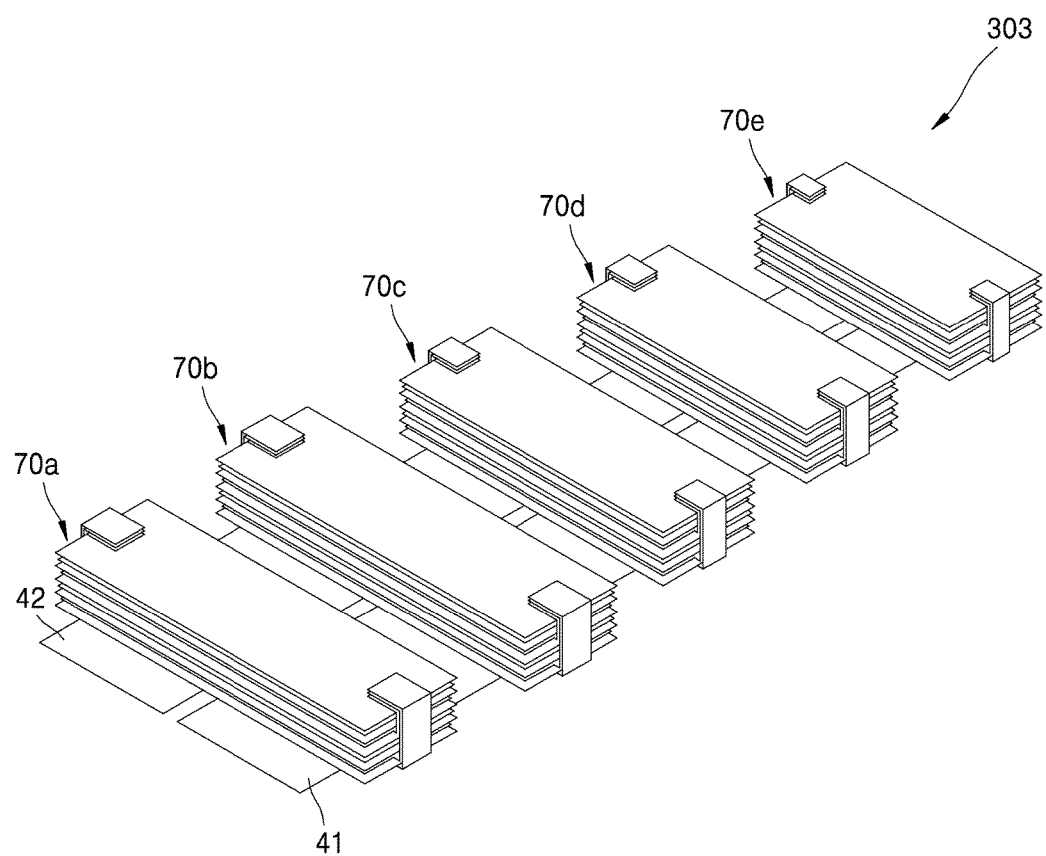

FIG. 36 is a perspective view of a complex electrode assembly 303 according to another embodiment. Referring to FIG. 36, an embodiment of the complex electrode assembly 303 may include a plurality of electrode assemblies 70a, 70b, 70c, 70d and 70e having different sizes from each other. In one embodiment, for example, the plurality of electrode assemblies 70a, 70b, 70c, 70d and 70e may sequentially decrease or increase in size in the lengthwise direction of the first and second sheet-type wirings 41 and 42. Alternatively, the plurality of electrode assemblies 70a, 70b, 70c, 70d and 70e having different sizes may not be arranged according to size but may be arranged irregularly. Herein, the fact that the sizes of the electrode assemblies 70a, 70b, 70c, 70d and 70e are different may mean that the electrode assemblies 70a, 70b, 70c, 70d and 70e are different from one another in at least one of width, length, thickness and shape. A variation in the sizes of the electrode assemblies 70a, 70b, 70c, 70d and 70e may be determined based on, for example, morphological and functional demands of an electronic product equipped with an electrochemical device including the complex electrode assembly 303.

The widths in the lengthwise direction of the first and second sheet-type wirings 41 and 42 may vary. In one embodiment, for example, as shown in FIG. 36, the plurality of electrode assemblies 70a, 70b, 70c, 70d and 70e sequentially decrease in size, and the width in the lengthwise direction of each of the first and second sheet-type wirings 41 and 42 gradually decreases. However, the widths of the first and second sheet-type wirings 41 and 42 may not necessarily gradually vary. In one embodiment, for example, the widths of the first and second sheet-type wirings 41 and 42 may be determined based on the sizes of the plurality of electrode assemblies 70a, 70b, 70c, 70d and 70e. The thicknesses of the first and second sheet-type wirings 41 and 42 may vary in the lengthwise direction thereof. In one embodiment, for example, when the widths of the first and second sheet-type wirings 41 and 42 increase or decrease, the thicknesses thereof may also increase or decrease. Alternatively, the widths of the first and second sheet-type wirings 41 and 42 may be substantially constant, and only the thicknesses thereof may vary.

Figure 37:
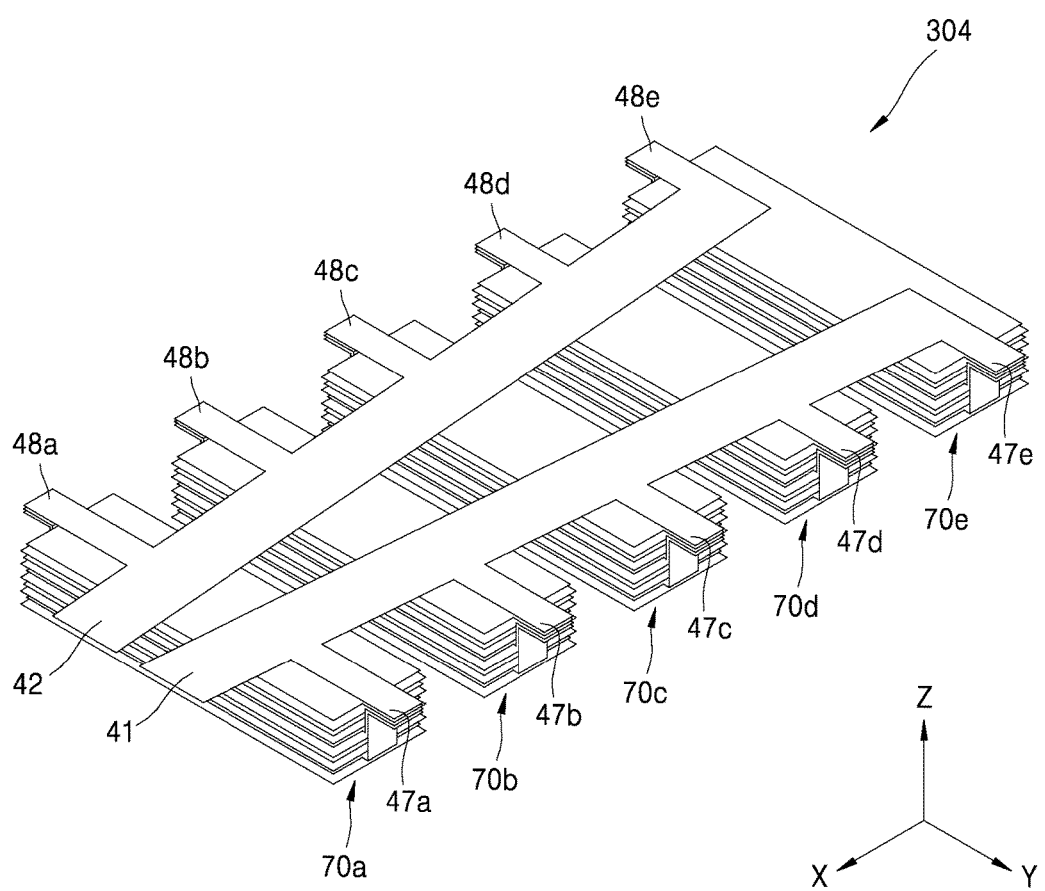

FIG. 37 is a perspective view of a complex electrode assembly 304 according to another embodiment. Referring to FIG. 37, in an embodiment, the first and second sheet-type wirings 41 and 42 may not be parallel to each other, and may form an angle greater than about zero degree (0°) with each other. Although both the first and second sheet-type wirings 41 and 42 are at an angle to the lengthwise direction thereof (i.e., the x-axis direction) in FIG. 37, embodiments are not limited thereto. In one embodiment, for example, one of the first sheet-type wiring 41 and the second sheet-type wiring 42 may be parallel to the lengthwise direction thereof, and the other of the first sheet-type wiring 41 and the second sheet-type wiring 42 may be at an angle to the lengthwise direction thereof. The respective angles of inclination of the first and second sheet-type wirings 41 and 42 do not need to be constant. The respective angles of the first and second sheet-type wirings 41 and 42 to the lengthwise direction may vary based on positions in the lengthwise direction.

In such an embodiment, as shown in FIG. 37, the complex electrode assembly may include the stacked electrode assemblies 70 of FIG. 33, but not being limited thereto. In an alternative embodiment, the electrode assemblies of the complex electrode assembly may be substantially the same as one of the embodiments of the electrode assemblies described above with reference to FIGS. 1 to 17.

Figure 38:
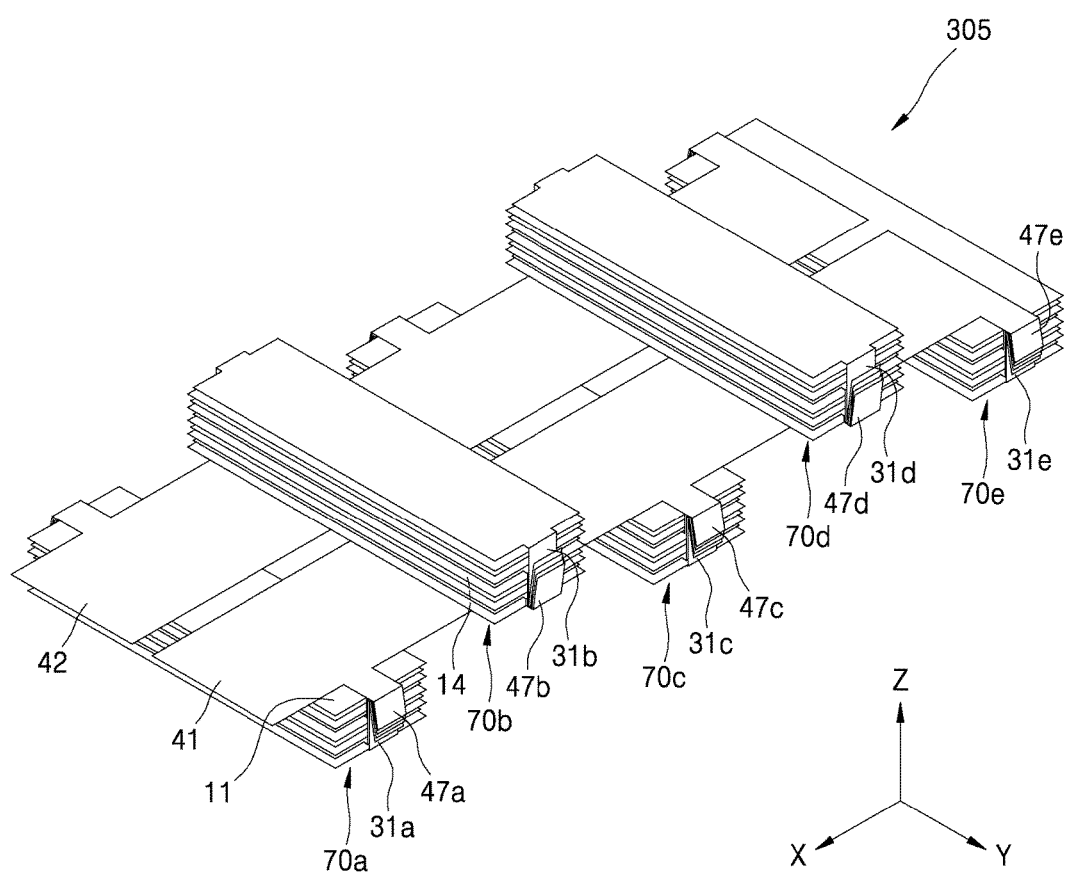

FIG. 38 is a schematic perspective view of a complex electrode assembly 305 according to another embodiment. Referring to FIG. 38, in an embodiment, the electrode assemblies 70a, 70c and 70e from among the plurality of electrode assemblies 70a, 70b, 70c, 70d and 70e may be disposed in a way such that the upper surfaces 11 of the electrode assemblies 70a, 70c and 70e face the first and second sheet-type wirings 41 and 42, and the remaining electrode assemblies 70b and 70d may be disposed in a way such that the lower surfaces 14 of the electrode assemblies 70b and 70d face the first and second sheet-type wirings 41 and 42. In one embodiment, for example, as shown in FIG. 38, first, third and fifth electrode assemblies 70a, 70c and 70e are disposed below the first and second sheet-type wirings 41 and 42, and second and fourth electrode assemblies 70b and 70d are disposed above the first and second sheet-type wirings 41 and 42. In such an embodiment, first protrusions 47a, 47b and 47c of the first sheet-type wiring 41 that respectively correspond to the first, third and fifth electrode assemblies 70a, 70c and 70e, and second protrusions 48a, 48b and 48c of the second sheet-type wiring 42 respectively corresponding thereto may be bent toward the first, third and fifth electrode assemblies 70a, 70c and 70e, e.g., downwards (i.e., in the −z-axis direction). First protrusions 47b and 47d of the first sheet-type wiring 41 that respectively correspond to the second and fourth electrode assemblies 70b and 70d and second protrusions 48b and 48d of the second sheet-type wiring 42 respectively corresponding thereto may be bent toward the second and fourth electrode assemblies 70b and 70d, e.g., upwards (i.e., in the +z-axis direction). Although the plurality of electrode assemblies 70a, 70b, 70c, 70d and 70e are disposed alternately below and above the first and second sheet-type wirings 41 and 42 in FIG. 38, embodiments are not limited thereto.

Figure 39:
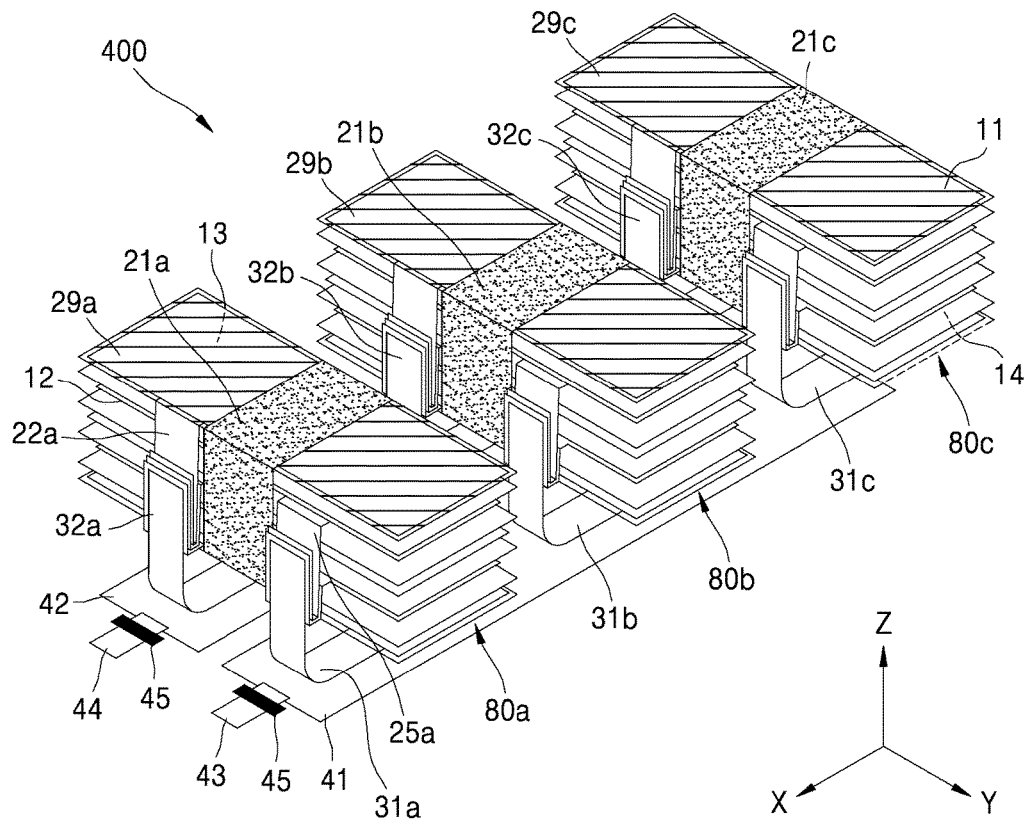
FIGS. 39 and 40 are a perspective view and a cross-sectional view, respectively, of a complex electrode assembly according to another embodiment.
Figure 40:
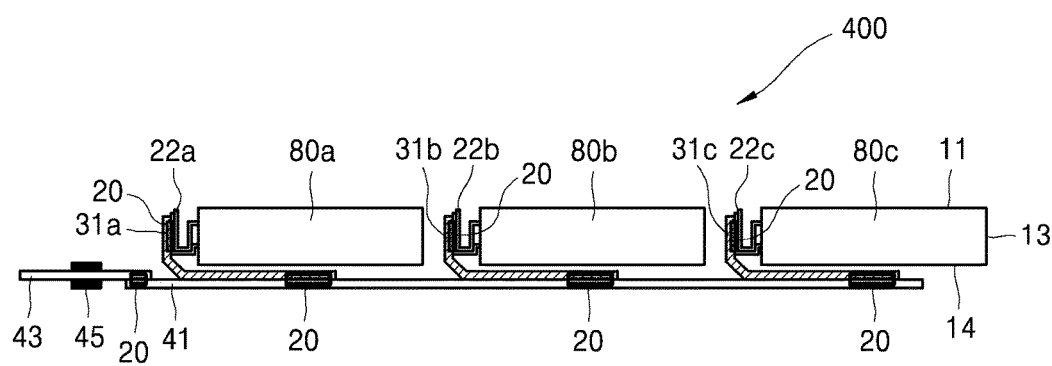

FIGS. 39 and 40 are a perspective view and a cross-sectional view, respectively, of a complex electrode assembly 400 according to another embodiment. Referring to FIGS. 39 and 40, an embodiment of the complex electrode assembly 400 may include a plurality of electrode assemblies 80a, 80b and 80c, and first and second sheet-type wirings 41 and 42, each electrically connected to the plurality of electrode assemblies 80a, 80b and 80c. The complex electrode assembly 400 may further include first electrode tabs 31a, 31b and 31c that respectively electrically connect the plurality of electrode assemblies 80a, 80b and 80c to the first sheet-type wiring 41, and second electrode tabs 32a, 32b and 32c that respectively electrically connect the plurality of electrode assemblies 80a, 80b and 80c to the second sheet-type wiring 42.

The complex electrode assembly 400 of FIGS. 39 and 40 may be substantially the same as the complex electrode assembly 300 of FIG. 31 except that the first electrode tabs 31a, 31b and 31c, and the second electrode tabs 32a, 32b and 32c extend in the x-axis direction, which is parallel to the lengthwise direction of the first and second sheet-type wirings 41 and 42. In an embodiment of the complex electrode assembly 300, as shown in FIG. 31, the first electrode tabs 31a, 31b and 31c, and the second electrode tabs 32a, 32b and 32c are led out from the third and fourth side surfaces 15 and 16 of the electrode assemblies 70a, 70b and 70c in opposite directions. In an alternative embodiment of the complex electrode assembly 400, as shown in FIGS. 39 and 40, the first electrode tabs 31a, 31b and 31c, and the second electrode tabs 32a, 32b and 32c may be led out from respective first side surfaces 12 or respective second side surfaces 13 of the electrode assemblies 80a, 80b and 80c in the same direction.

Figure 41:
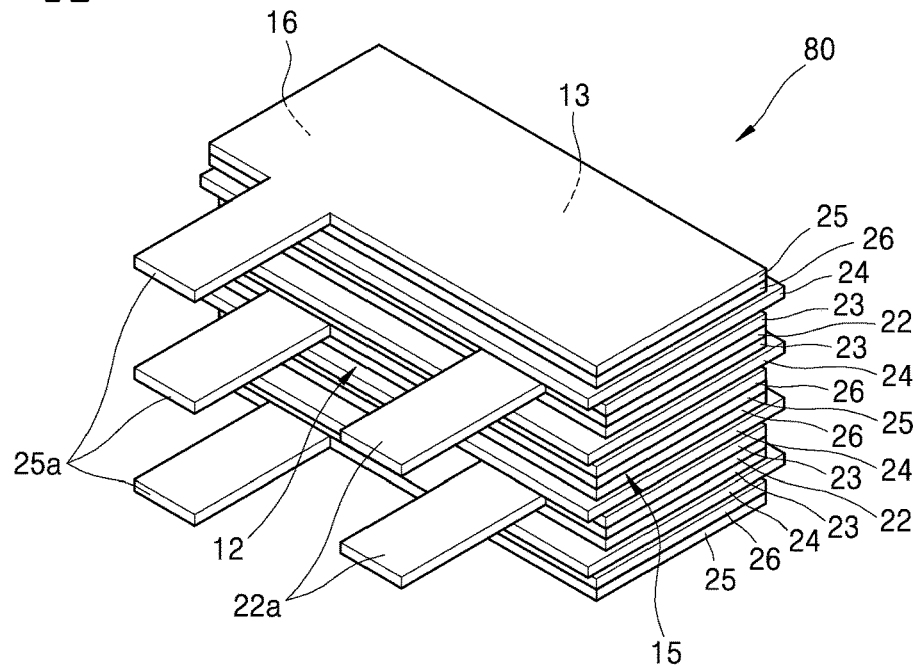
FIGS. 41 and 42 are schematic perspective views of each electrode assembly illustrated in FIG. 39.
Figure 42:
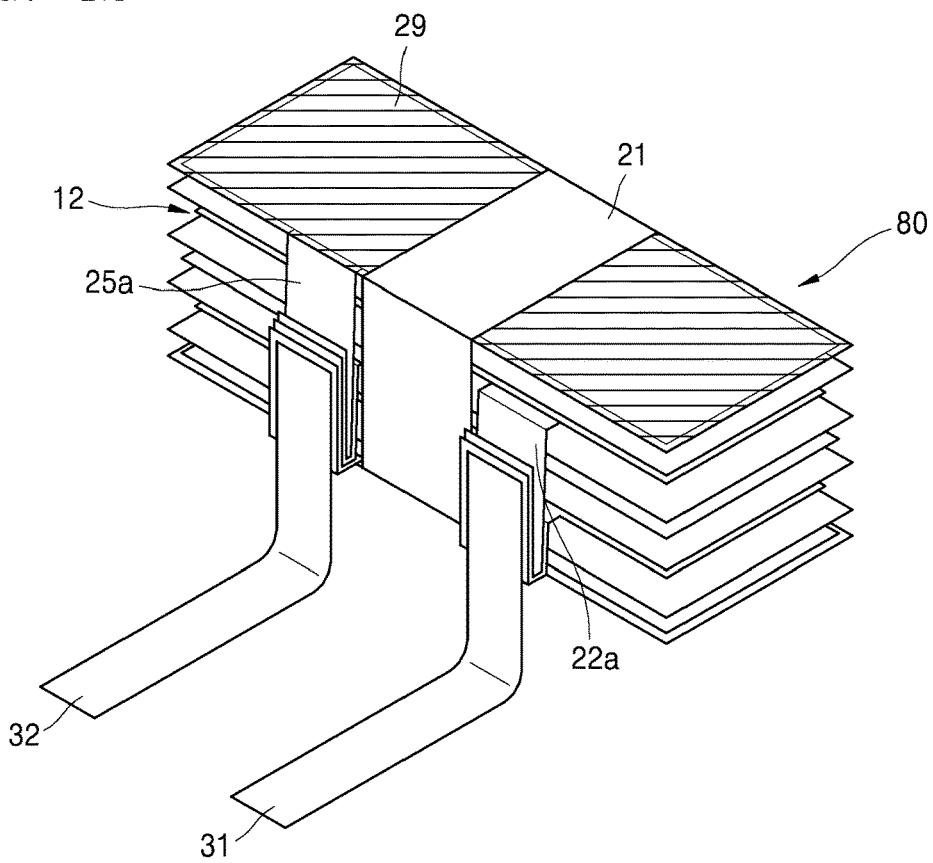

FIGS. 41 and 42 are schematic perspective views of an electrode assembly 80, which is each of the electrode assemblies 80a, 80b and 80c illustrated in FIG. 39. Referring to FIG. 41, the electrode assembly 80 may include a plurality of first electrode plates 22 and 23, a plurality of second electrode plates 25 and 26, and a plurality of insulative separators 24 respectively interposed between the plurality of first electrode plates 22 and 23 and the plurality of second electrode plates 25 and 26. In one embodiment, for example, the plurality of first electrode plates 22 and 23, the plurality of separators 24, and the plurality of second electrode plates 25 and 26 may be stacked in a way such that each separator 24 is interposed between the first electrode plates 22 and 23 and the second electrode plates 25 and 26, thereby defining a stacked-type electrode assembly 80. In an embodiment, the electrode assembly 80 includes the plurality of first electrode plates 22 and 23, the plurality of second electrode plates 25 and 26, and the plurality of separators 24 as shown in FIG. 41, but not being limited thereto. In an alternative embodiment, only one of the first electrode plates 22 and 23, only one of the separators 24, and only one of the second electrode plates 25 and 26 may be included in the electrode assembly 80. As illustrated in FIG. 42, an insulation layer 29 may be further disposed on an upper surface 11 or a lower surface 14 of the electrode assembly 80. The electrode assembly 80 may further include an insulative tape 21 that is attached to at least a portion of the circumference of the electrode assembly 80 to fix the plurality of first electrode plates 22 and 23, the plurality of second electrode plates 25 and 26, and the plurality of separators 24, which are stacked one on another.

The first electrode plates 22 and 23 of the electrode assembly 80 may include a first current collector 22 and a first active material layer 23 coated on the first current collector 22. The second electrode plates 25 and 26 of the electrode assembly 80 may include a second current collector 25 and a second active material layer 26 coated on the second current collector 25. In an embodiment, the electrode assembly 80 may be a stacked-type electrode assembly, where the stacked-type electrode assembly 80 includes a plurality of separated first current collectors 22 and a plurality of separated second current collectors 25 as in FIG. 41, but not being limited thereto. In an alternative embodiment, the stacked-type electrode assembly 80 may include only one first current collector 22 and only one second current collector 25.

Each first current collector 22 may include a first extension 22a which is a protrusion of an active material non-coated portion of the first current collector 22 from a first side surface 12 of the electrode assembly 80, and each second current collector 25 may include a second extension 25a which is a protrusion of an active material non-coated portion of the second current collector 22 from the first side surface 12 of the electrode assembly 80. The first extension 22a may have a smaller width than the first current collector 22 and may be disposed adjacent to the third side surface 15. The second extension 25a may have a smaller width than the second current collector 25 and may be disposed adjacent to the fourth side surface 16. In one embodiment, for example, the width of the first extension 22a may be less than a half of the width of the first current collector 22, and the width of the second extension 25a may be less than a half of the width of the second current collector 25. Accordingly, the first extension 22a and the second extension 25a are not overlapped with each other in the width direction, and thus may not interfere with each other even when the first extension 22a and the second extension 25a are folded up and down.

Referring to FIG. 42, in an embodiment, the first electrode tab 31 may be electrically connected to the plurality of first extensions 22a of the electrode assembly 80. In such an embodiment, the plurality of first extensions 22a may be bent together. In one embodiment, for example, after being bent together downwards, the plurality of first extensions 22a may be bent again about 180° to be adjacent to the first side surface 12 of the electrode assembly 80. The first electrode tab 31 may be bonded with externally exposed surfaces of the plurality of first extensions 22a. In such an embodiment, the second electrode tab 33 may be electrically connected to the plurality of second extensions 25a of the electrode assembly 80. In such an embodiment, after being bent together downwards, the plurality of first extensions 25a may be bent again about 180° to be adjacent to the first side surface 12 of the electrode assembly 80. Then, the second electrode tab 32 may be bonded with externally exposed surfaces of the plurality of second extensions 25a.

In an embodiment, the separate first electrode tab 31 and the separate second electrode tab 32 are connected to the electrode assembly 80 as shown in FIG. 42, but not being limited thereto. In an alternative embodiment, the first electrode tab 31 and the second electrode tab 32 may be integrally formed with the electrode assembly 80 as a single unitary and indivisible unit. In one embodiment, for example, the first electrode tab 31 may be defined by an extended portion of a first current collector 22 extending from the first extension 22a thereof, and the second electrode tab 32 may be defined by an extended portion of a second current collector 25 extending from the second extension 25a thereof. In such an embodiment, one of the plurality of first extensions 22a may be longer than the others to function as the first electrode tab 31, and the others may be bonded with the loner first extension 22a. In such an embodiment, one of the plurality of second extensions 25a may be longer than the others to function as the second electrode tab 32, and the others may be bonded with the loner second extension 25a.

Referring back to FIGS. 39 and 40, in an embodiment, the first electrode tabs 31a, 31b and 31c, and the second electrode tabs 32a, 32b and 32c may extend from the first side surfaces 12 of the electrode assemblies 80a, 80b and 80c to the lower surfaces 14 thereof. Thus, some portions of the first electrode tabs 31a, 31b and 31c and the second electrode tabs 32a, 32b and 32c may face the first side surfaces 12 of the electrode assemblies 80a, 80b and 80c, and the other portions thereof may face the lower surfaces 14 of the electrode assemblies 80a, 80b and 80c. In such an embodiment, the other portions of the first electrode tabs 31a, 31b and 31c may be disposed between the lower surfaces 14 of the electrode assemblies 80a, 80b and 80c and the first sheet-type wiring 41, and the other portions of the second electrode tabs 32a, 32b and 32c may be disposed between the lower surfaces 14 of the electrode assemblies 80a, 80b and 80c and the second sheet-type wiring 42. Then, the portions of the first electrode tabs 31a, 31b and 31c and the second electrode tabs 32a, 32b and 32c that face the lower surfaces 14 of the electrode assemblies 80a, 80b and 80c may be bonded with the first and second sheet-type wirings 41 and 42, respectively. Accordingly, in such an embodiment, junctions 20 of the first electrode tabs 31a, 31b and 31c and the second electrode tabs 32a, 32b and 32c with the first sheet-type wiring 41 and the second sheet-type wiring 42 may be disposed opposite to the lower surfaces 14 of the electrode assemblies 80a, 80b, and 80c, respectively.

According to such an embodiment having the structure described above, the plurality of electrode assemblies 80a, 80b and 80c may be arranged along the first and second sheet-type wirings 41 and 42 to face the first and second sheet-type wirings 41 and 42. In one embodiment, for example, as illustrated in FIGS. 39 and 40, the electrode assemblies 80a, 80b and 80c may be arranged in a way such that respective lower surfaces 14 thereof face the first and second sheet-type wirings 41 and 42. Alternatively, the electrode assemblies 80a, 80b and 80c may be arranged in another way such that respective upper surfaces 11 thereof instead of the lower surfaces 14 face the first and second sheet-type wirings 41 and 42. The first and second sheet-type wirings 41 and 42 may be arranged in the same direction with respect to the electrode assemblies 80a, 80b and 80c. In one embodiment, for example, both the first and second sheet-type wirings 41 and 42 may be disposed to face the lower surfaces 14 of the electrode assemblies 80a, 80b and 80c.

Figure 43:
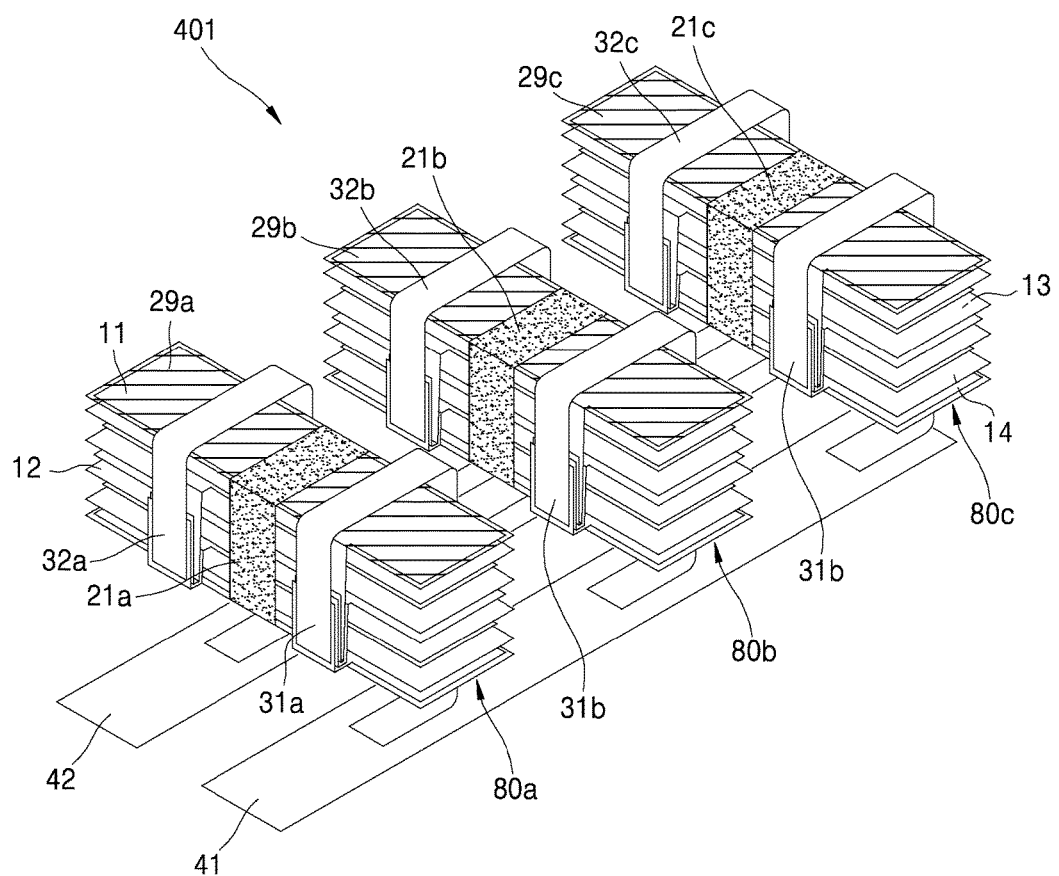
FIG. 43 is a perspective view of a complex electrode assembly according to another embodiment.

FIG. 43 is a schematic cross-sectional view of a complex electrode assembly 401 according to another embodiment. In an embodiment, as shown in FIG. 39, the first electrode tabs 31a, 31b and 31c and the second electrode tabs 32a, 32b and 32c may extend from the first side surfaces 12 of the electrode assemblies 80a, 80b and 80c up to the lower surfaces 14 thereof. In an alternative embodiment of the complex electrode assembly 401, as shown in FIG. 43, the first electrode tabs 31a, 31b and 31c and the second electrode tabs 32a, 32b and 32c may extend from the first side surfaces 12 of the electrode assemblies 80a, 80b and 80c upwardly to the lower surfaces 14 thereof via the upper surfaces 11 and the second side surfaces 13 thereof. As illustrated in FIG. 43, the first electrode tabs 31a, 31b, and 31c and the second electrode tabs 32a, 32b and 32c may almost surround the circumferences of the electrode assemblies 80a, 80b and 80c.

In such an embodiment, various complex electrode assemblies including the stacked electrode assemblies 80 of FIG. 41 may be constructed by using the various structures of the complex electrode assemblies 200 to 207 of FIGS. 18 to 30.

In embodiments of the complex electrode assembly 100 to 109, 200 to 207, 300 to 305, 400 and 401 described above, electrically connected portions or the junctions 20 between the first and second electrode tabs 31 and 32 and the first and second sheet-type wirings 41 and 42 are defined at locations that are substantially close to outer surfaces of the electrode assemblies 10, 60, 70 and 80 and facing the outer surfaces thereof. In one embodiment, for example, the junction 20 between the first electrode tab 31 and the first sheet-type wiring 41 and the junction 20 between the second electrode tab 32 and the second sheet-type wiring 42 adjacently face the upper surface 11, the lower surface 12 or the third and fourth side surfaces 15 and 16 of the electrode assembly 10, 60, 70 and 80. A gap between the junctions 20 and the upper surface 11, the lower surface 12, or the third and fourth side surfaces 15 and 16 may be less than for example, 2 mm or 1 mm. Thus, in such an embodiment, increase in the volumes of electrochemical devices including the complex electrode assembly may be minimized, such that the energy densities of the electrochemical device including the complex electrode assembly may be substantially improved. In such an embodiment, a stress applied to the junctions 20 or electrically connected portions between the electrode tabs 31 and 32 and the sheet-type wirings 41 and 42 that face the outer surfaces of the electrode assembly due to repeated bending of the complex electrode assembly, may be minimized, and thus durability against such a bending may be secured.

However, in an embodiment of the invention, the locations of the junctions 20 between the electrode tabs 31 and 32 and the sheet-type wirings 41 and 42 are not limited to the vicinity of the outer surfaces of the electrode assembly. In an alternative embodiment, the locations of the junction 20 between the first electrode tab 31 and the first sheet-type wiring 41 and the junction 20 between the second electrode tab 32 and the second sheet-type wiring 42 deviate from the outer surfaces of the electrode assembly.

Figure 44:
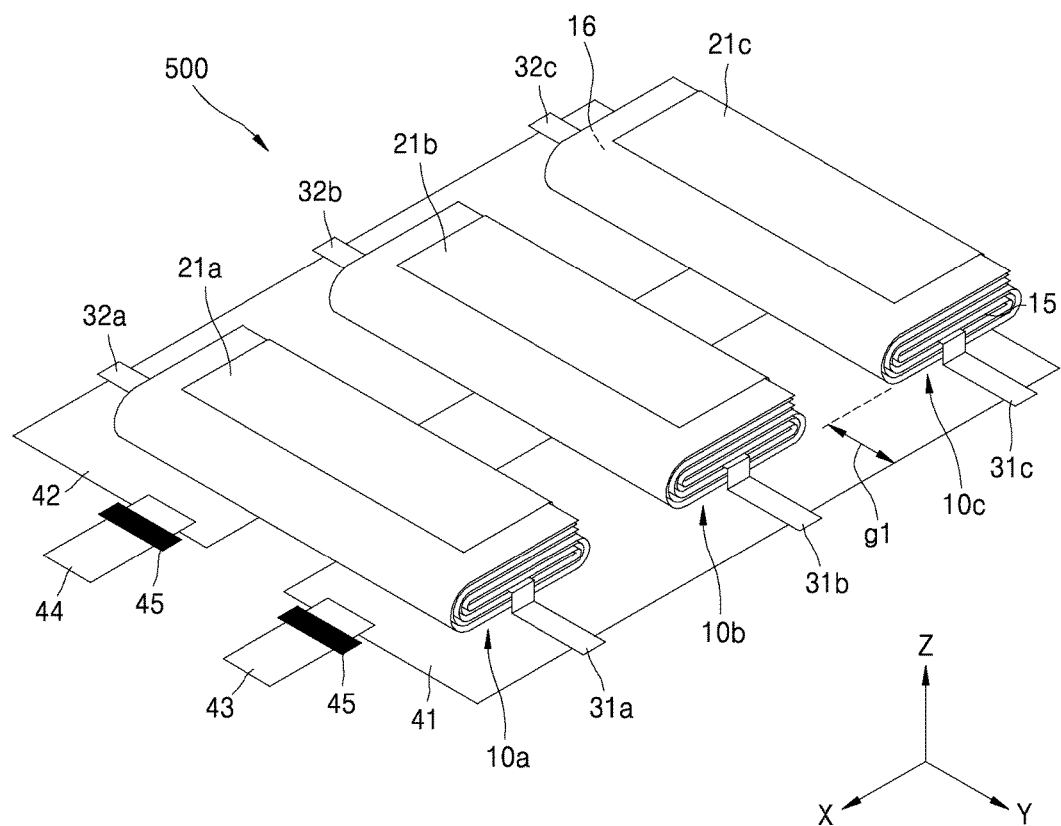
FIG. 44 is a perspective view of a complex electrode assembly according to another embodiment.

First, FIG. 44 is a perspective view of a complex electrode assembly 500 according to another embodiment. Referring to FIG. 44, in an embodiment, edges of the first and second sheet-type wirings 41 and 42 protrude farther than edges of the side surfaces 15 and 16 of the electrode assemblies 10a, 10b, and 10c, respectively, in the width direction (i.e., y-axis direction). In one embodiment, for example, the edge of the first sheet-type wiring 41 may protrude by a gap g1 farther than the third side surfaces 15 of the electrode assemblies 10a, 10b and 10c in the +y-axis direction. In such an embodiment, the edge of the second sheet-type wiring 42 may protrude by the gap g1 farther than the fourth side surfaces 16 of the electrode assemblies 10a, 10b and 10c in the −y-axis direction. The first electrode tabs 31a, 31b and 31c led out from the third side surfaces 15 of the electrode assemblies 10a, 10b and 10c may be bonded with the edge of the first sheet-type wiring 41 that protrudes farther than the third side surfaces 15 of the electrode assemblies 10a, 10b and 10c. The second electrode tabs 32a, 32b and 32c may be led out from the fourth side surfaces 16 of the electrode assemblies 10a, 10b and 10c and may be bonded with the edge of the second sheet-type wiring 42 that protrudes farther than the fourth side surfaces 16 of the electrode assemblies 10a, 10b and 10c.

Figure 45:
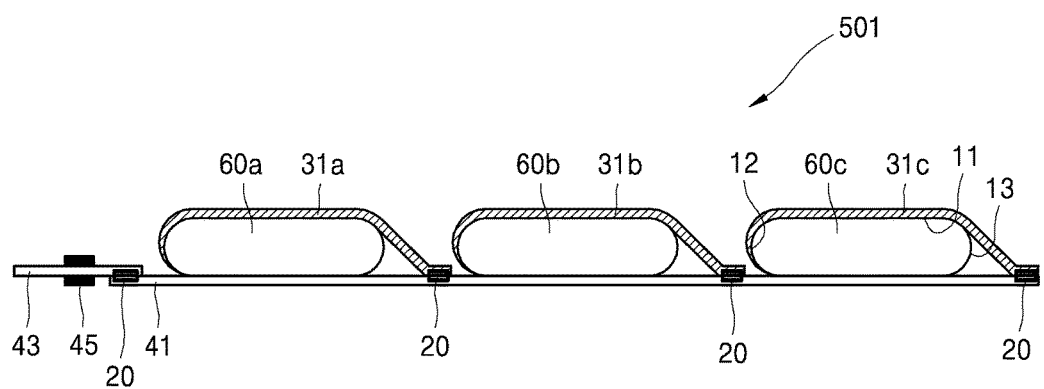
FIGS. 45 and 46 are schematic cross-sectional views of complex electrode assemblies according to other embodiments.

FIG. 45 is a schematic cross-sectional view of a complex electrode assembly 501 according to another embodiment. Referring to FIG. 45, in an embodiment, the first electrode tabs 31a, 31b and 31c are respectively led out from the first side surfaces 12 of the electrode assemblies 60a, 60b and 60c and extend along the upper surfaces 11 and the second side surfaces 13 of the electrode assemblies 60a, 60b and 60c. The first electrode tabs 31a, 31b and 31c may be respectively bonded with portions of the first sheet-type wiring 41 respectively facing the regions between every two adjacent electrode assemblies among the electrode assemblies 60a, 60b and 60c. In one embodiment, for example, the first electrode tab 31a of the first electrode assembly 60a may be bonded with a portion of the first sheet-type wiring 41 that is between the first and second electrode assemblies 60a and 60b. Accordingly, junctions 20 between the first electrode tab 31a and the first sheet-type wiring 41 and between the first electrode tab 31b and the first sheet-type wiring 41 may be formed between the first and second electrode assemblies 60a and 60b and between the second and third electrode assemblies 60b and 60c, respectively. The first electrode tab 31c of the third electrode assembly 60c which is at the rearmost may pass the second side surface 13 of the third electrode assembly 60c and then may be bonded with an end of the first sheet-type wiring 41. Although not shown in FIG. 45 for convenience of illustration, the second electrode tabs 32a, 32b and 32c may be bonded with portions of the second sheet-type wiring 42 that are located between every two adjacent electrode assemblies among the electrode assemblies 60a, 60b and 60c, similarly to the first electrode tabs 31a, 31b and 31c.

Figure 46:
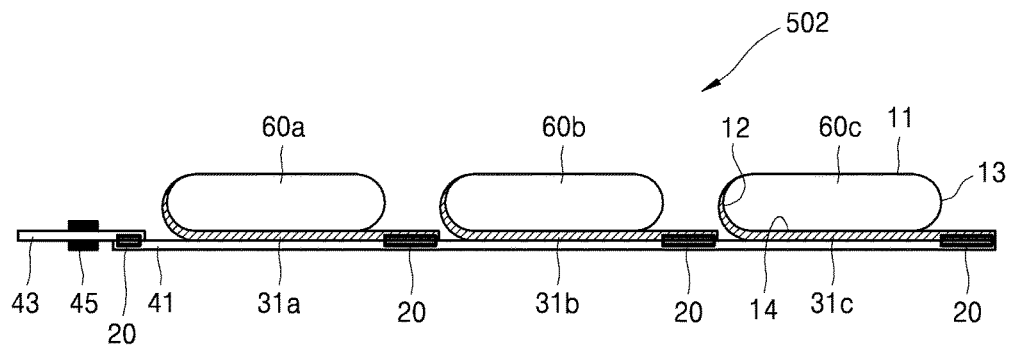

FIG. 46 is a schematic cross-sectional view of a complex electrode assembly 502 according to another embodiment. Referring to FIG. 46, in an embodiment, the first electrode tabs 31a, 31b and 31c may be respectively led out from the first side surfaces 12 of the electrode assemblies 60a, 60b and 60c, and extend along the lower surfaces 14 and the second side surfaces 13 of the electrode assemblies 60a, 60b and 60c. The first electrode tabs 31a, 31b and 31c may be respectively bonded with portions of the first sheet-type wiring 41 respectively facing the regions between every two adjacent electrode assemblies among the electrode assemblies 60a, 60b and 60c. In one embodiment, for example, the first electrode tab 31a of the first electrode assembly 60a may pass between the lower surface 14 of the first electrode assembly 60a and the first sheet-type wiring 41 and may be bonded with the portion of the first sheet-type wiring 41 between the first and second electrode assemblies 60a and 60b. Accordingly, in such an embodiment, junctions 20 between the first electrode tab 31a and the first sheet-type wiring 41 and between the first electrode tab 31b and the first sheet-type wiring 41 may be disposed between the first and second electrode assemblies 60a and 60b and between the second and third electrode assemblies 60b and 60c, respectively. The first electrode tab 31c of the third electrode assembly 60c which is at the rearmost may pass the second side surface 13 of the third electrode assembly 60c and then may be bonded with an end of the first sheet-type wiring 41. Although not shown in FIG. 46 for convenience of illustration, the second electrode tabs 32a, 32b and 32c may be bonded with portions of the second sheet-type wiring 42 that are located between every two adjacent electrode assemblies among the electrode assemblies 60a, 60b, and 60c, similarly to the first electrode tabs 31a, 31b and 31c.

Figure 47:
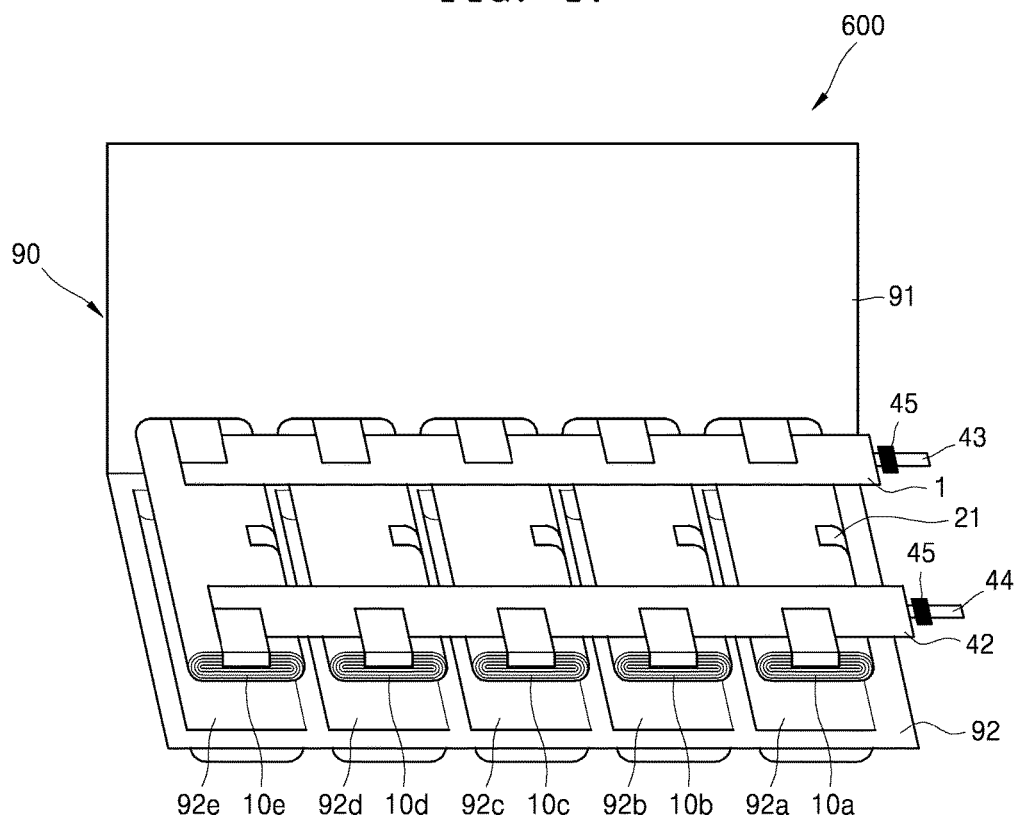
FIG. 47 is a perspective view of an electrochemical device according to an embodiment.

In an embodiment, the complex electrode assembly may be packaged together with an electrolyte in an outer casing, such as a pouch, to thereby manufacture an electrochemical device such as a lithium ion secondary battery. FIG. 47 is a perspective view of an electrochemical device 600 according to an embodiment.

Referring to FIG. 47, an embodiment of the electrochemical device 600 includes a complex electrode having a structure substantially the same as that of at least one of the embodiments of the complex electrode assembly described above, and an outer casing 90 that packages the complex electrode assembly. The outer casing 90 may include an upper cover 91 and a lower cover 92. The complex electrode assembly may be disposed between the upper cover 91 and the lower cover 92, and respective three edges of the upper cover 91 and the lower cover 92 may be bonded with each other so that the upper cover 91 and the lower cover 92 are sealed together, thereby define the electrochemical device 600. Although not shown in FIG. 47, an electrolyte may be packaged between the upper cover 91 and the lower cover 92 of the outer casing 90.

In such an embodiment, where the three edges of the upper cover 91 are bonded with those of the lower cover 92, the sealing members 45 respectively disposed on the respective middle portions of the first and second lead tabs 43 and 44 may be bonded with the edges of the upper cover 91 and the lower cover 92. Then, respective portions of the first and second lead tabs 43 and 44 may protrude outside the electrochemical device 600 and thus may serve as electrode terminals of the electrochemical device 600. In such an embodiment, the first and second lead tabs 43 and 44 may be firmly sealed with the outer casing 90.

The upper cover 91 and the lower cover 92 of the outer casing 90 may include or be formed of a flexible film such that, when the complex electrode assembly is packaged, the shape of the outer casing 90 may be defined to correspond to the exterior shape of the complex electrode assembly. Alternatively, as illustrated in FIG. 47, the lower cover 92 may include a plurality of accommodating portions 92a, 92b, 92c, 92d, and 92e for respectively accommodating a plurality of electrode assemblies 10a, 10b, 10c, 10d and 10e of the complex electrode assembly.

In such an embodiment, the electrochemical device 600 is flexible and may be used to manufacture flexibly foldable electronic apparatuses, and may also be used in curved electronic apparatuses.

It should be understood that the exemplary embodiments described therein should be considered in a descriptive sense only and not for purposes of limitation. Descriptions of features or aspects within each embodiment should typically be considered as available for other similar features or aspects in other embodiments.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:
1. A complex electrode assembly comprising:
   a first sheet-shaped wire which extends in a lengthwise direction thereof and comprises a sheet region, a width of which in a direction perpendicular to the lengthwise direction is greater than a thickness thereof in a direction perpendicular to the lengthwise direction and a width direction of the first sheet-shaped wire;

a plurality of electrode assemblies which are arranged to be spaced apart from each other in the lengthwise direction of the first sheet-shaped wire and are electrically connected to the first sheet-shaped wire, wherein each of the electrode assemblies comprises a first electrode tab electrically connected to the first sheet-shaped wire, wherein the first electrode tab is a positive electrode tab; and an outer casing which packages the first sheet-shaped wire and the plurality of electrode assemblies, wherein outer surfaces of each of the electrode assemblies comprises a first outer surface and a second outer surface arranged opposite to each other in the lengthwise direction of the first sheet-shaped wire, a third outer surface and a fourth outer surface arranged opposite to each other in the width direction of the first sheet-shaped wire, and a fifth outer surface and a sixth outer surface arranged opposite to each other in a thickness direction of the first sheet-shaped wire, the first sheet-shaped wire is disposed to face the fifth or sixth outer surface of at least one of the electrode assemblies, the fifth and sixth outer surfaces of the each of the electrode assemblies are the outermost surfaces thereof in the thickness direction of the first sheet-shaped wire, the first electrode tab is partially bent in a way such that a portion of the first electrode tab is bonded with the first sheet-shaped wire, each of the electrode assemblies comprises a first side and a second side in the width direction of the first sheet-shaped wire, and the first sheet-shaped wire is disposed between the first side and the second side of each of the electrode assemblies.

2. The complex electrode assembly of claim 1, wherein each of the electrode assemblies further comprises a first electrode plate, a second electrode plate, and a separator interposed between the first electrode plate and the second electrode plate.

3. The complex electrode assembly of claim 2, wherein the first electrode plate comprises a first current collector and a first active material layer coated on the first current collector, and a strength of the first sheet-shaped wire is greater than a strength of the first current collector.

4. The complex electrode assembly of claim 2, wherein each of the electrode assemblies comprises at least one of:

a jelly-roll-type wound electrode assembly in which the first electrode plate, the second electrode plate, and the separator are wound together;

a stacked electrode assembly in which the first electrode plate, the second electrode plate, and the separator are repeatedly stacked one on another; and a folded electrode assembly in which respective portions of the first electrode plate, the second electrode plate and the separator are folded.

5. The complex electrode assembly of claim 2, wherein the fifth outer surface and the sixth outer surface are parallel to each other, and the first electrode plate, the second electrode plate and the separator, which are arranged between the fifth outer surface and the sixth outer surface, are substantially parallel to one another.

6. The complex electrode assembly of claim 2, wherein the first electrode tab electrically connects the first electrode plate to the first sheet-shaped wire.

7. The complex electrode assembly of claim 6, further comprising:

an insulation layer disposed on at least a portion of an outer surface of the first sheet-shaped wire, except for the portion of the first sheet-shaped wire bonded with the first electrode tab.

8. The complex electrode assembly of claim 6, wherein the portion of the first sheet-shaped wire bonded with the first electrode tab faces at least one of first to sixth outer surfaces of each of the electrode assemblies.

9. The complex electrode assembly of claim 8, wherein the first electrode tab extends in the width direction of the first sheet-shaped wire, and an end of the first electrode tab is bent in a direction opposite to an extending direction of the first electrode tab, to face the fifth or sixth outer surface of the electrode assembly.

10. The complex electrode assembly of claim 8, wherein the first electrode tab extends in the width direction of the first sheet-shaped wire, and the first sheet-shaped wire comprises a protrusion which protrudes in the width direction and is bonded with the first electrode tab.

11. The complex electrode assembly of claim 10, wherein the protrusion of the first sheet-shaped wire is bent in the thickness direction of the first sheet-shaped wire to face the third or fourth outer surface of each of the electrode assemblies, and a bent portion of the protrusion is bonded with the first electrode tab.

12. The complex electrode assembly of claim 10, wherein the end of the first electrode tab is bent in the thickness direction of the first sheet-shaped wire to be bonded with the protrusion of the first sheet-shaped wire.

13. The complex electrode assembly of claim 8, wherein the first electrode tab extends in the lengthwise direction of the first sheet-shaped wire.

14. The complex electrode assembly of claim 13, wherein the first electrode tab is bonded with the first sheet-shaped wire at a location between each of the electrode assemblies and the first sheet type wiring, and the first electrode tab comprises:

a first portion which faces the first or second outer surface of each of the electrode assemblies; and a second portion which faces the fifth or sixth outer surface of each of the electrode assemblies, wherein the second portion of the first electrode tab is bonded with the first sheet-shaped wire.

15. The complex electrode assembly of claim 13, wherein the electrode assemblies comprise:

a first electrode assembly and a second electrode assembly, and a first electrode tab of the first electrode assembly is disposed between the first electrode assembly and the first sheet-shaped wire and is bonded with the first sheet-shaped wire at a location between the second electrode assembly and the first sheet-shaped wire.

16. The complex electrode assembly of claim 13, wherein the first sheet-shaped wire is bent to face both the fifth outer surface and the sixth outer surface of each of the electrode assemblies, and the first electrode tab is bonded with a portion of the first sheet-shaped wire which faces the fifth outer surface of each of the electrode assemblies.

17. The complex electrode assembly of claim 13, wherein the first sheet-shaped wire is bent to face both the fifth outer surface and the sixth outer surface of each of the electrode assemblies, and
the first electrode tab is bonded with a portion of the first sheet-shaped wire which faces the sixth outer surface of each of the electrode assemblies.

18. The complex electrode assembly of claim 13, wherein a portion of the first sheet-shaped wire located between two adjacent electrode assemblies among the electrode assemblies is bent to face the first or second outer surface of each of the two adjacent electrode assemblies, and
the first electrode tab is bonded with a portion of the first sheet-shaped wire which faces the first or second outer surface of each of the two adjacent electrode assemblies.

19. The complex electrode assembly of claim 1, further comprising:
a first lead tab electrically connected to an end of the first sheet-shaped wire; and
a sealing member which surrounds a portion of the first lead tab,
wherein an electrical junction between the first lead tab and the first sheet-shaped wire is defined to face the first or second outer surface of a foremost electrode assembly among the electrode assemblies.

20. The complex electrode assembly of claim 1, further comprising:
a sealing member which is disposed between two adjacent electrode assemblies from among the electrode assemblies and surrounds a portion of the first sheet-shaped wire.

21. The complex electrode assembly of claim 1, wherein a width of the first sheet-shaped wire is less than a width of each of the electrode assemblies, and an edge of the third or fourth outer surface of each of the electrode assemblies protrudes farther than an edge of the first sheet-shaped wire in the width direction of the first sheet-shaped wire such that the first sheet-shaped wire is disposed within a region defined in the width of each of the electrode assemblies.

22. The complex electrode assembly of claim 1, wherein a portion of the first sheet-shaped wire located between two adjacent electrode assemblies among the electrode assemblies is bent at least three times to have a bending portion, and
the bending portion comprises a first bent portion, a second bent portion, and a ridge portion between the first bent portion and the second bent portion.

23. The complex electrode assembly of claim 22, wherein the electrode assemblies comprise a first electrode assembly and a second electrode assembly,
a portion of the first sheet-shaped wire between the first bent portion and the ridge portion faces a second outer surface of the first electrode assembly, and
a portion of the first sheet-shaped wire between the second bent portion and the ridge portion faces a first outer surface of the second electrode assembly.

24. The complex electrode assembly of claim 22, wherein a distance between a peak of an outer surface of the ridge portion and an inner bottom surface of each of the first and second bent portions is in a range of about 80% to about 120% of a thickness of each of the electrode assemblies.

25. The complex electrode assembly of claim 22, wherein the ridge portion of the bending portion comprises a first ridge portion and a second ridge portion, and
the bending portion further comprises a valley portion between the first and second ridge portions.

26. The complex electrode assembly of claim 25, wherein heights of peaks of respective outer surfaces of the first and second ridge portions are in a space between planes defined by the fifth outer surface and the sixth outer surface of each of the electrode assemblies.

27. The complex electrode assembly of claim 1, wherein the electrode assemblies comprise a first electrode assembly and a second electrode assembly, and
the first sheet-shaped wire is bent to face a fifth outer surface of the first electrode assembly and to face a sixth outer surface of the second electrode assembly.

28. The complex electrode assembly of claim 1, wherein the first sheet-shaped wire comprises a first surface and a second surface disposed opposite to each other,
an electrode assembly of the electrode assemblies is disposed in a way such that the fifth outer surface thereof faces the second surface of the first sheet-shaped wire, and
another electrode assembly of the electrode assemblies is disposed in another way such that the sixth outer surface thereof faces the first surface of the first sheet-shaped wire.

29. The complex electrode assembly of claim 1, further comprising:
a fixing member which is attached to each of the electrode assemblies and the first sheet-shaped wire to fix the first sheet-shaped wire to each of the electrode assemblies.

30. The complex electrode assembly of claim 1, wherein the fifth or sixth outer surface of each of the electrode assemblies is curved about an axis parallel to the width direction of the first sheet-shaped wire.

31. The complex electrode assembly of claim 30, wherein a portion of the first sheet-shaped wire which faces each of the electrode assemblies is curved about the axis parallel to the width direction of the first sheet-shaped wire.

32. The complex electrode assembly of claim 30, wherein the first sheet-shaped wire is curved about the axis parallel to the width direction of the first sheet-shaped wire, and
a portion of the curved first sheet-shaped wire between two adjacent electrode assemblies among the electrode assemblies has a higher curvature than another portion of the curved first sheet-shaped wire.

33. The complex electrode assembly of claim 1, wherein the width of the sheet region of the first sheet-shaped wire is in a range of about 5 times to about 10000 times the thickness of the sheet region of the first sheet-shaped wire.

34. The complex electrode assembly of claim 1, wherein a thickness of the first sheet-shaped wire is in a range from about 3 micrometers to about 500 micrometers.

35. The complex electrode assembly of claim 1, further comprising:
a second sheet-shaped wire, which is disposed adjacent to the first sheet-shaped wire, extends in a lengthwise direction of the second sheet-shaped wire, and comprises a sheet region, a width of which in a direction perpendicular to the lengthwise direction is greater than a thickness in a direction perpendicular to the lengthwise direction and a width direction of the second sheet-shaped wire,
wherein both of the first and second sheet-shaped wires are disposed facing one of the fifth outer surfaces or the sixth outer surfaces of the electrode assemblies.

36. The complex electrode assembly of claim 35, wherein each of the electrode assemblies comprises:

a first electrode plate;
a second electrode plate;
a separator interposed between the first electrode plate and the second electrode plate;
a first electrode tab which electrically connects the first electrode plate to the first sheet-shaped wire; and
a second electrode tab which electrically connects the second electrode plate to the second sheet-shaped wire, wherein the second electrode tab is a negative electrode tab.

37. The complex electrode assembly of claim 36, wherein the first electrode tab is led out from the third outer surface of each of the electrode assemblies, and
the second electrode tab is led out from the fourth outer surface of each of the electrode assemblies.

* * * * *